United States Patent
Kurihara et al.

(10) Patent No.: US 8,228,773 B2
(45) Date of Patent: Jul. 24, 2012

(54) LASER DRIVING DEVICE AND OPTICAL APPARATUS

(75) Inventors: Tsutomu Kurihara, Kanagawa (JP); Motoi Kimura, Kanagawa (JP); Koichi Yokoyama, Kanagawa (JP); Toshiaki Yoshihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 259 days.

(21) Appl. No.: 12/461,408

(22) Filed: Aug. 11, 2009

(65) Prior Publication Data

US 2010/0054102 A1 Mar. 4, 2010

(30) Foreign Application Priority Data

Sep. 2, 2008 (JP) ................... 2008-224670

(51) Int. Cl.
*G11B 7/00* (2006.01)
(52) U.S. Cl. .................. 369/59.11; 369/47.51
(58) Field of Classification Search ............... 369/47.5, 369/47.51, 47.52, 53.26, 59.1, 59.11, 59.12
See application file for complete search history.

(56) References Cited

U.S. PATENT DOCUMENTS

| | | | | |
|---|---|---|---|---|
| 5,917,793 A | * | 6/1999 | Uchiumi ................. | 369/59.2 |
| 6,552,982 B1 | * | 4/2003 | Fukushima et al. ....... | 369/47.52 |
| 6,791,926 B1 | * | 9/2004 | Furumiya et al. ......... | 369/53.13 |
| 7,426,159 B2 | * | 9/2008 | Mori et al. ............... | 369/44.29 |
| 7,471,605 B2 | * | 12/2008 | Fujita et al. .............. | 369/59.11 |
| 2002/0067670 A1 | * | 6/2002 | Akiyama et al. .......... | 369/47.52 |
| 2002/0080702 A1 | * | 6/2002 | Asada et al. .............. | 369/59.1 |
| 2004/0208104 A1 | * | 10/2004 | Kobayashi et al. ........ | 369/59.11 |
| 2007/0297307 A1 | * | 12/2007 | Nagano .................... | 369/53.25 |

FOREIGN PATENT DOCUMENTS

JP 2007-141406 6/2007

* cited by examiner

*Primary Examiner* — Thomas Alunkal
(74) *Attorney, Agent, or Firm* — Rader Fishman & Grauer, PLLC

(57) ABSTRACT

A laser driving device includes a storage unit that stores signal patterns for recording-waveform control representing level information of each divided driving signal to drive a laser device on a space and a mark based on the divided driving signals. Also, it includes a pulse generator that generates the reference pulse and the switching pulse based on a first transmission signal and a second transmission signal. The first transmission signal contains timing information for acquiring a reference pulse that represents a timing of repetitively switching between the space and the mark. The second transmission signal contains timing information for acquiring a switch pulse that represents a timing of switching the signals. Among level information for each of the signals in the storage, reference level information is read together with the reference pulse. Other level information after the reference level information is sequentially read for each switching pulse.

10 Claims, 41 Drawing Sheets

FIRST COMPARATIVE EXAMPLE

SECOND COMPARATIVE EXAMPLE

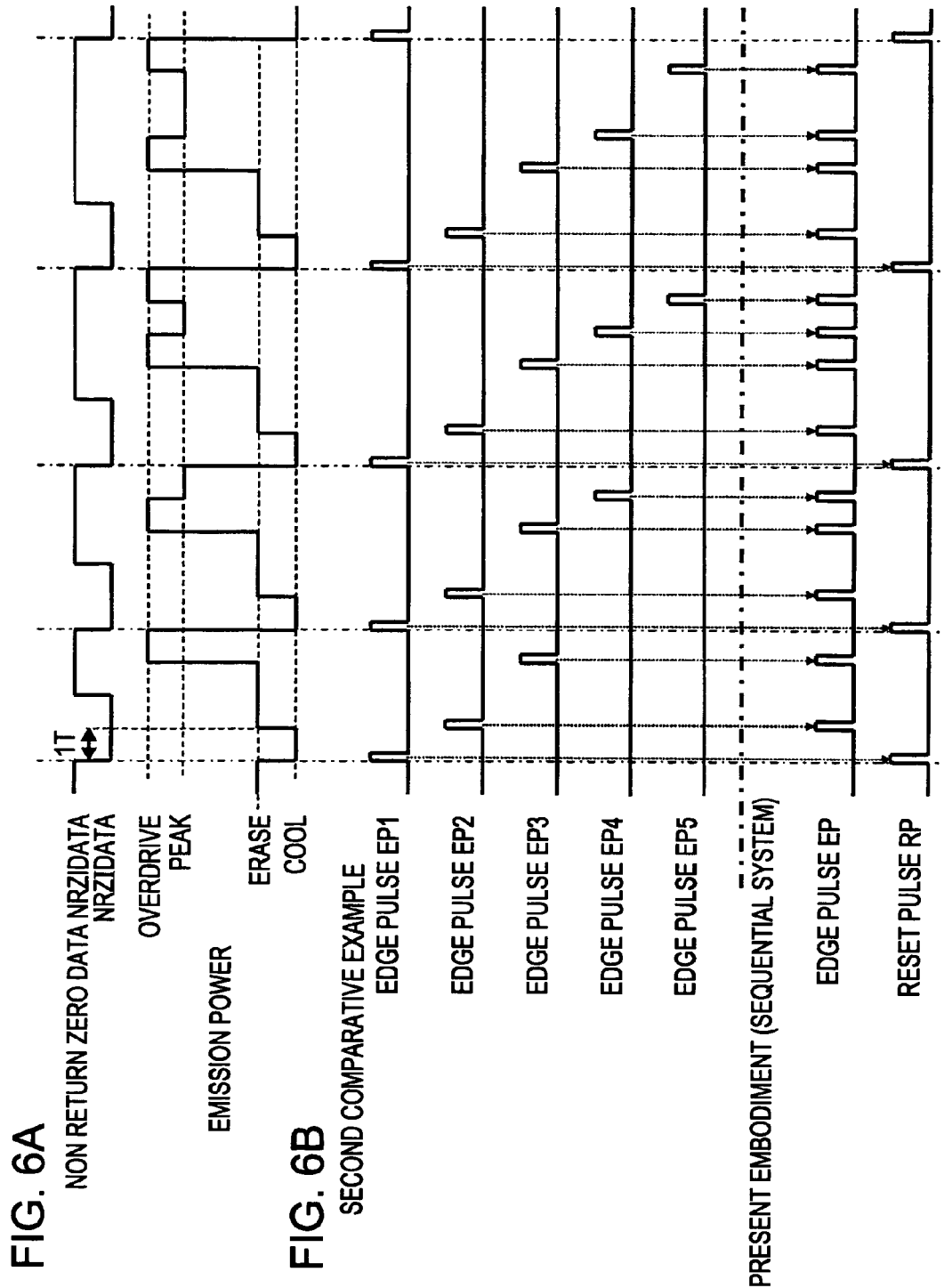

SEQUENTIAL ACCESS MEMORY WITH RESET FUNCTION

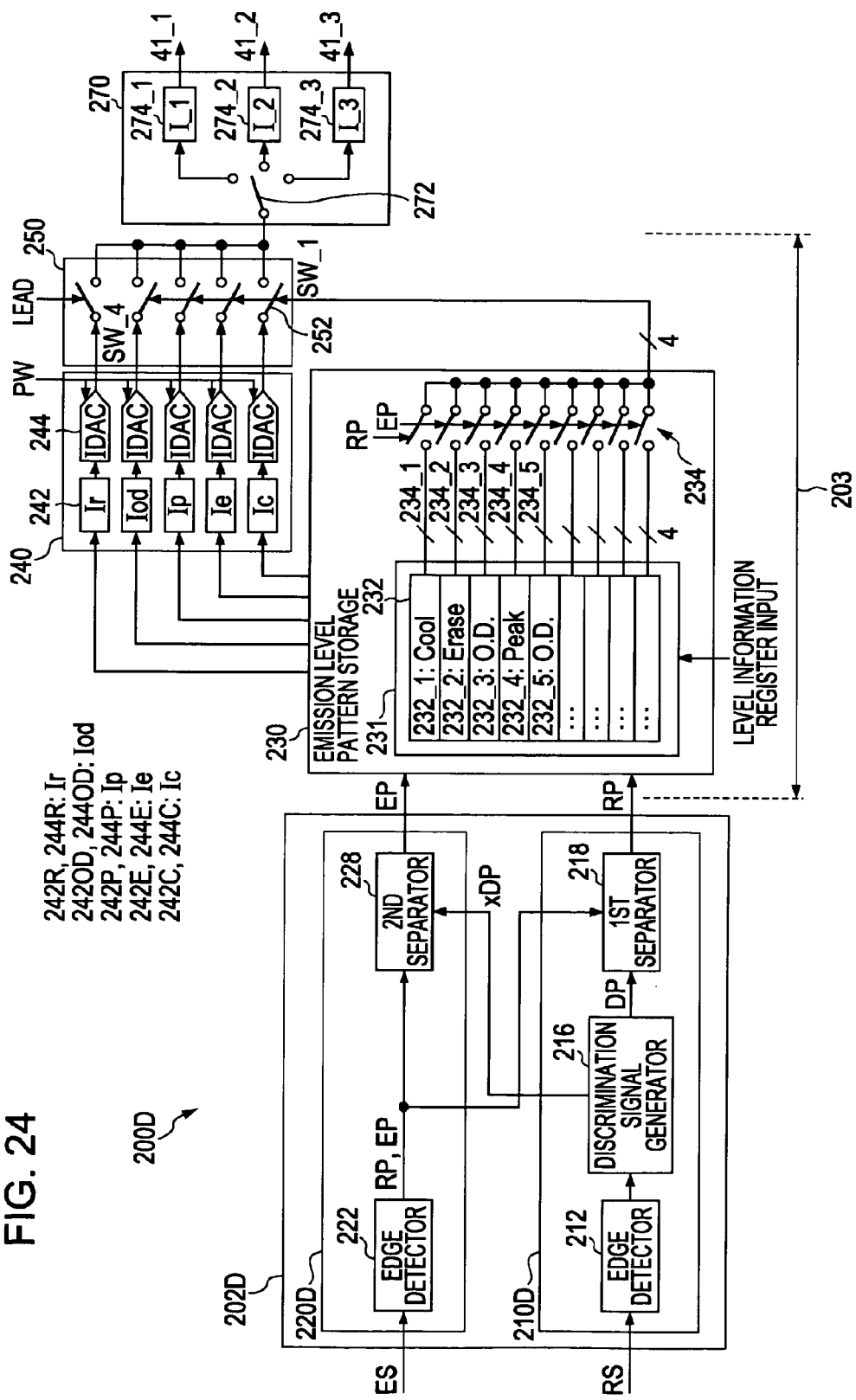

LASER DRIVING DEVICE AND OPTICAL APPARATUS

BACKGROUND OF THE INVENTION

1. Field of the Invention

The present invention relates to a laser driving device (laser driving circuit) and an optical apparatus such as an optical disc apparatus using such a laser driving device (a recording apparatus using an optical disc).

2. Description of the Related Art

A recording/reproducing apparatus using a laser as an optical source has been used in various fields. For example, optical disc recording/reproducing apparatus (hereinafter, only referred to as an optical disc apparatus) has been attracting attention.

As a laser used as a light source, a semiconductor laser using a semiconductor material has been widely used for various kinds of devices in recent years. This is because it is very small and responses to driving current at high speed.

As a writable optical disc to be used as a medium for recording or reproducing data, a phase-change optical disc, a magnetic optical disc, and so on have been widely known in the art. These optical discs perform recording, reproducing, and erasing operations by changing the strength of irradiating laser beams. Usually, when recording information on an optical disc, a so-called optical strength modulation system that forms marks and spaces by a change in intensity of a laser beam. In the recording operation, the optical disc may receive the irradiation of a laser beam at a high peak intensity as much as 30 mW or more. In the reproducing operation, the optical disc may receive the irradiation of a laser beam at an intensity lower than that of the recording operation (e.g., 1 mW) to read the information without destroying recording marks.

Mark edge recording, which uses changes at both ends of a recording mark, has become mainstream because of superiority thereof for achieving higher density of a recent writable optical disk. In the mark edge recording, however, a data error may occur by distortion in the shape of the mark. As a technique for preventing data errors due to the mark shape distortion in the mark edge recording, a write strategy technique in which recording power is modulated into multi-leveled power by pulse division (see, for example, Japanese Published Patent Application No. 2007-141406 and "Industry-leading levels of low noise and high response: Clear a wall of achieving a technology of Blu-ray with 8× speed recording/reproduction", CX-PAL Semiconductor & Component News No. 74 (October, 2007) published by Sony Corp. (URL:http://www.sony.co.jp/Products/SC-HP/cx pal/vol74/pdf/featuring2 bd.pdf)).

SUMMARY OF THE INVENTION

The optical apparatus includes a pickup section (a movable part) and a signal control system (a fixed part). In general, a laser driving part is arranged near a semiconductor layer mounted on the pickup and includes a laser driving system connected to the signal control system, via a flexible printed circuit board.

Usually, a light strategy circuit is mounted on the signal control system (the fixed part) and transmits emission-timing signals of the respective power levels to the pickup via the flexible substrate.

In the case of such a configuration of the light strategy circuit, the frequency of an emission-timing signal transmitted via the flexible substrate increases as a recording speed increases. At this time, the flexible substrate restricts a transmission band, so that the intervals of emission-timing signals will be hardly transmitted correctly, preventing an increase in recording speed. Furthermore, the write strategy tends to be complicated to realize high density and high speed recording. A decrease in divided pulse width or an increase in number of power levels has been demanded in addition to an increase in transmission rate.

In the configuration of the related-art optical apparatus, more the number of power levels increases, more the number of lines for laser drive control. Similarly, the flexible substrate increases in size. In other words, it may result in a decrease in transmission band due to an ensured arrangement space of the flexible substrate and the length of a routed wiring.

In consideration of the above problem, it is desirable to provide a laser driving device and an optical apparatus provided with such a laser driving device which will solve the above problems of a decrease in number of transmitted signals and a decrease in transmission band when a write strategy technology is applied.

First, the laser driving device/optical apparatus according to any embodiment of the present invention are configured as flows: Signal patterns for recording-waveform control is stored in a storage in advance. The signal patterns for recording-waveform control represent level information with respect to each of driving signals divided for driving a laser element in response to a plurality of divided driving signals with respect to one space and one mark.

In the laser driving device/optical apparatus, a pulse generator generates a reference pulse and a switching pulse based on a first transmission signal and a second transmission signal. Here, the first transmission signal includes information for defining the timing of acquiring a reference pulse that represents the timing of switching a repetition of spaces and marks. The second transmission signal includes information for defining the timing of acquiring a switch pulse that represents the timing of switching divided driving signals.

In the laser driving device/optical apparatus, subsequently, reference level information which is level information corresponding to a reference pulse position is read out every reference pulse among pieces of level information about the respective divided signals stored in the storage unit.

In the laser driving device/optical apparatus, furthermore, other level information subsequent to the reference level information is read out one by one every switching pulse.

The laser driving device/optical apparatus may perform a process of storing signal patterns for recording-waveform control in a storage using the write strategy technology. Two different signals are used to generate a reference pulse and a switch pulse. Reference level information is read at the timing of a reference pulse. The remaining pieces of level information are read out one by one every switching pulse. Therefore, the process is provided as a simple process including power level information sequentially stored in signal patterns for recording-waveform control in a storage unit. Every time a reference material is acquired, reference level information is read out from the head of the reference pulse. Then, every time a switching pulse is acquired, each piece of other level information is read out every switching pulse. Since the number of types of transmitting signals is small, a problem of the decreased number of signals transmitted and the decreased transmission bandwidth are solved. In addition, this is because any trouble due to the space of signal wiring lines and the length of routed wiring is eased.

BRIEF DESCRIPTION OF THE DRAWINGS

FIG. 4 illustrates different comparative examples of a signal interface technique when a semiconductor laser is driven by applying the write strategy technique, where

FIG. 6 is a diagram illustrating the basic principle of the laser driving system applied with the write strategy technology in the optical apparatus according the embodiment of the present invention, where FIG. 6A and FIG. 6B illustrate signal pulses of the second comparative example and the present embodiment and FIG. 6C illustrates a sequential access memory with a reset function;

FIG. 7 is a diagram illustrating an exemplary configuration of a transmission signal generator of the first embodiment, where

FIG. 9 is a diagram illustrating the relationship between electric current switches and storage information in a memory circuit (an emission level pattern storage) used in the laser driving circuit of the first embodiment, wherein

FIG. 13 is a diagram illustrating an exemplary configuration of a transmission signal generator of a second embodiment of the present invention, where

FIG. 18 is a diagram illustrating an exemplary configuration of a transmission signal generator of a third embodiment, where

FIG. 23 is a diagram illustrating an exemplary configuration of a transmission signal generator of a fourth embodiment, where

FIG. 24 is a diagram illustrating a laser driving circuit that realizes the laser driving system of the fourth embodiment;

FIG. 28 is a diagram illustrating an exemplary configuration of a transmission signal generator of a fifth embodiment, where

FIG. 33 is a diagram illustrating an exemplary configuration of a transmission signal generator of a third embodiment, where

DESCRIPTION OF THE PREFERRED EMBODIMENTS

Figure 1:
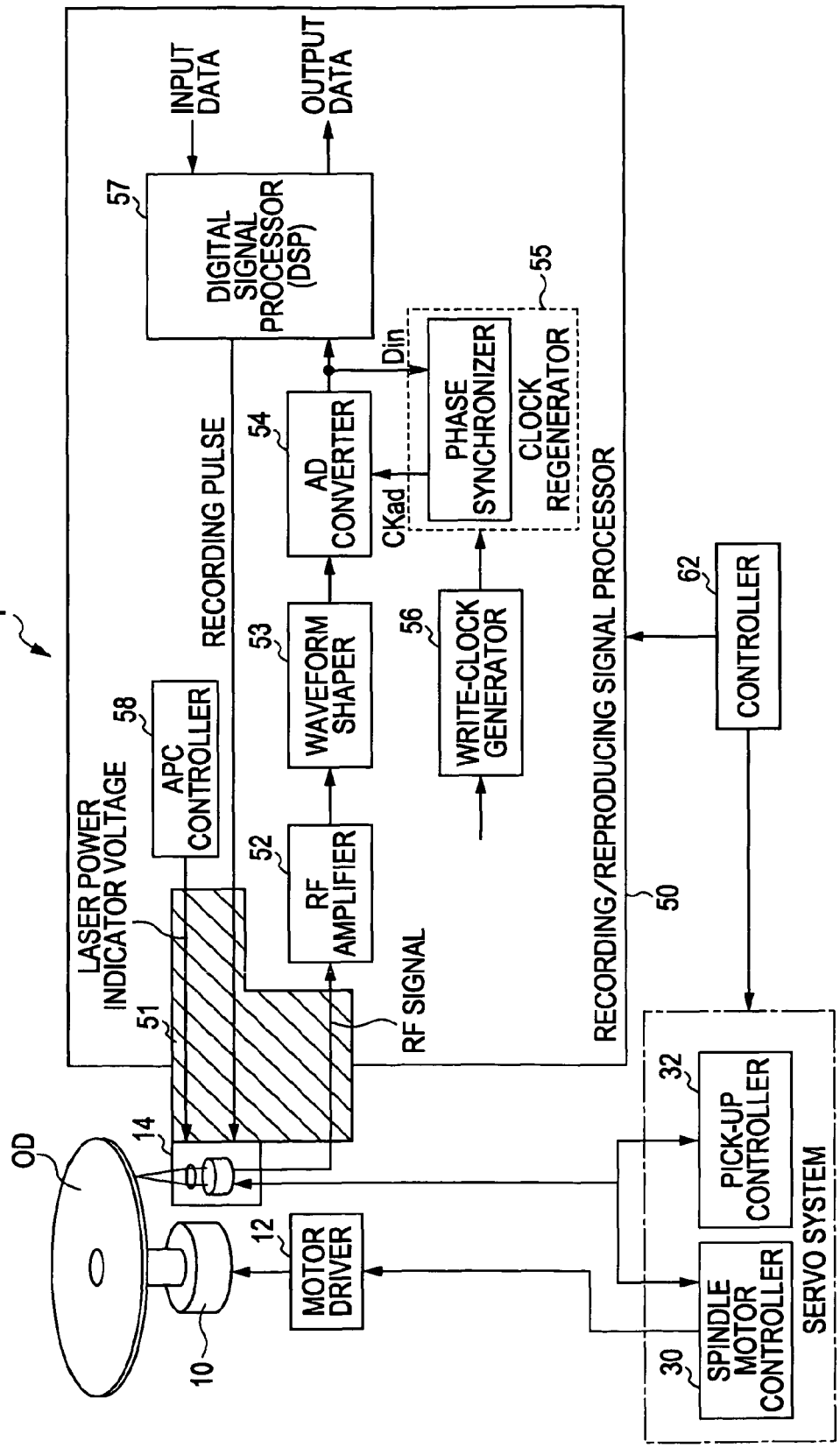
FIG. 1 is a diagram illustrating an exemplary configuration of a recording/reproducing apparatus as an example of an optical apparatus according an embodiment of the present invention.

Hereinafter, embodiments of the present invention will be described with reference to the drawings. In the following description, capital letters, such as A, B, and C will be attached to the reference numerals of the respective functional components when each of the functional components will be distinctly described for each of embodiments of the present invention. Alternatively, such capital letters may be omitted if there is no need of distinction. The drawings will be also illustrated by such a manner. Hereinafter, the description will be performed in the following order:

1. Outline of the configuration of recording/reproducing apparatus;
2. Principles of troubles in laser driving system and countermeasure thereof;
3. First embodiment (one reset signal RS and one edge signal ES);
4. Second embodiment (one reset signal RS and two edge signals ES);
5. Third embodiment (two reset signals RS and one edge signals);
6. Fourth embodiment (first embodiment+measures against skew);
7. Fifth embodiment (second embodiment+measures against skew);
8. Sixth embodiment (third embodiment+measures against skew);
9. 9. Seventh embodiment (decoder is additionally arranged between memory and current switch); and
10. Eighth embodiment (current level information of memory is sequentially selected and any currents with is not placed).

<Recording/Reproducing Apparatus>

FIG. 1 is an exemplary configuration of a recording/reproducing apparatus (an optical disc apparatus) as an example of the optical apparatus according to an embodiment of the present invention. FIG. 1A is a diagram illustrating an exemplary configuration of an optical pickup.

Examples of an optical disc (OD) include so-called read-only optical discs such as a compact disc (CD) and a compact disc read only memory (CD-ROM), a write-once optical disc such as a compact disc recordable (CD-R), and a rewritable optical disc such as a compact disc rewritable (CD-RW). Furthermore, the optical disc is not limited to any of these CD-type optical discs. Alternatively, it may be a magneto optical disc (MO) or it may be a digital video or versatile disc (DVD) type optical disc such as a usual DVD or a next-generation DVD using a blue laser with a wavelength-of approximately 405 nm. It may be so-called double-density CD (DDCD; DD Double Density), CD-R, or CD-RW having a doubled density of present formatting while following the existing CD format.

A recording/reproducing apparatus 1 of this embodiment includes an optical pickup 14 and a pickup control unit 32. The optical pickup 14 records or reproduces information on or from an optical disc OD. The optical pickup 14 is under the control of a pickup controller 32. The position of a laser beam emitted from the optical pickup 14 is controlled in the radial direction (tracking servo) and in the focal direction (focus servo) with respect to the optical disc OD.

The recording/reproducing apparatus 1 includes a spindle motor 10, a motor driver 12, and a spindle motor controller 30 as a roll control section (rotation servo system), which constitute a rotation controller (a rotation servo system). The spindle motor 10 rotates the optical disc OD and the rotation number thereof is under the control of the spindle motor controller 30.

The recording/reproducing apparatus 1 includes a recording/reproducing signal processor 50 which is provided as an exemplary combination of an information recoding part for information recording via the optical pickup 14 and an information reproducing part for reproduction of information stored in the optical disc OD. The recording/reproducing signal processor 50 and the optical pickup 14 are connected to each other via a signal wiring pattern formed on a flexible substrate 51. Here, the flexible substrate 51 is provided as an example of a transmission component for transmitting signals. In addition, the full length of the flexible substrate 51 may be almost 100 mm but varies depending on the arrangements of the recording/reproducing processor 50 and the optical pickup 14.

The recording/reproducing apparatus 1 further includes a controller 62, an interface unit (not shown) responsible for an interfacing function, and so on, which form a controller system. The controller 62 includes a microprocesser (a micro processing unit; MPU) and controls the operation of the servo system including spindle motor controller 30 and the pickup controller 32 and the operation of the recording/reproducing processer 50. The interface unit (not shown) is provided as an interface (connection) that enables the communication between the recording/reproducing apparatus 1 and a personal computer (PC) (not shown). The PC is an example of an information processing apparatus (a host apparatus) that carries out various kinds of information processing using the recording/reproducing apparatus 1. The interface unit is provided with a host IF controller. Therefore, an information recording/reproducing system (an optical disc system) includes the recording/reproducing apparatus 1 and the PC.

[Optical Pickup]

Figure 2:
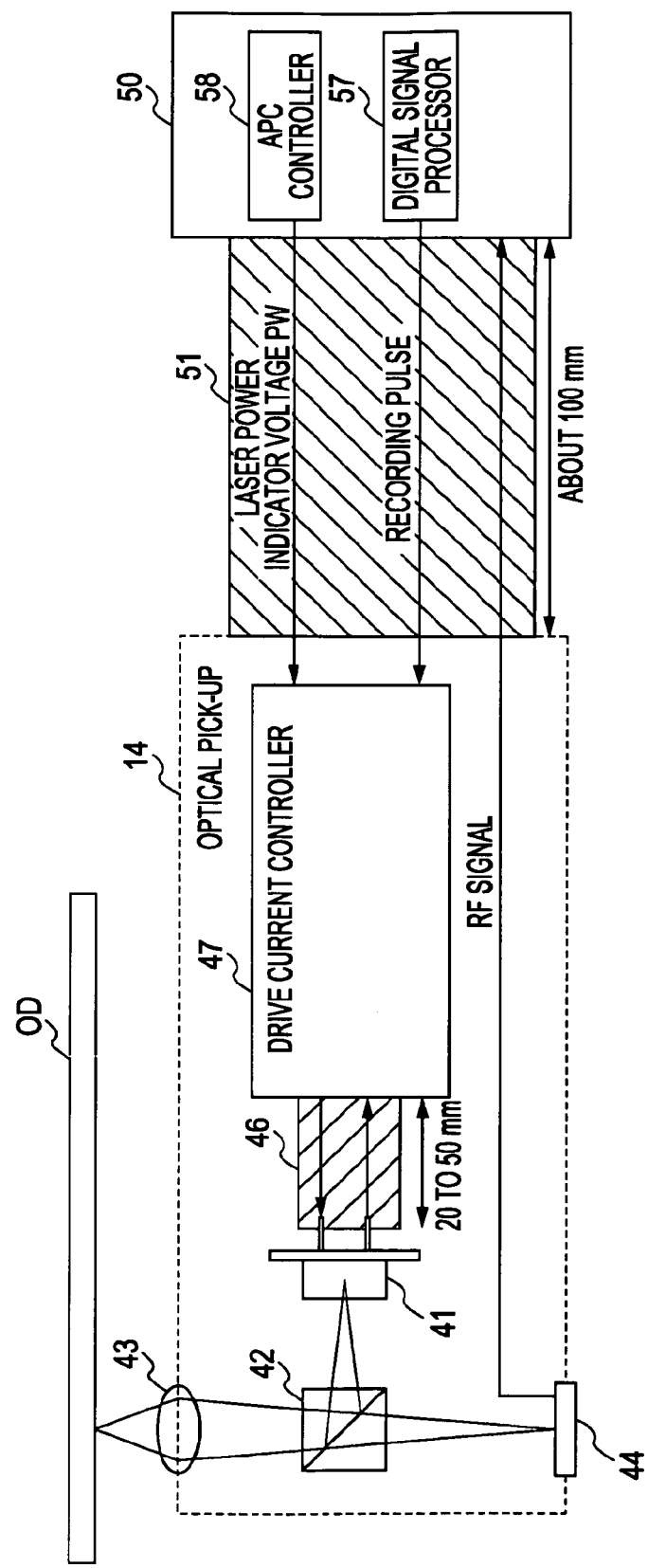
FIG. 2 is a diagram illustrating an exemplary configuration of an optical pickup of the recording/reproducing apparatus.

As shown in FIG. 2, the optical pickup 14 includes a semiconductor laser 41, a prism 42, a lens 43, an optical detector 44, and a driving current controller 47 provided as an example of a laser driving device. The semiconductor laser 41 emits a laser beam for recording additional information on the optical disc OD or reading information stored in the optical disc OD. The prism 42 reflects the laser beam from the semiconductor laser 41 to a lens 43 and leads reading light (reflected light) to the optical detector 44. The lens 43 concentrates the reflected laser beam on the optical disc CD or leads the reading light from the optical disc OC to the prism 42. The optical detector 44 converts the reading light into an electric signal. The driving current controller 47 may be a laser-driving integral circuit (IC) or the like.

The semiconductor laser 41 and the driving circuit controller 47 are connected to each other, for example, via a signal wiring pattern formed on the flexible substrate 46.

[Recording/Signal Processor]

The recording/reproducing signal processor 50 includes a RF amplifier, s waveform shaper 53 (a waveform equalizer), and an analog-to-digital (AD) converter 54 (ADC). In addition, the recording/reproducing signal processor 50 further includes a clock regenerator 55, a write-clock generator 56, a digital signal processor (DSP) 57, and an automatic power controller (an APC controller) 58.

The RF amplifier 52 amplifies a minute RF (high frequency) signal (reproducing RF signal) read by the optical pickup 14 to a predetermined level. The waveform shaper 53 shapes a reproducing RF signal output from the RF amplifier 52. The AD converter 54 converts the analog reproducing RF signal into digital reproducing RF data Din.

The clock regenerator 55 includes a data-recovery type phase synchronization circuit (PLL circuit) that generates a synchronized clock signal to the regenerating RF data Din output from the AD converter 54. In addition, the clock regenerator 55 supplies a reproduced clock signal as a AD clock Ckad (a sampling clock) to an AD converter 54 and other functional parts.

For example, the digital signal processor 57 includes a data detector and a data demodulator which are provided as functional sections for data reproduction. The data detector performs a signal processing process known as partial response maximum likelihood (PRML) or the like to detect digital data from the reproducing RF data Din. The data demodulator restores to a digital data sequence and carries out digital signal processing of decrypting digital audio data, digital image data, and so on. For example, the data demodulator includes a demodulating section, an error-correcting code (ECC) correcting section, and an address decode section to carry out demodulation/ECC correction and address decode. Then, the modulated data is transmitted to the host device via the interface unit.

The write-clock generator 56 generates a write clock for modulating data when writing data on the optical disc OD with reference to a reference clock supplied from a crystal oscillator or the like. The digital signal processor 57 includes an ECC encode section and a modulation section as functional sections for data recording. This digital signal processor 57 generates recorded data and also generates a light-emitting timing signal of each power level according to a write strategy.

Here, the recording/reproducing apparatus 1 of this embodiment of the present invention records on the optical disc OD digital data output from an information source by a laser beam irradiated from the semiconductor laser 41. Therefore, the driving current controller 47 generates a recording waveform by combining a recording pulse based on the write strategy and a laser power indicator voltage PW for APC control and then amplifies a recording waveform to drive the semiconductor laser 41. The APC controller 58 of the recording/reproducing signal processor 50 has a function of adjusting the emission power of the semiconductor laser 41 to a constant level and supplies the laser power indicator voltage PW to the optical pickup 14.

<Problem of Laser Drive System, and Principles of Measures Against Such Problems>

Figure 3:
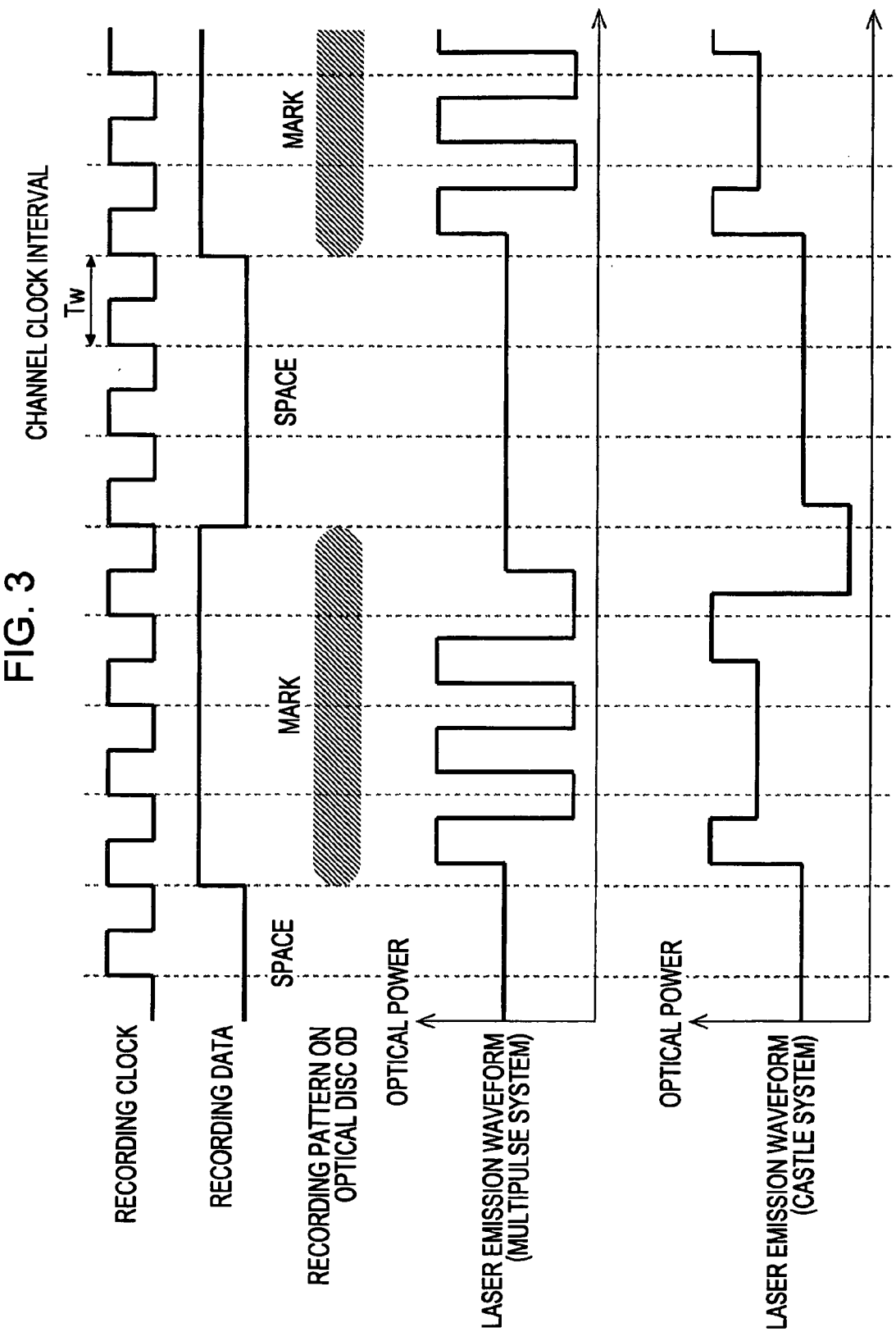
FIG. 3 is a diagram illustrating an example of a laser driving system applied with a write strategy technology.
Figure 4A:
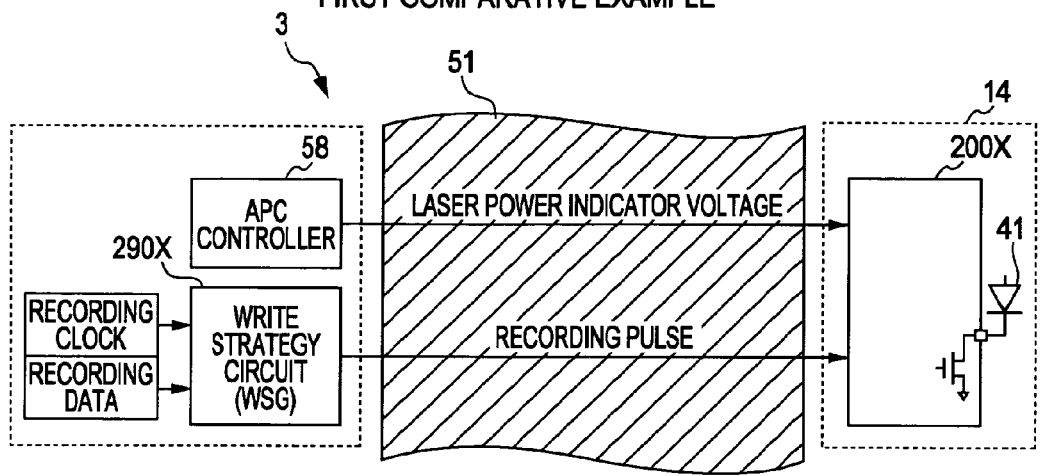
FIG. 4A is a diagram illustrating a first comparative example and FIG. 4B is a diagram illustrating a second comparative example.
Figure 4B:
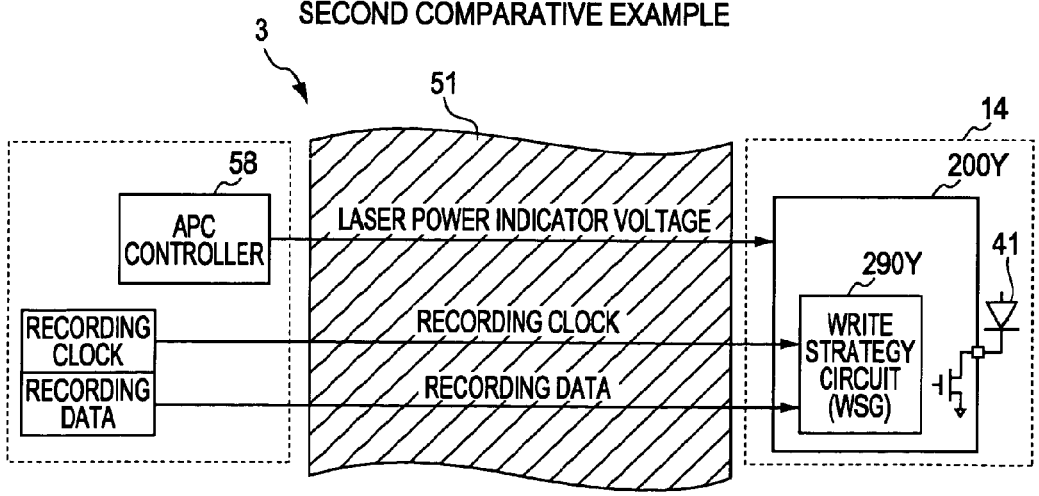
Figure 5:
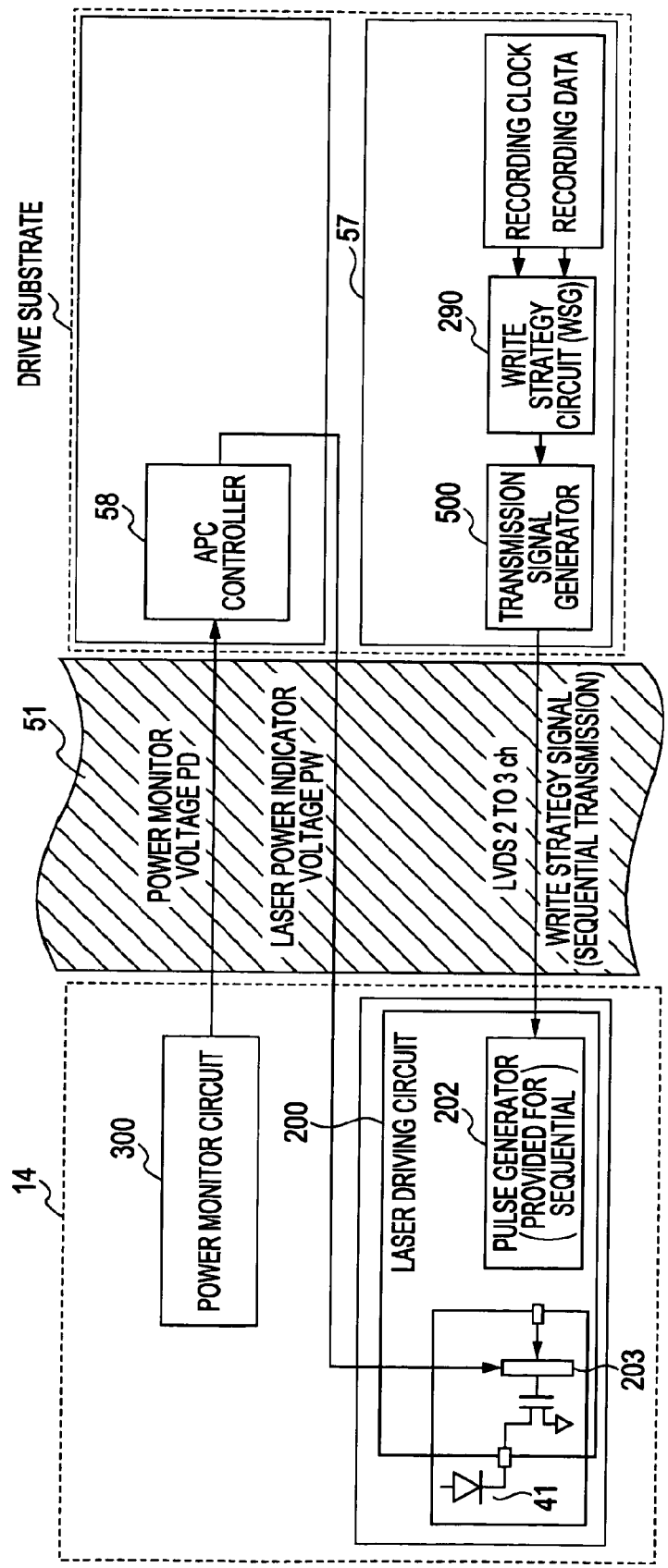
FIG. 5 is a diagram illustrating the configuration of a system that realizes the signal interface system in the optical apparatus according the embodiment of the present invention.

Referring now to FIG. 3 to FIG. 6, the problems of a laser driving system and the basic principles of measures against such problems will be described. Here, FIG. 3 is a diagram illustrating an example of a laser driving system applied with a write strategy technology. FIG. 4 illustrates different comparative examples of a signal interface technique when the semiconductor laser 41 is driven by applying the write strategy technique of a laser driving system applied with a write strategy technique, where FIG. 4A is a diagram illustrating a first comparative example and FIG. 4B is a diagram illustrating a second comparative example. FIG. 5 is a diagram illustrating the configuration of a system that realizes the signal interface system of the present embodiment. FIG. 6 is a diagram illustrating the basic principle of the laser driving system applied with the write strategy technology in accordance with the present embodiment.

An optical disc recording system is a so-called optical strength modulation system forming marks and spaces on an optical disc medium by changing the intensity of optical power when recording the information on such a recording medium. To carry out recording with less errors, the intensity of optical power is varied using a waveform such as one shown in FIG. 3 but not using recoded data itself.

A multi-pulse system divides a recording clock into plurality of clocks for pulsed emission. In this example, the waveform has three power levels. A castle system is mainly used in high double-speed recording and increases the level of laser power at the head and last of a mark without pulsed emission in units of a recording clock. In this example, the castle system has four power levels, or more power levels than the multi-pulse system.

In addition, the timing of each edge is adjusted so as to be shorter than the interval of channel clocks (Tw). For example, the timing of each edge is Tw/40, Tw/32, Tw/16, or the like. Such modification of emission patterns is referred to as recording compensation (write strategy technology) and a recording compensation circuit (a write strategy circuit) is provided for generating the timing of each edge depending on the recorded data.

On the other hand, the laser driving system 3 of the optical disc apparatus has two separated units, for example as shown in FIG. 4, an optical pickup 14 (optical head) on which a semiconductor layer 41 and optical components are mounted and a drive substrate 50 on which control circuits are mounted. The optical pickup 14 is designed to be moved depending on the radius of an optical disc OD, so that they are connected to each other via a flexible substrate 51.

Here, the first comparative example shown in FIG. 4A, a write strategy circuit 290X is mounted on the drive substrate 50. In this case, the drive circuit 50 sends a recording pulse signal and a laser power indicator voltage PW to a laser driving circuit 200X (a laser driving IC) on which the optical pickup is mounted 14. Here, the recording pulse signal is provided for instructing a emission timing corresponding to each of power levels. The laser driving circuit 200X generates a driving current to allow the semiconductor laser 41 to emit a laser beam. The recording pulse signal transmitted from the write strategy circuit 290X includes information about a timing shorter than a channel clock and has the following problems involved in an improvement in recording speed in recent years. That is, a first problem is that the number of transmission channels increases as the power level increases. A second problem is that the correct transmission of a recording pulse signal may be difficult because of a frequency characteristic (a transmission band) attributed to the flexible substrate 51. These problems may cause incorrect transmission of the intervals of recording pulse signals and prevents an improvement in recording speed.

On the other hand, in the second comparative example shown in FIG. 4B, a write strategy circuit 290Y is mounted on a laser driving circuit 200Y instead of a driving substrate 50. The write strategy circuit 290Y generates a timing signal for controlling optical power from a recording clock and recording data. The unit of the timing signal is smaller than that of the interval of channel clocks (Tw) and is then generated for each power level, resulting in a one-to-one correspondence between the power level and the timing (see FIG. 6A). The write strategy circuit 290Y for realizing the one-to-one correspondence between the power level and the timing includes a phase synchronization circuit, a memory, an address encoder, and a timing generating circuit. The phase synchronization circuit generates a multiphase clock for generating a unit smaller than the channel clock interval (Tw). The memory stores level information. The address encoder discriminates record data length and generates a memory address. The timing generating circuit converts timing information read from a memory into a timing signal according to the length of recorded data.

In such a configuration of the second comparative example, signals transmitted by the flexible substrate 51 are converted into recorded cocks and recorded data. Since each of them is a signal in units of channel clocks, the transmission characteristics of the flexible substrate 51 hardly affect on the signals, so that the problems of the first comparative example will be dissolved. It is hard to be influenced by a transmission characteristic in flexible substrate 51, and a problem in the 1st comparative example is canceled. However, since the write strategy circuit 290Y includes the phase synchronization circuit, the memory, the address encoder, and the timing generating circuit, the laser driving circuit 200Y becomes large in size and causes an increase in electric power consumption. In addition, other disadvantages such as heat generation may occur. Therefore, the laser driving system 3 of the present embodiment is designed to overcome problems with respect to the number of transmission channels and the transmission bands without causing an increase in circuit size of the laser driving circuit as much as that of the second comparative example. First, in other words, the basic idea of the present embodiment is that the power level information of laser emission at each timing (signal patterns for recording-waveform control) is stored in advance.

In addition, a first transmission signal and a second transmission signal are used. Here, the first transmission signal contains information defines the timing of acquiring a reference pulse that represents the timing of switching spaces and marks. The second transmission signal contains information defines the timing of acquiring a switch pulse of a switch pulse that represents the timing of switching laser emission levels. The first and second transmission signals are treated as recording pulses shown in FIG. 1 and FIG. 2.

In addition, the reference pulse may be considered as the timing of switching laser emission pulses and also considered as one mode of the switch pulse (see fourth to sixth embodiments of the present invention which will be described later).

Two kinds of pulse signals are used to generate a reference pulse and a plurality of switch pulses. The reference pulse sets the emission power to an initial level of the pattern of a recording waveform control signal. Subsequently, the emission power levels to which the write strategy technology are switched every reference pulse on the basis of the recording waveform control signal pattern. After that, every time a reference pulse is generated, the same procedures are repeated. Hereinafter, such a system will be referred to as a sequential system.

As described herein, unless otherwise specified, each of the embodiments described below employs the castle system for a laser emission waveform. This is because the castle system is common in high speed recording. Alternatively, however, the multi-pulse system may be applied to each of the embodiments described below. The castle system only differs from the multi-pulse system in set values of power levels at respective timing points, while the fact that "the recording power is divided into pulses and converted into multi-levels, followed by being controlled" is common in both the systems.

With respect to the recording system, one of the features of the present embodiment is in that the number of types of signal lines is reduced and signals are then transmitted on the basis of employing the same signal interface system as that of the first comparative example in which the write strategy circuit 290 is arranged on the drive substrate.

That is, as shown in FIG. 5, the drive substrate includes a sequential-compliant transmission signal generator 500 located downstream from the write strategy circuit 290. Transmission signal generator 500 generates both a first transmission signal and a second transmission signal based on write strategy signals (for example, four to five channels) from the write strategy circuit 290. Here, the first transmission signal includes information for defining the timing of acquiring a reference pulse that represents the timing of switching a repetition of spaces and marks. The second transmission signal includes information for defining the timing of acquiring a switch pulse that represents the timing of switching divided driving signals. The transmission signal generator 500 supplies the first and second transmission signals to the laser driving circuit 200 via the flexible substrate 51.

The laser driving circuit 200 on the optical pickup 14 includes a pulse generator 202 fitting to the transmission signal generator 500 of the digital signal processor 57, an emission waveform generator 203, and a power monitor circuit 300. The pulse generator 202 generates both a reference pulse and a switch pulse based on the first and second transmission signals transmitted via the flexible substrate 51. The emission waveform generator 203 generates a current signal with reference to the pattern of recording waveform control signals using the standard pulse and the switch pulse. The power monitor circuit 300 performs a photoelectric conversion of part of a laser beam emitted from the semiconductor laser 41 and then applies sample and hold processing thereto to acquire a power monitor voltage PD as a feedback signal for APC control, followed by sending the feedback signal to the APC control unit 58.

As shown in FIG. 6B, the sequential system of the present embodiment uses a reset signal Rs as a first transmission signal and an edge signal ES as a second transmission signal to generate a reset pulse RP as a reference pulse and an edge pulse ES as a switch pulse.

The first transmission signal (reset signal RS) is a signal that represents the same edge as the first edge (edge pulse EP1 in FIG. 6A) of signal patterns for recording-waveform control in the laser driving circuit 200Y of the second comparative example with the built-in write strategy circuit. The second transmission signal (edge signal ES) is a signal that represents the same edge as that of a combination of other pulses of edge timing (edge pulses EP2, EP3, EP4, and EP5 in FIG. 6A).

Figure 6C:
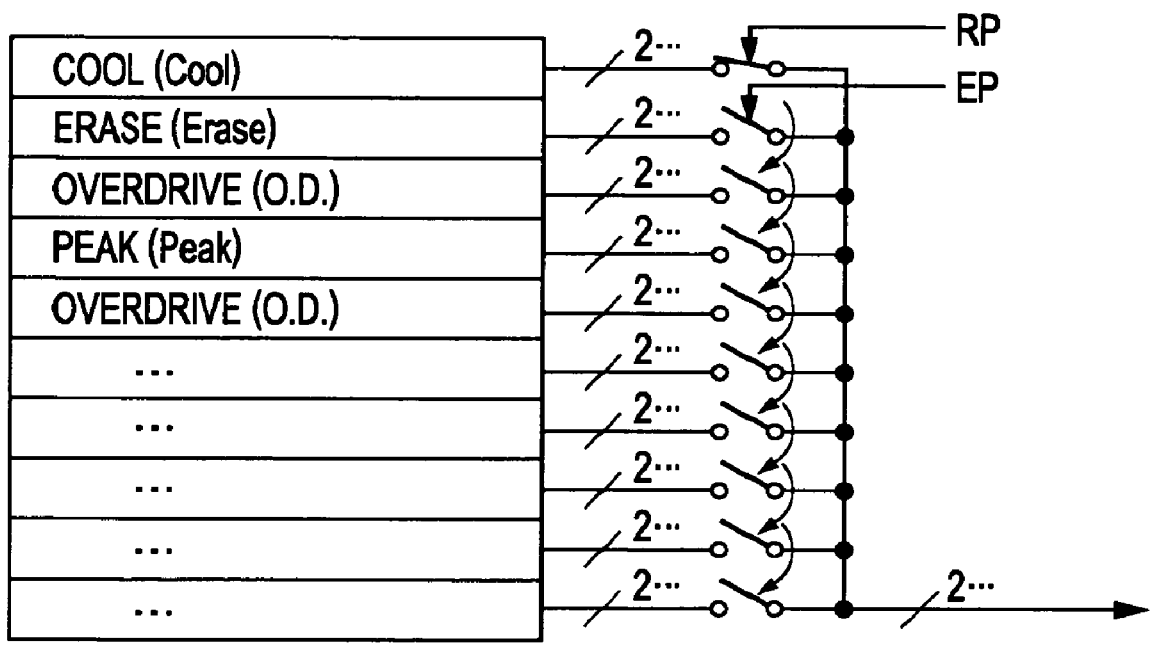
Figure 7A:
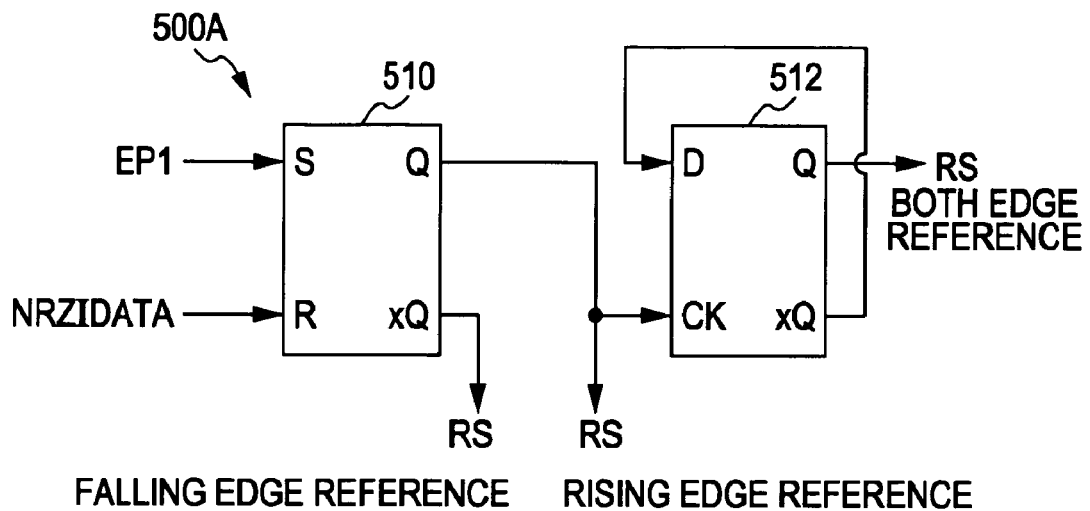
FIG. 7A illustrates a transmission signal generator for reset signals RS and FIG. 7B illustrates a transmission signal generator for edge signals ES.
Figure 7B:
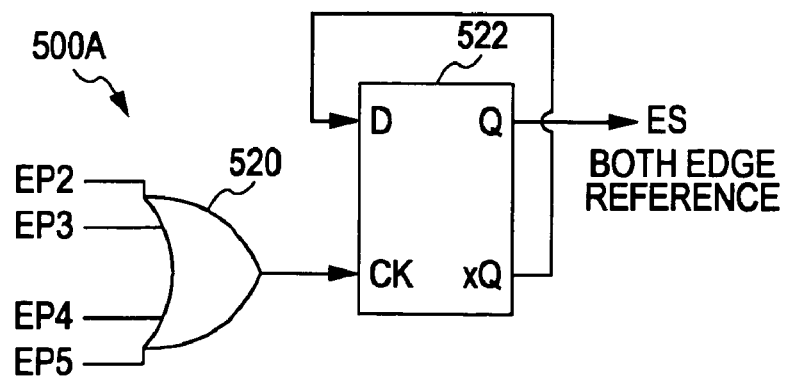

As shown in FIG. 6C, pieces of information about respective emisson power levels representing the signal patterns for recording-waveform control are sequentially stored in respective registers of the memory circuit. The information about a reference power level is read out based on the reset pulse RP. The information about the emission power level at each timing following the information about the reference power level is sequentially read based on the edge pulse EP.

In other words, the laser driving circuit 200 is provided with a sequential access memory with a high-speed operative reset function to retain the respective pieces of power level information in the order of reading. Then, every time a switch pulse (edge pulse EP) is generated, the information about an emission power level is sequentially selected and read from pieces of information subsequent to the information about the reference power level. Furthermore, even if which emission power level is selected, a reset function of a reference pulse (reset pulse RP) allows the reading of the information at the first area (the information about the reference power level) at timing of generating the reference pulse.

Here, among edge pulses EP1 to EP5 that define the signal patterns for recording-waveform control generated in the write strategy circuit 290, the edge pulse EP1 corresponds to the reset pulse RP as shown in FIG. 6B. Then, the transmission signal generator 500 generates a reset signal RS in response to the edge pulse EP1. In addition, each of the edge pulses EP2 to EP5 corresponds to the edge pulse EP. Thus, the transmission signal generator 500 generates an edge signal ES based on the edge pulses EP2 to EP5.

At this time, either an idea of defining the reset pulse RP by one edge of the reset signal RS or an idea of defining the reset pulse RP by both edges thereof may be taken. Similarly, either an idea of defining the edge pulse EP by one edge of the edge signal ES or an idea of defining the edge pulse EP by both edges thereof may be taken. The output frequency of the edge pulse EP increases compared with that of the reset pulse RP. Therefore, regarding at least the edge pulse EP, the present embodiment employs the idea of defining the edge EP by both edges of the edge signal ES. Regarding the reset pulse RP, in contrast, either the idea of defining the reset pulse RP by one edge of the reset signal RS or the idea of defining the reset pulse RP by both edges thereof is taken.

Hereafter, specific embodiments of the present invention will be described with reference to the attached drawings.

Laser Drive System: First Embodiment

Figure 8:
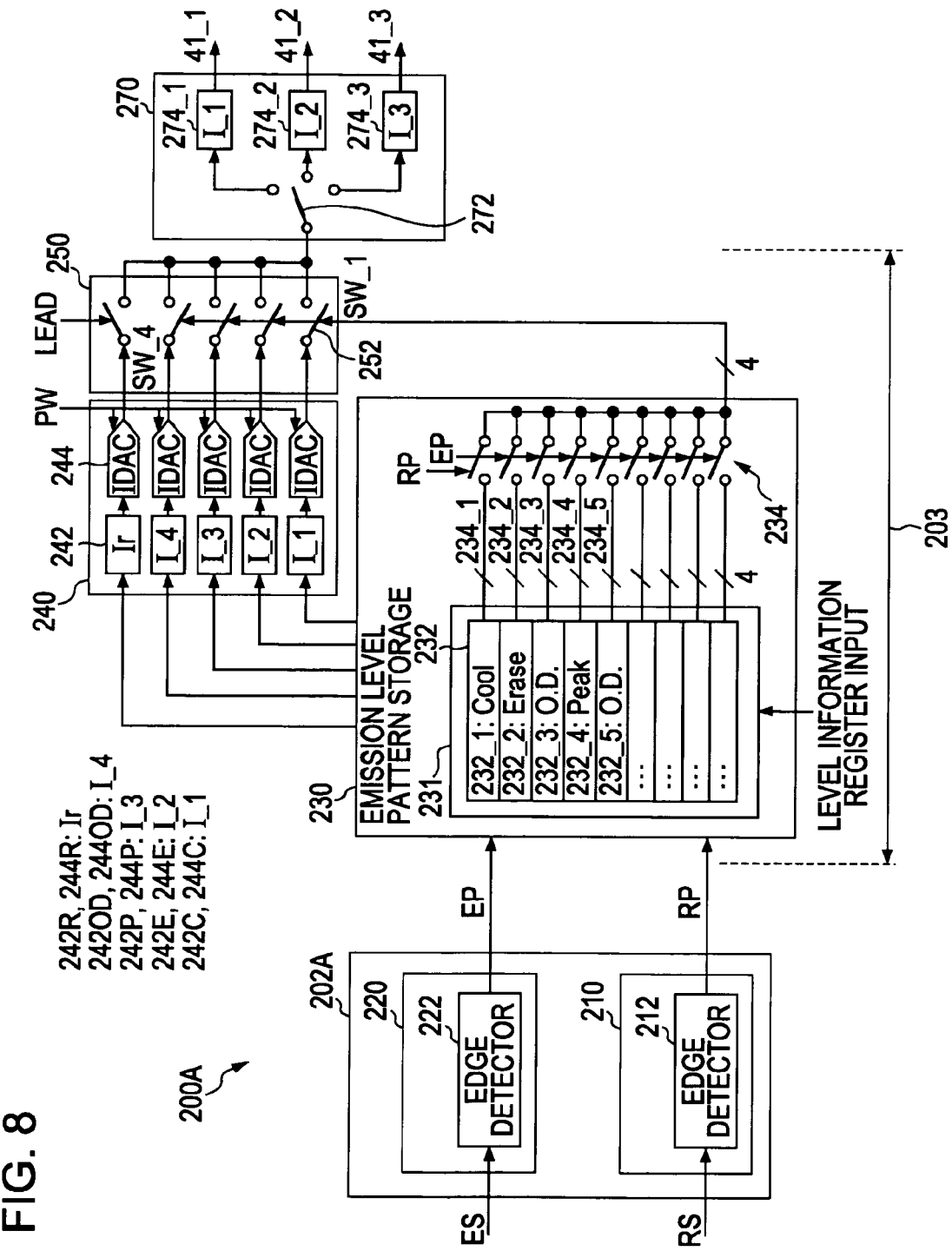
FIG. 8 is a diagram illustrating a laser driving circuit that realizes the laser driving system of the first embodiment.
Figure 9A:
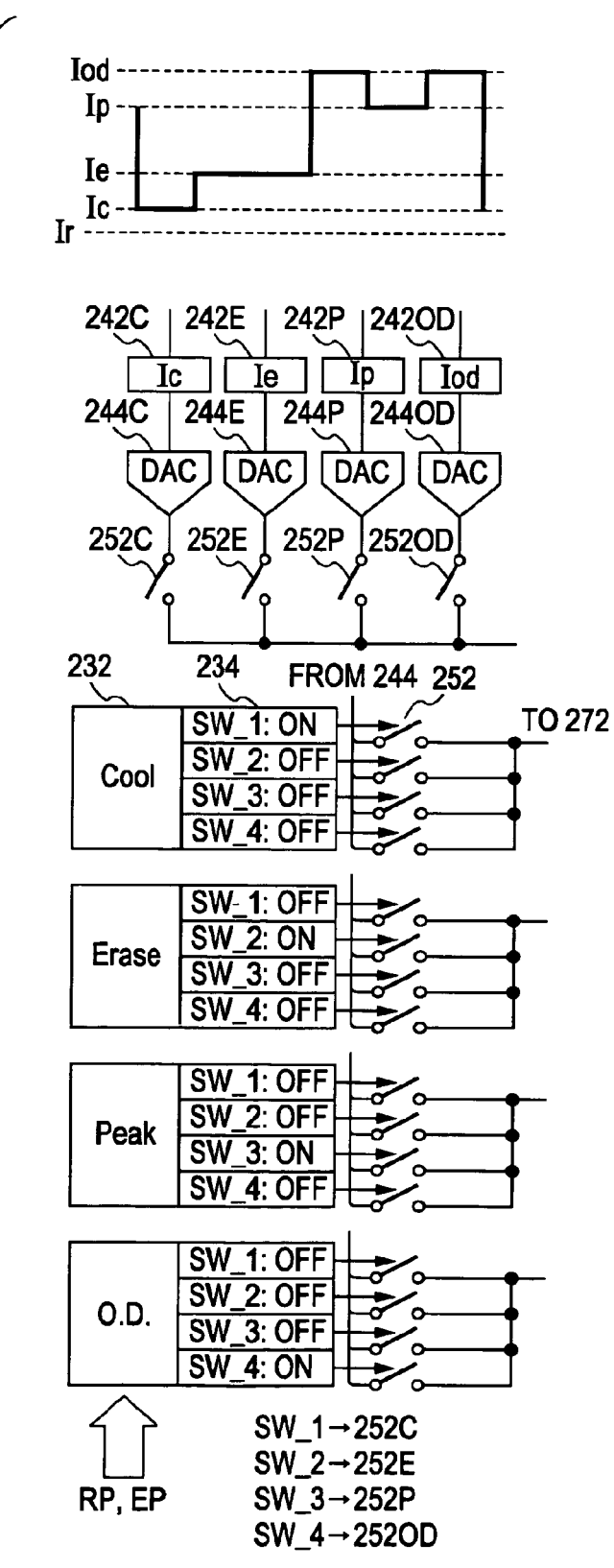
FIGS. 9A and 9B illustrate different examples.
Figure 9B:
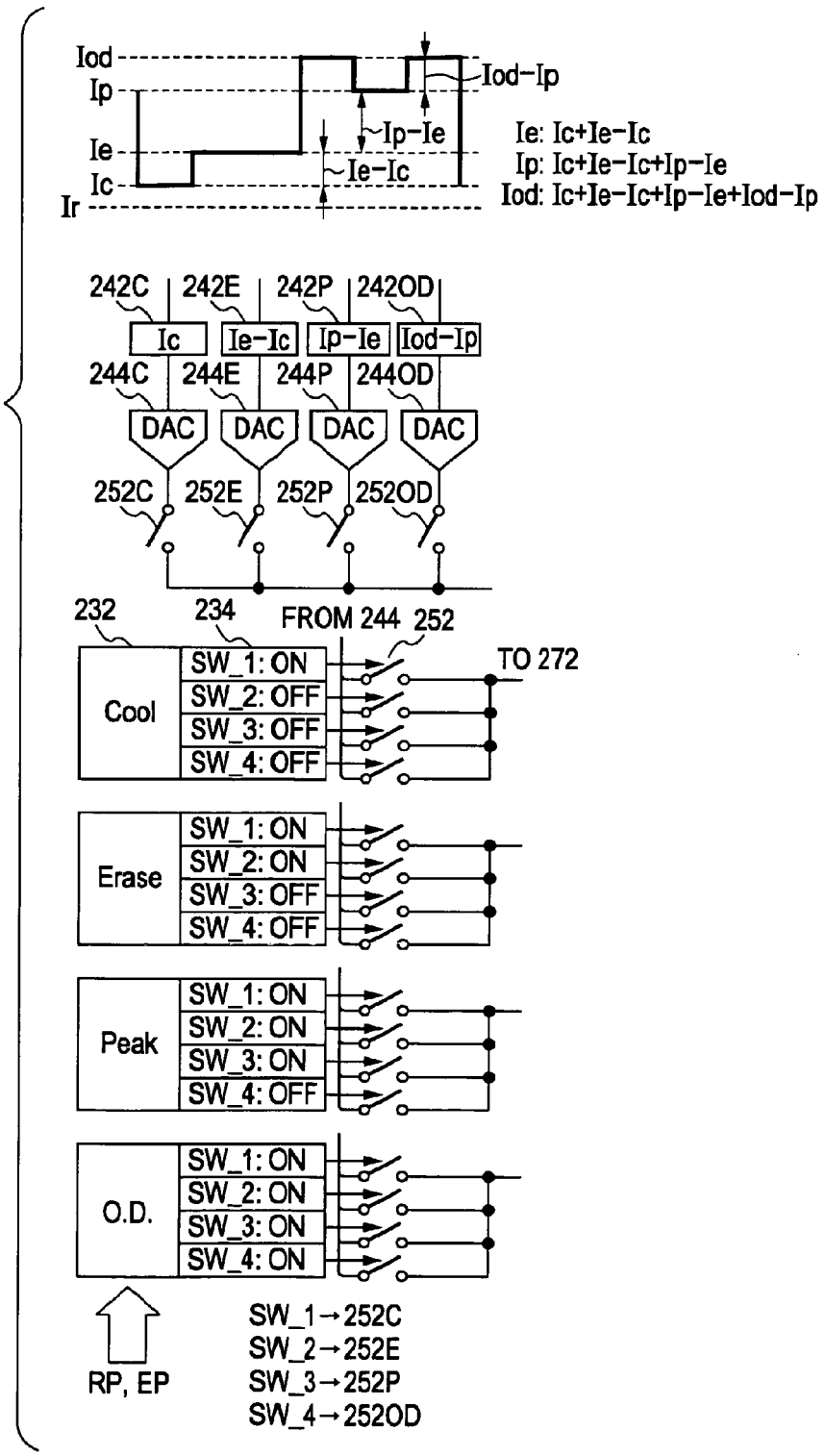
Figure 10:
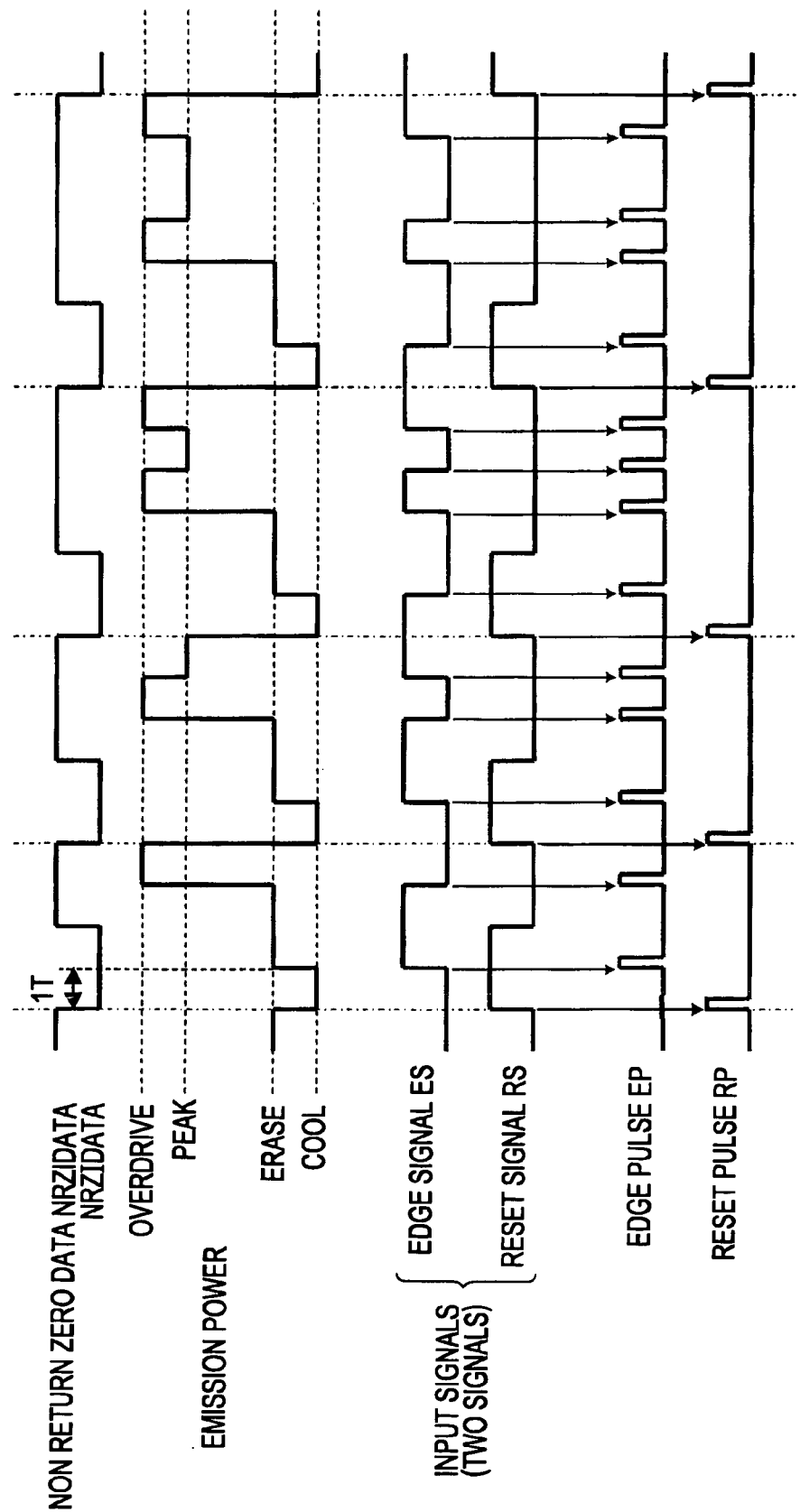
FIG. 10 is a timing chart illustrating the operation of a laser driving circuit of the first embodiment (first example)
Figure 11:
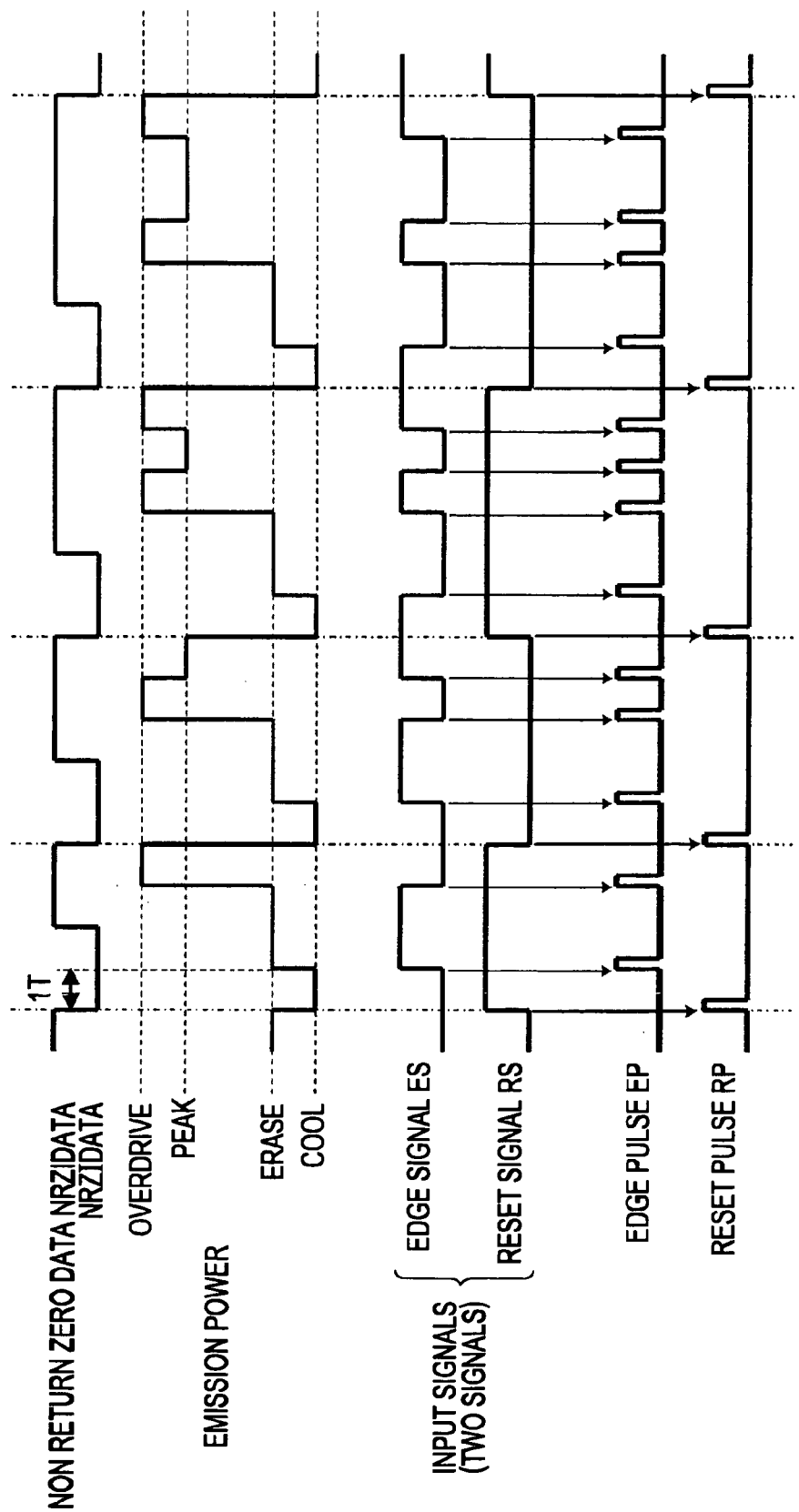
FIG. 11 is a timing chart illustrating the operation of a laser driving circuit of the first embodiment (second example)
Figure 12:
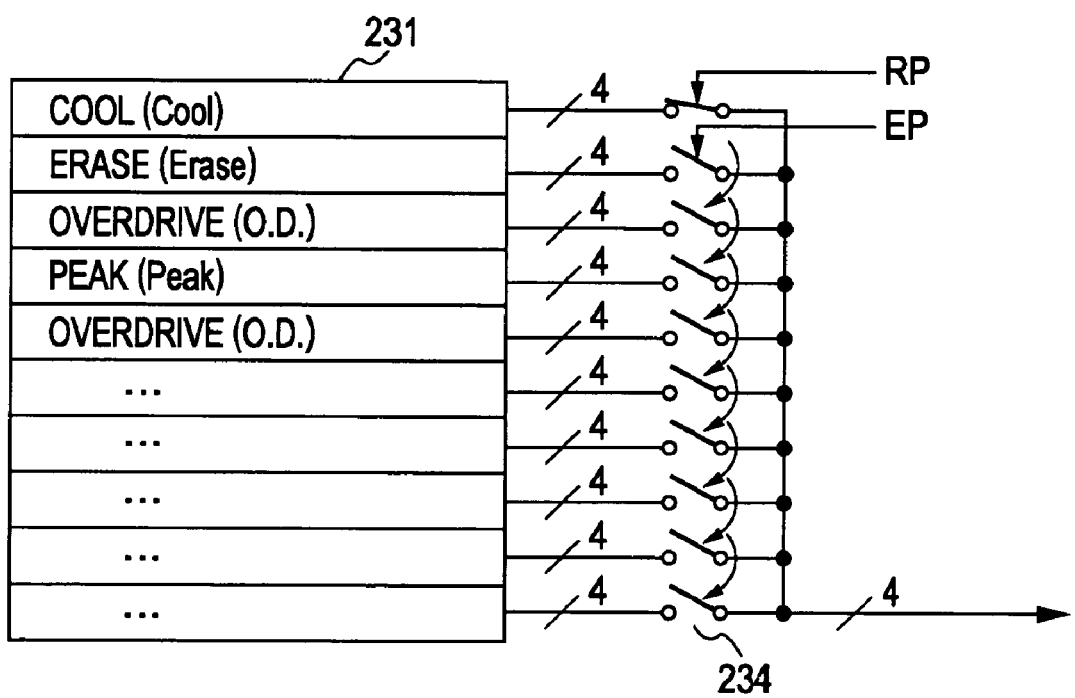
FIG. 12 is a diagram illustrating register-setting information of a memory circuit corresponding to a signal patterns for recording-waveform control shown in FIG. 10 and FIG. 11.

FIG. 7 to FIG. 12 illustrate a laser driving system according to a first embodiment of the present invention. Here, FIG. 7A and FIG. 7B are diagrams illustrating an exemplary configuration of a transmission signal generator 500A of the first embodiment to be used for realizing a sequential system installed in the digital signal processor 57 on the driving substrate. FIG. 8 is a diagram illustrating a laser driving circuit (particularly, corresponding to the driving current controller 47 in FIG. 2) that realizes the laser driving system of the first embodiment. FIG. 9A and FIG. 9B are diagrams illustrating the relationship between electric current switches and storage information in a memory circuit (an emission level pattern storage) used in the laser driving circuit of the first embodiment. FIG. 10 and FIG. 11 are examples of a timing chart illustrating the operation of the laser driving circuit according to the first embodiment of the present invention. FIG. 12 is a diagram illustrating register-setting information of the memory circuit corresponding to the signal patterns for recording-waveform control shown in FIG. 10 and FIG. 11.

In the first embodiment, one first transmission signal and one second transmission signal are supplied to the laser driving circuit 200 in the recording mode and the semiconductor laser 41 is then driven by the write strategy technology. A reset signal RS is used as a first transmission signal. The edge of the reset signal RS represents timing of acquiring a reference pulse that represents timing of repetitively switching spaces and marks. An edge signal ES is used as a second transmission signal. The edge of the edge signal ES represents timing of acquiring a switch pulse that represents timing of switching laser emission levels. In this embodiment, in contrast to the fourth embodiment described later, the edge of the edge signal ES does not represent a reset pulse RP.

Circuit Configuration: First Embodiment

As shown in FIG. 7, the transmission signal generator 500A on the drive substrate includes a RS-type flip-flop circuit 510 and a D-type flip-flop circuit 512 for generating a reset signal RS. The RS-type flip-flop circuit 510 has an R input terminal where Non-return zero data NRZIDATA is input and an S input terminal where an edge pulse EP1 is input. The non-inverting output terminal Q of the RS-type flip-flop circuit 510 is connected to the clock-input terminal CK of the D-type flip-flop circuit 512. The inverted output end xQ of the D-type flip-flop circuit 512 is connected to the D input terminal thereof to form a divide-by-two circuit.

Therefore, the non-inverting output terminal Q of the RS-type flip-flop circuit 510 is set to active H synchronizing with a rising edge of an edge pulse EP1, and is set to inactive L synchronizing with an rising edge of non-return zero data NRZIDATA. An output pulse from the non-inverting output terminal Q of the RS-type flip-flop circuit 510 is supplied to the clock-input terminal CK of the D-type flip-flop circuit 512 and the frequency thereof is then divided into halves.

If an output pulse from the non-inverting output terminal Q of the RS-type flip-flop circuit 510 is provided as a reset signal RS, then the rising edge thereof will define a reset pulse RP. If an output pulse from the inverted output end xQ of the RS-type flip-flop circuit 510 is provided as a reset signal RS, the falling edge thereof will define a reset pulse RP. If an output pulse from the non-inverted output end Q of the D-type flip-flop circuit 512 and the inverted output end xQ thereof are provided as reset signals RS, both the edge will define reset pulses RP. Therefore, if a system configuration in which a reset pulse RP is defined by one edge of the reset pulse RS is used, the D-type flip-flop circuit 512 will be unnecessary.

In addition, to generate an edge signal ES, the transmission signal generator 500A includes a four-input type OR gate 520 and a D-type flip-flop circuit 522. Edge pulses EP2 to EP5 are supplied to the respective input terminals of the OR gate 520. The output terminal of the OR gate 520 is connected to the clock-input terminal CK of the D-type flip-flop circuit 522. The inverted output end xQ of the D-type flip-flop circuit 522 is connected to the D input terminal, forming a divide-by-two circuit.

Therefore, the non-inverting output terminal Q and the inverted output end xQ of the D-type flip-flop circuit 522 are changed from an active high state to an active low state and vice versa in order in synchronization with the rising edge of any of the edge pulses EP2 to EP5. Therefore, if output pulses from the non-inverting output terminal Q and the inverted output end xQ of the D-type flip-flop circuit 522 are defined as edge signals ES, then the both edges of the edge signal ES define the edge pulses EP.

As shown in FIG. 8, the laser driving circuit 200A of the first embodiment includes a pulse generator 202 having a reset pulse generator 210 and an edge pulse generator 220, an emission level pattern storage 230, an electric power source 240, a current switch section 250, and a laser driving section 270. The reset pulse generator 210 is an example of the first pulse generator and the edge pulse generator 220 is an example of the second pulse generator.

In the laser driving circuit 200, components other than the pulse generator 202 and the laser driving section 270 correspond to a recording waveform generator. The pulse generator 202 uses a reset signal RS as a first transmission signal and an edge signal ES as a second transmission signal to generate a reset pulse RP and an edge pulse EP. For example, the reset pulse generator 210 generates a reset pulse RP in response to a reset signal RS. The edge pulse generator 220 generates an edge pulse EP in response to an edge signal ES. In other words, the timing of generating the reset pulse RP is synchronized with the edge of the reset signal RS. In addition, the timing of generating the edge pulse EP is synchronized with the edge of the edge signal ES. Here, each of the reset pulse RP and the edge pulse EP is a pulse signal in an active high state.

The reset pulse generator 210 includes an edge detector 212 as an example of a first edge detector. The edge pulse generator 220 includes an edge detector 222 as an example of a second edge detector. The edge detectors 212 and 222 may be any of those known in the art using a NAND (or AND) gate circuit, a NOR (or OR) gate circuit, a gate circuit such as an inverter or an EX-OR-gate.

For example, if an un-reversed type logical gate is used as a delay element and an input pulse signal and an output of the delay element are input to an EX-OR gate, both edges of the input signal are detected in active high state. If the reversed type logical gate is used as a delay element and an input pulse signal and an output of the delay element is input to an AND gate, a rising edge is detected in an active high state. On the other hand, if is input to an NOR gate, then a falling edge is detected in an active H state.

The reset pulse generator 210 detects either the rising edge or the falling edge of n input reset signal RS is detected by the edge detector 212. In this example, the rising edge of the reset signal RS is detected. Then the reset pulse generator 210 generates a reset pulse RP and supplies the reset pulse RP to the emission level pattern storage 230 (the corresponding timing chart is shown in FIG. 10). Alternatively, both the rising edge and the falling edge of the reset signal may be detected to generate a reset pulse RP (the corresponding timing chart is shown in FIG. 11).

The edge pulse generator 220 detects both the rising edge and the falling edge of an input edge signal ES by the edge detector 222 and then generates an edge pulse EP, followed by supplying the edge pulse EP to the emission level pattern storage 230. One reset pulse RP may be generated every cycle of repeating a space and a mark. However, it is necessary to generate two or more edge pulses EP. Therefore, the frequency of the edge signal ES is lowered by generating edge pulses EP from the both edges of the edge signal ES.

First, in other words, the basic idea of the present embodiment is that the power level information of laser emission at each timing of applying the write strategy technique (signal patterns for recording-waveform control). For example, the emission level pattern storage 230 includes a plurality of registers 232_1 to 232_k (collectively referred to as a register set 231) and readout switches 234_1 to 234_k mounted on the outputs of the respective registers 232_1 to 232_k.

The register set 231 functions as a main storage section. The number of the output lines of the registers 232_1 to 232_k and the number of the readout switches 234_1 to 234_k are defined so that multiple levels of laser power at the time of applying the write strategy technology will be set to desired levels. The number of the multiple levels may be equal to the number of the output lines of the registers 232_1 to 232_k and the number of the readout switches 234_1 to 234_k or may be different therefrom by using a decoder (see the seventh embodiment). In the first embodiment, the number of the multiple levels may be equal to the number of the output lines of the registers 232_1 to 232_k.

In the emission level pattern storage 230 of the present embodiment, on the basis of the signal patterns for recording-waveform control, the registers 232_1-232_k sequentially store both the information about the respective emission power levels, where the initial level of the signal patterns for recording-waveform control is located at the head, and the information for defining the corresponding switching modes of the current switch section 250. An example of the signal patterns for recording-waveform control will be described later.

A reset pulse RP is supplied from the reset pulse generator 210 to the control input terminal of the first readout switch 234_1 connected to the first register 232_1 that retains the initial level information. Edge pulses EP are commonly supplied from the edge pulse generator 220 to the control input terminals of the readout switches 234_2 to 234_k connected to the second and subsequent registers 232_2 to 232_k. The readout switches 234_2 to 234_k are sequential switches for sequentially selecting the outputs of the registers 232_2 to 232_k for the respective edge pulses EP.

In a recording mode, the emission level pattern storage 230 outputs a plurality of current switching pulses SW that turn on/off the respective current switches of the current switch section 250 based on the power level information stored in the register 232 in addition the reset pulses RP and the edge pulses EP. Specifically, the emission level pattern storage 230 sequentially reads the power level information stored in the registers 232_2 to 232_k (in this example, in particular, the current switching pulses SW for controlling the current switch section 250) at the timing of the edge pulses EP.

Then, the emission level pattern storage 230 returns to the reading of the register 232_1 that stores the information of the initial level at the timing of the reset pulse RP.

The electric power source 240 includes a reference current generator 242 and a current-output type DA convertor 244 (IDAC). The reference current generator 242 generates digital reference current values with reference to the information stored in the emission level pattern storage 230. The digital reference current values correspond to multiple levels in the recording mode of the emission pulse waveform of the semiconductor laser 41 and the respective power levels of read in reproduction (reading) mode. For example, current information corresponding to each emission power level is previously set in the emission level pattern storage 230 based on multi-bit digital data. Then, the current information is incorporated into each of the reference current generators 242 corresponding each of the emission power levels.

The DA convertor 244 converts the current information (digital data) generated from the reference current generator 242 into analog data and then outputs the resulting data. Here, a laser power indicator voltage PW is supplied from the APC controller 58 to each DA convertor 244 via a flexible substrate 51. Each DA convertor 244 adjusts the gain of DA conversion based on the laser power indicator voltage PW. Therefore, the emission power of the semiconductor laser 41 is set to a predetermined value under feed-back control in response to the laser power indicator voltage PW.

The current switch section 250 includes a current switches (current SW) 252 responsible for each or any combination (superposition) of power reference currents converted into analog signals by the DA convertor 244 in the recording mode. The current switch section 250 controls emission power by turning on/off the current switches 252 on the basis of two or more pieces of level information (specifically, current switch pulses SW) read from the emission level pattern storage 230.

In this example, the multiple levels in the recording mode are four values: Cool, Erase, Peak, and Over Drive (see FIG. 9A, FIG. 9B, and FIG. 10). On the other hand, the reference current generator 242 includes reference current generators 242C, 242E, 242P, and 242OD that respectively generate four-leveled reference currents and a read reference current generator 232R. The DA converter includes DA converters 244C, 244E, 244P, 244OD, and 244R in order to convert the reference currents generated from the reference current generator 242 into the respective analog signals. The current switch 252 includes current switches 252C, 252E, 252P, 252OD, and 252R.

The reference currents generated from the reference current generator 242 may be defined as each of Ic, Ie, Ip, and Iod corresponding to four levels: cool, erase, peak, and overdrive as shown in FIG. 9A. As shown in FIG. 9B, if additional currents are sequentially applied to any of the cool current Ic, the erase current Ie, the peak current Ip, and the overdrive current Iod, the information of difference between the cool current Ic and each of the currents (Ie−Ic, Ip−Ie, and Iod−Ip) may be provided. Any of current switches 252 in the current switch section 250 is turned on depending on which current is applied. Depending on the adopted configuration, the output pattern information of the current switch pulse SW that controls the corresponding current switch 252 is stored in the emission level pattern storage 230.

In any of FIG. 9A and FIG. 9B, four different current switch pulses SW_1 to SW_4 are output from the respective registers 232 of the emission level pattern storage 230 in the recording mode.

In the example shown in FIG. 9A, the reference currents Ic, Ie, Ip, and Iod of cool, erase, peak, and overdrive are supplied to the corresponding current switches 252C, 252E, 252P, and 252OD. Therefore, any one of four different current switch pulses SW_1 to SW_4 may be activated to turn on one of the current switches 252. In this case, compared with the case shown in FIG. 9B, it is thought that there is little influence of the lag of timing of switching the current switch 252. On the other hand, it is necessary to generate each reference current from the corresponding reference current generator 242. In particular, therefore, the amount of current generated from each of the reference current generators 242P and 2420D for the peak current Ip and the overdrive current Iod is increased. In the example shown in FIG. 9B, current addition is used. Thus, in the order of cool, erase, peak, and overdrive, the number of combinations of current switch pulses SW_1 to SW_4 to be activated is increased to increase the number of current switches 252 to be turned on. In this case, the timing of current addition depends on the timing of switching the addition current switches 252. Thus, an influence of "lag" may become large compared with that of shown in FIG. 9A. On the other hand, there are few current amounts which each standard current generation part 242 generates, and they end.

The laser driving section 270 includes a laser switching circuit 272 and a driver circuit 274. As an example, the laser switching circuit 272 includes a three-input-and-one-output type switch that switches three systems: a first semiconductor laser 41_1 for CD system, a second semiconductor laser 41_2 for DVD system, and a third second semiconductor laser 41_3. The driver circuit 274 includes a first driver circuit 274_1 for driving the first semiconductor laser 41_1, a second driver circuit 274_2 for driving the second semiconductor laser 41_2, and a third driver circuit 274_3 for driving the third semiconductor laser 41_3. The laser driving section 270 supports the semiconductor lasers 41_1, 41_2, and 41_3 for three different types, CD, DVD, next-generation DVD, and switches semiconductor lasers 41 depending on the kind of the recording medium.

Therefore, the laser driving circuit 200A is designed to generate the emission wavelength of multi-valued power applied with the write strategy by a combination of a bias current that supplies the threshold current of the semiconductor laser 41 and a plurality of current pulses. In the case of the laser power control system (APC control system) (not shown), the multi-valued power is controlled so that the laser power of the semiconductor laser 41 becomes the emission waveform of the multi-valued power.

Operation: First Embodiment

As shown in FIG. 10 and FIG. 11, data input is non-return zero data NRZIDATA. The length of a space is 2 T and the length of a mark is 2 T or more (in the figure, for example, 2 T, 3 T, 4 T, and 5 T). The maximum speed signal is 2 T repetition. When applying the write strategy technology, in this example, each space length 2 T corresponds a cool level (Cool) on the first half (1 T) and an erase level (Erase) on the second half (1 T). The mark length 2 T corresponds to an erase level on the first half (1 T) and the second half (1 T) corresponds to an overdrive level. The mark length 3 T corresponds to an erase level on the first 1 T, an overdrive level (O.D.) on the second 1 T, and a peak level (Peak) on the third 1 T.

The mark length 4 T corresponds to an erase level on the first 1 T, an overdrive level on the second 1 T, a peak level on the third 1 T, and an overdrive level on the fourth 1 T. The mark length 5 T corresponds to an erase level on the first 1 t, an overdrive level on the second 1 T, a peak level on the third 1 T, a peak level on the fourth 1 T, and an overdrive level on the fifth 1 T. In other words, when the mark length is 5 T, the peak level is kept on the third 1 T and the fourth 1 T and then changed to the overdrive level on the fifth 1 T.

Furthermore, regardless of the mark length, the erase level is kept from the second half 1 T of the space to the first 2 T of the mark and then changed to the overdrive level on the subsequent 1 T. The relationship among the emission power levels are O.D.>Peak>Erase>Cool.

Corresponding to such signal patterns for recording-waveform control, as shown in FIG. 12, the first register 232_1 stores the information of a cool level as an initial level. The second register 232_2 stores the information of an erase level, the third register 232_2 stores the information of an overdrive level, the fourth register 232_2 stores the information of a peak level, and the fifth register 232_5 stores the information of an overdrive level.

One reset signal RS and one edge signal ES are used as input pulse signals. A reset pulse RP is generated on the basis of the rising edge or both the rising edge and the falling edge of one reset signal RS. An edge pulse EP is generated on the basis of both the edges of one edge signal ES. Then, each piece of the power level information stored in the respective registers 232_1 to 232_5 of the respective registers 232_1 to 232_5 of the emission level pattern storage 230 is sequentially read from the first area (in this example, cool).

For example, the readout switch 234_1 is turned on when the reset pulse RP is when reset pulse RP is in an active high state. Then, the power level information is read from the first register 232_1. After that, every time the edge pulse EP is in an active high state, the readout switches 234_2 to 234_5 having the sequential switch structure are sequentially turned on to read the power level information from the registers 232_2 to 232_5 one by one. For example, at the time of recording with a mark length of 4 T or 5 T, sequential recoding of all pieces of power level information leads to the switching of laser emission powers in the order of cool, erase, overdrive, peak, and overdrive.

Depending on the mark length of non-return zero data NRZIDATA, all the levels may not be output. For example, when recording is performed at the mark length of 2 T, the laser emission power may be changed from overdrive to cool. In this case, the information of cool may be read subsequent to the information of overdrive by supply of a reset signal RS so that a reset pulse RP becomes an active high state with timing of immediately after overdrive to be changed to cool. Similarly, at the time of recording with a mark length of 3 T, a reset signal RS may be supplied so that a reset pulse RP becomes an active high state with timing of immediately after overdrive to be changed to cool so that the power may be changed from peak to cool.

Laser Drive System: Second Embodiment

Figure 13A:
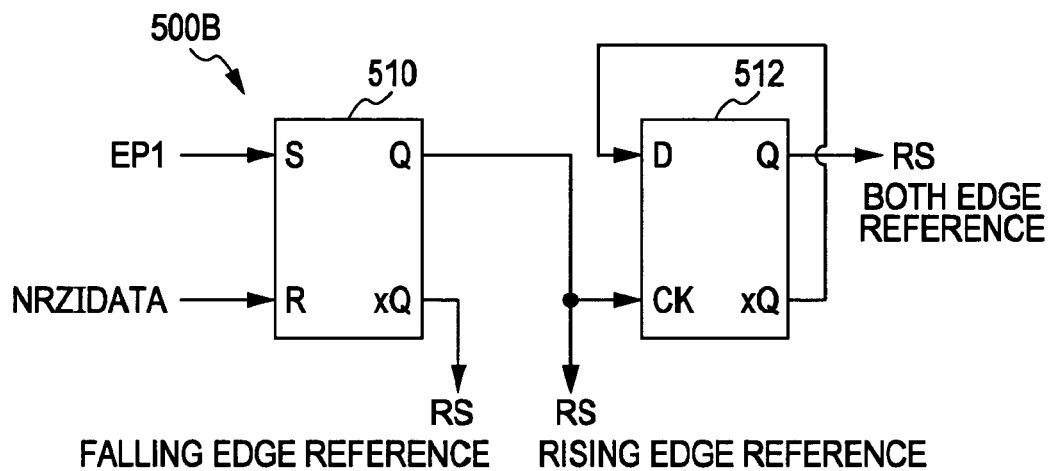
FIG. 13A illustrates a transmission signal generator for reset signals RS and FIG. 13B illustrates a transmission signal generator for edge signals ES.
Figure 13B:
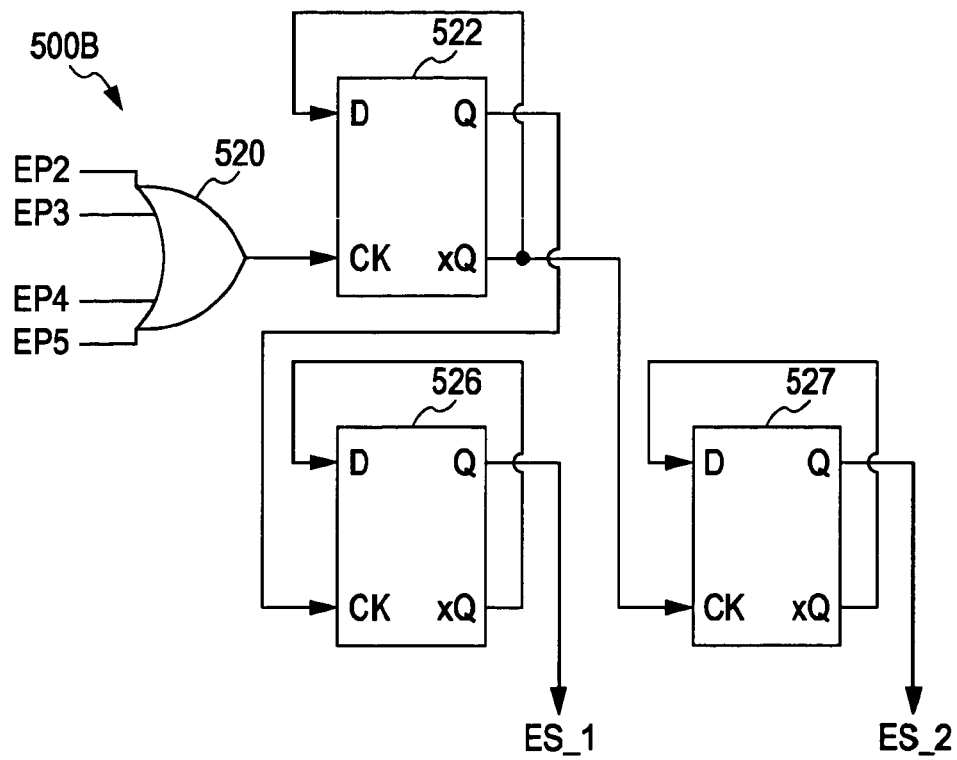
Figure 14:
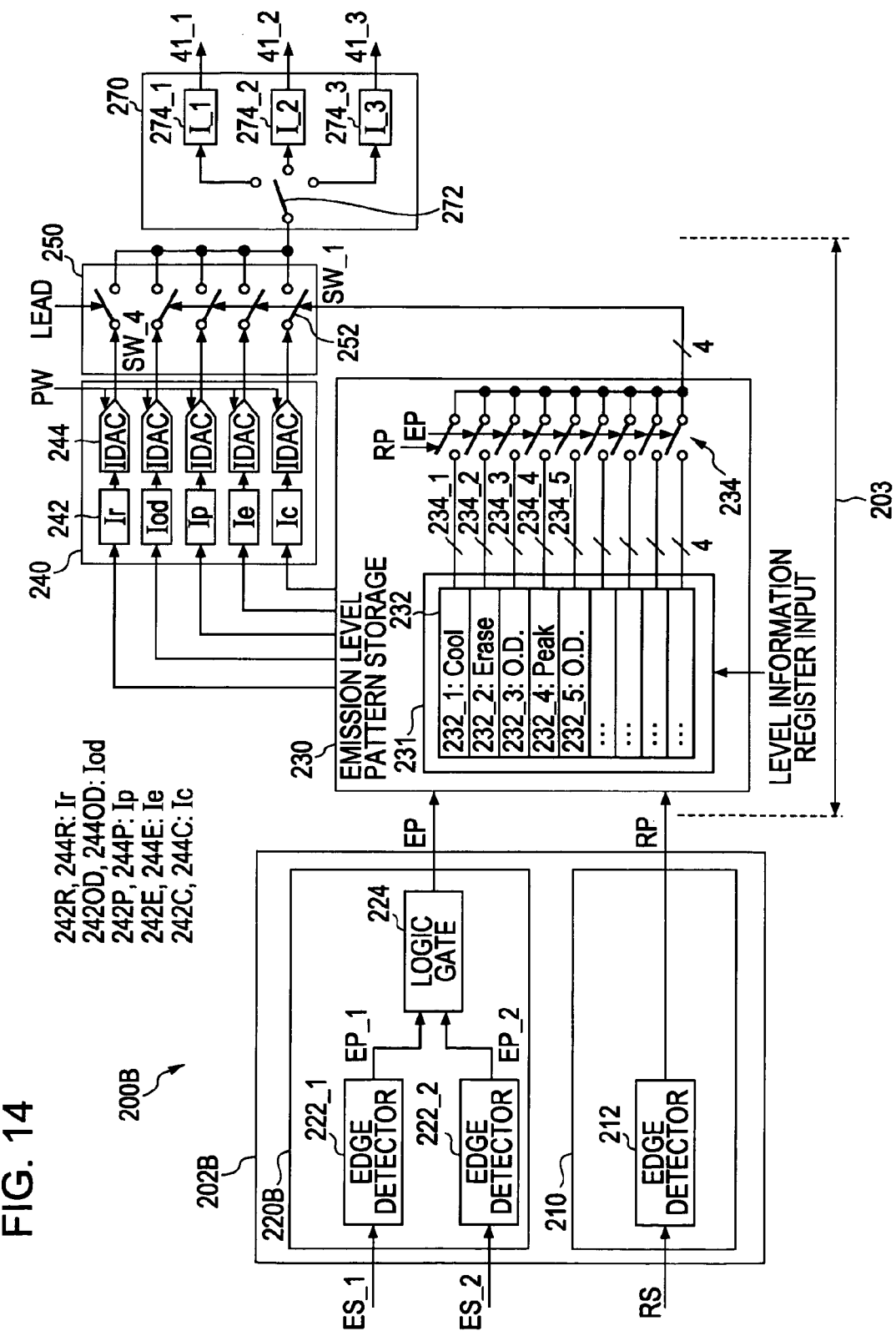
FIG. 14 is a diagram illustrating the configuration of a laser driving circuit that realizes a laser drive system of the second embodiment.
Figure 15:
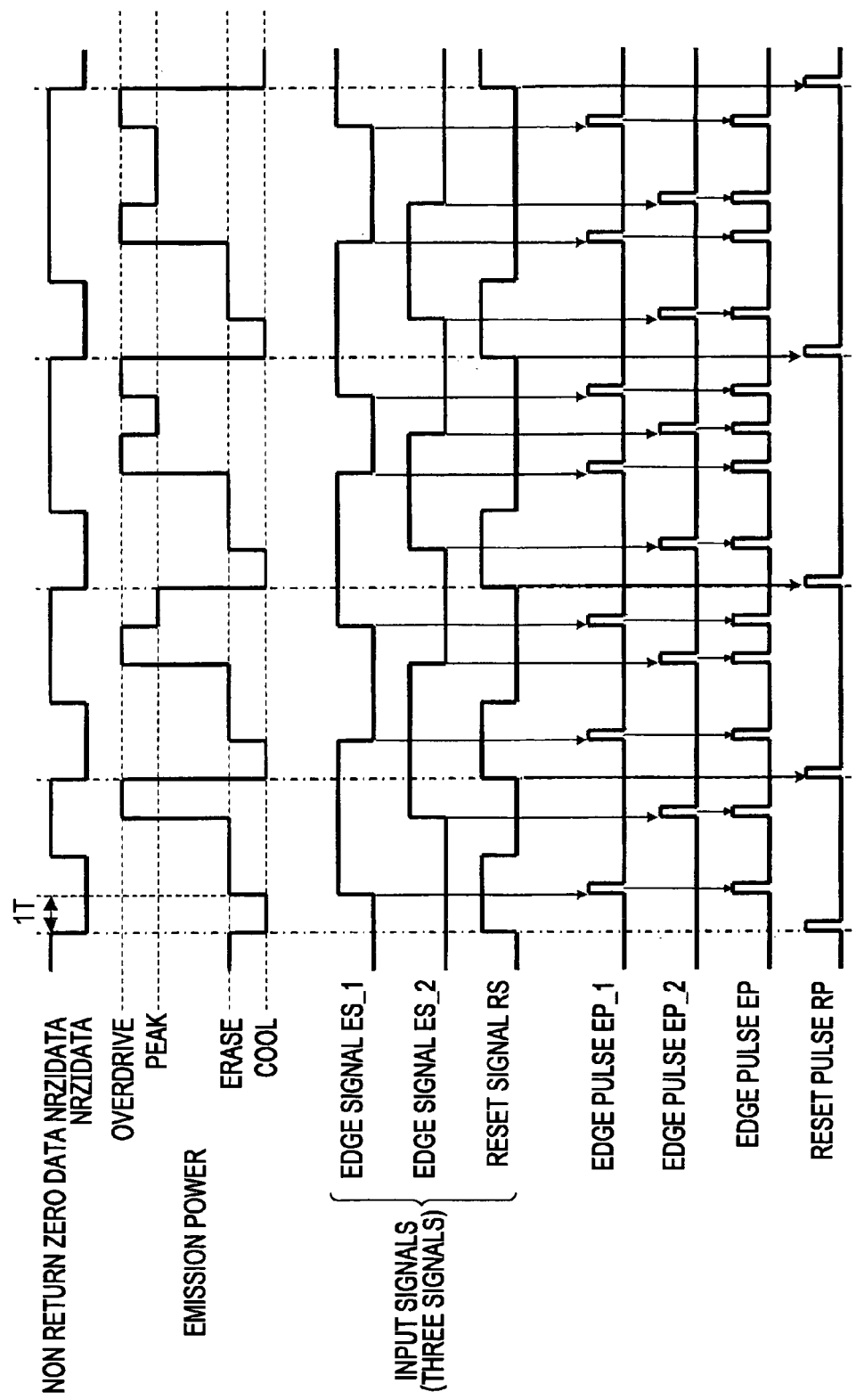
FIG. 15 is a timing chart illustrating the operation of a laser driving circuit of the second embodiment (first example)
Figure 16:
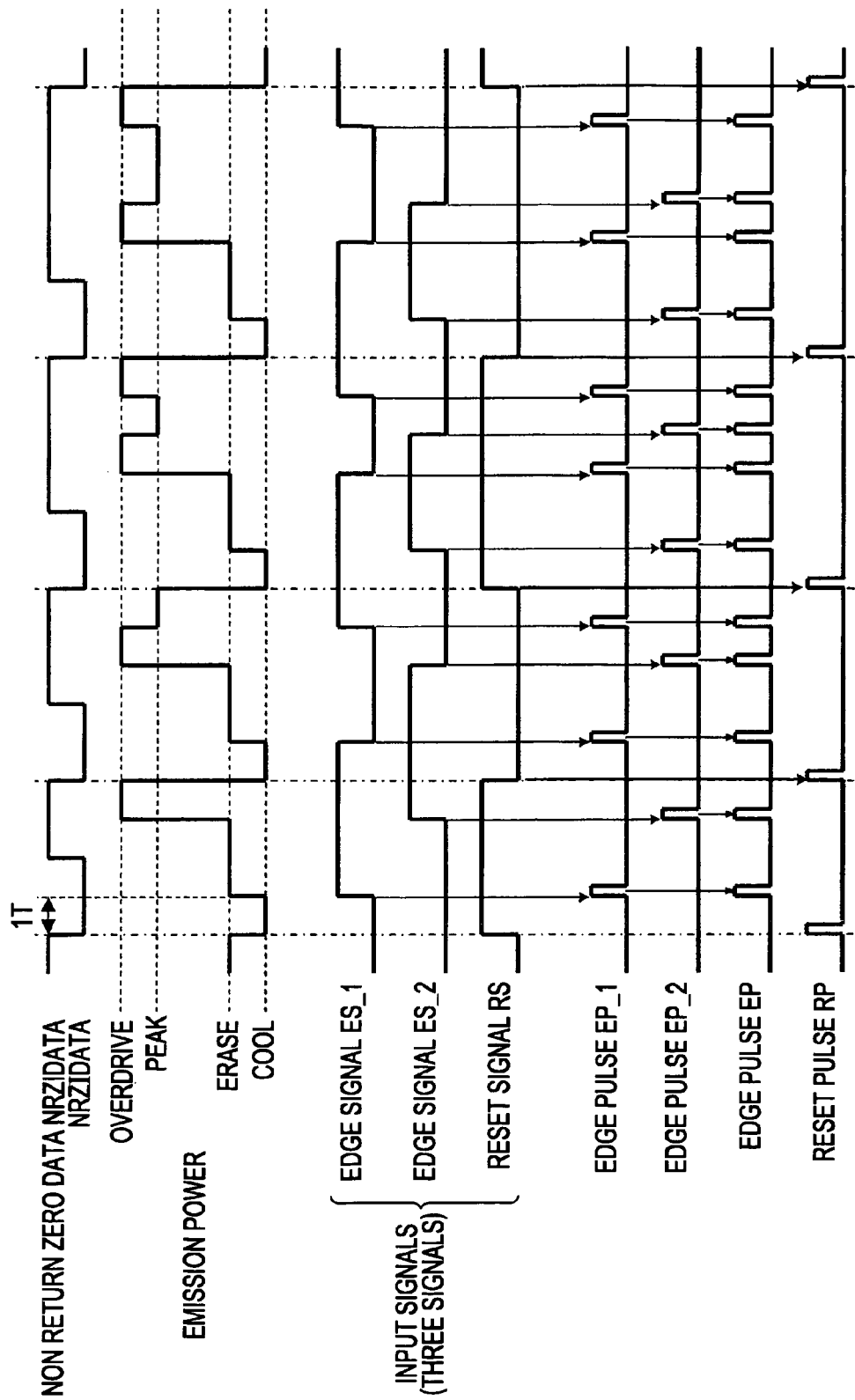
FIG. 16 is a timing chart illustrating the operation of a laser driving circuit of the second embodiment (second example)
Figure 17:
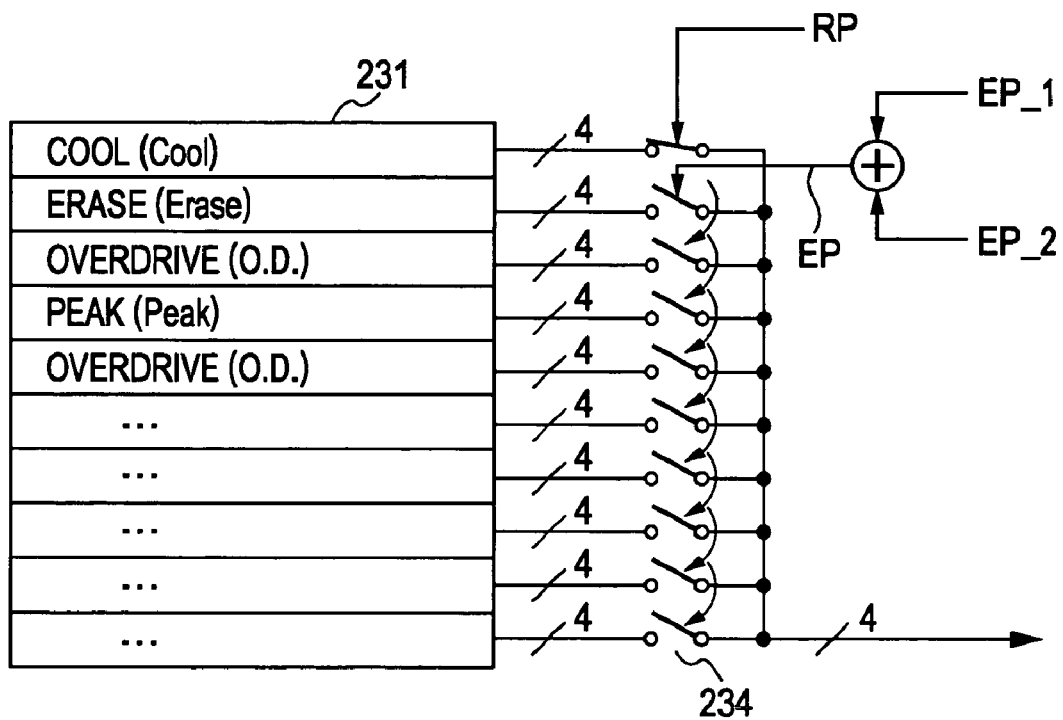
FIG. 17 is a diagram illustrating register setting information of a memory circuit corresponding to signal patterns for recording-waveform control shown in FIG. 15 and FIG. 16.

FIG. 13 to FIG. 17 illustrate a laser driving system according to a second embodiment of the present invention. Here, FIG. 13A and FIG. 13B are diagrams illustrating an exemplary configuration of a transmission signal generator 500B of the second embodiment to be used for realizing a sequential system installed in the digital signal processor 57 on the driving substrate. FIG. 14 is a diagram illustrating a laser driving circuit that realizes the laser driving system of the second embodiment. FIG. 15 and FIG. 16 are examples of a timing chart illustrating the operation of the laser driving circuit according to the second embodiment of the present invention. FIG. 17 is a diagram illustrating register-setting information of the memory circuit corresponding to the signal patterns for recording-waveform control shown in FIG. 15 and FIG. 16.

In the second embodiment, one first transmission signal and N second transmission signals (N is a positive integer of 2 or more) are supplied to the laser driving circuit 200B in recording mode and the semiconductor laser 41 is then driven by the write strategy technology. Although the number of a signal wiring lines will increase, in order to make high-speed transmission possible, the number of second transmission signals is set to N. Then, the transmission is carried out with timing using both the rising edges and the falling edges of the respective second transmission signals (2N edges thereof) to realize a function of lowering a transmission band. In other words, the transmission of two or more second transmission signals that contain information for defining timing of acquiring switching pulses to optimize the transmission band more easily. Hereinafter, an example (N=2) of the laser driving circuit 200B of the second embodiment will be described mainly focused on variations from that of the laser driving circuit 200A of the first embodiment.

Circuit Configuration: Second Embodiment

As shown in FIG. 13A and FIG. 13B, the transmission signal generator 500B on the drive substrate includes a RS type flip-flop circuit 510 and a D-type flip-flop circuit 512 to generate reset signals RS. Here, the configurations of these circuits are similar to those of the first embodiment, so that the descriptions thereof will be omitted.

In addition, the transmission signal generator 500B has four-input type OR gate 520 and D-type flip-flop circuit 522, 526, 527, in order to generate edge signal ES_1 and ES_2. The circuit configuration of the second embodiment is based on that of the first embodiment and further provided with D-type flip-flop circuits 526 and 527 located downstream from the D-type flip-flop circuit 522. The configurations of the OR gate 520 and the D-type flip-flop circuit 522 are similar to those of the first embodiment, so that the descriptions thereof will be omitted.

The non-inverting output terminal Q of the D-type flip-flop circuit 522 is connected to the clock-input terminal CK of the D-type flip-flop circuit 526. The inverted output end xQ of the D type flip-flop circuit 526 is connected to the D input terminal thereof to form a divide-by-two circuit. Inverted output end xQ of D-type flip-flop circuit 522 is connected with clock-input terminal CK of D-type flip-flop circuit 527. The inverted output end xQ of the D type flip-flop circuit 527 is connected to the D input terminal thereof to form a divide-by-two circuit.

Therefore, the non-inverting output terminal Q and the inverted output end xQ of the D type flip-flop circuit 522 are changed from an active high state to an active low state and vice versa in order in synchronization with the rising edge of any of the edge pulses EP2 to EP5. Therefore, the non-inverting output terminal Q and the inverted output end xQ of the D type flip-flop circuit 526 are changed from an active high state to an active low state and vice versa in order in synchronization with the rising edge of the non-inverting output terminal Q of the D-type flip flop circuit 522. In addition, the non-inverting output terminal Q and the inverted output end xQ of the D type flip-flop circuit 527 are changed from an active high state to an active low state and vice versa in order in synchronization with the rising edge of the non-inverting output terminal Q of the D-type flip flop 522.

Therefore, if output pulses from the non-inverting output terminal Q and the inverted output end xQ of the D type flip-flop circuit 526 are defined as edge signals ES_1, then the both edges of the edge signal ES_1 define the edge pulses EP_1. In addition, if output pulses from the non-inverting output terminal Q and the inverted output end xQ of the D type flip-flop circuit 527 are defined as edge signals ES_2, then the both edges of the edge signal ES_2 define the edge pulses EP_2.

In the second embodiment, as shown in FIG. 14, the edge pulse generator 220 of the laser driving circuit 200B generates edge pulses EP in response to two edge signals ES_1 and ES_2 provided as second transmission signals.

Therefore, the edge pulse generator 220B of the second embodiment includes two edge detectors 222_1 and 222_2 and a logic gate 224 (an exemplary pulse synthesizer). The edge detector 222_1 detects both edges of an edge signal ES_1 to generate an edge pulse EP_1. The edge detector 222_2 detects both edge of an edge signal ES_2 to generate an edge pulse EP_2. The logic gate 224 performs logical synthesis of the edge pulses EP_1 and EP_2 output from the respective edge detectors 222_1 and 222_2 to generate edge pulses EP. Here, the edge pulses EP_1 and EP_2 are pulse signals in an active high state. To meet this fact, the logic gate 224 uses an OR gate that takes a logic sum of edge pulses EP_1 and EP_2.

As shown in FIG. 15 and FIG. 16, signal patterns for recording-waveform control are the same as those of the first embodiment, and as shown in FIG. 17, the information stored in the registers 232_1 to 232_5 are also the same as those of the first embodiment. An exemplary combination of each reference current generator 242 and each readout switch 234 assigned by each register 232 is one as illustrated in FIG. 9B.

Operation: Second Embodiment

As shown in FIG. 15 and FIG. 16, one reset signal RS and two edge signals ES_1 and ES_2 are used as input pulse signals, so that there are three input pulse signals in total.

For example, an edge pulse EP_1 is generated based on both the edges of the first edge signal ES_1. An edge pulse EP_2 is generated based on the both edges of the second edge signal ES_2. Then, the edge pulses EP_1 and EP_2 are ORed with each other to give one edge pulse EP. Subsequently, in a manner similar to the first embodiment, the edge pulse EP is supplied to readout switches 234_2 to 234_k of the emission level pattern storage 230. The subsequent steps are the same as those of the first embodiment. As is the case with the first embodiment, the use of two second transmission signals (an edge signal ES_1 and an edge signal ES_2) allows the edges of an edge signal ES that defines the timing of switching laser emission levels to be dispersed in two edge signals ES_1 and ES_2. As a result, the band frequency of edge transmission may be reduced by half and easily copes with a high speed. Here, the example (N=2) of the laser driving circuit 200B of the second embodiment has been described. Alternatively, if N is 3 or more, the band frequency of edge transmission may be further reduced to simply cope with high-speed recording.

Laser Driving System: Third Embodiment

Figure 18A:
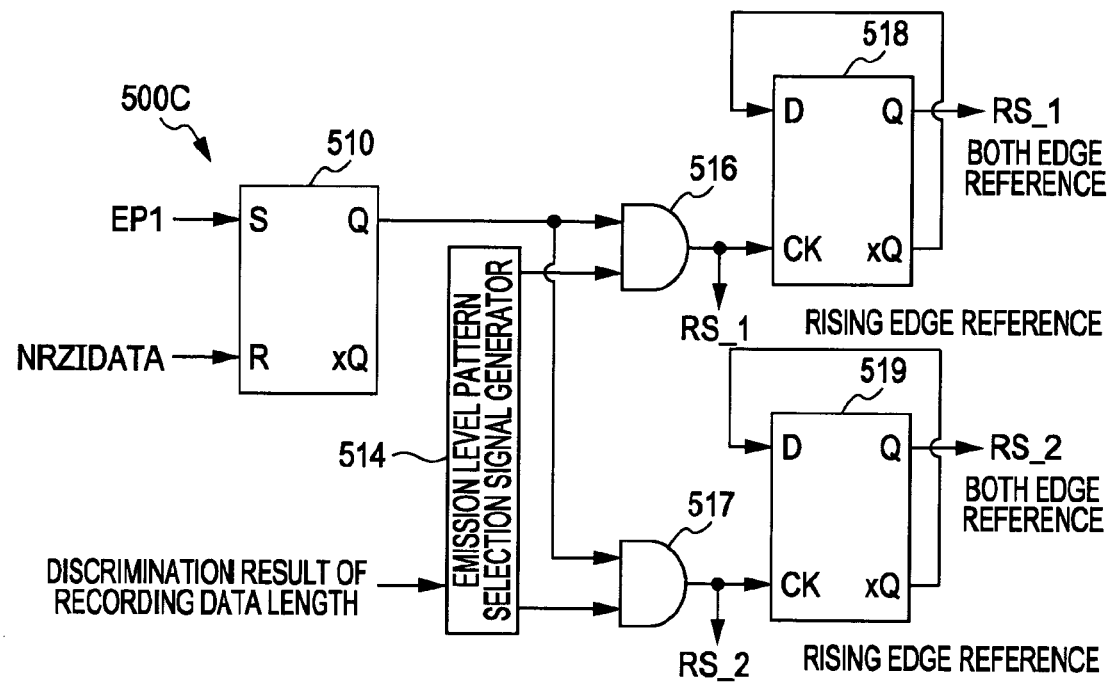
FIG. 18A illustrates a transmission signal generator for reset signals RS and FIG. 18B illustrates a transmission signal generator for edge signals ES.
Figure 18B:
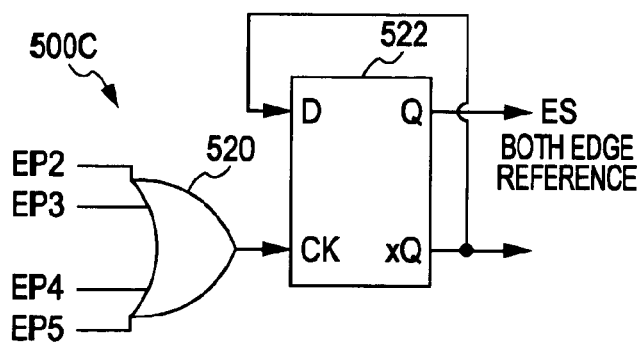
Figure 19:
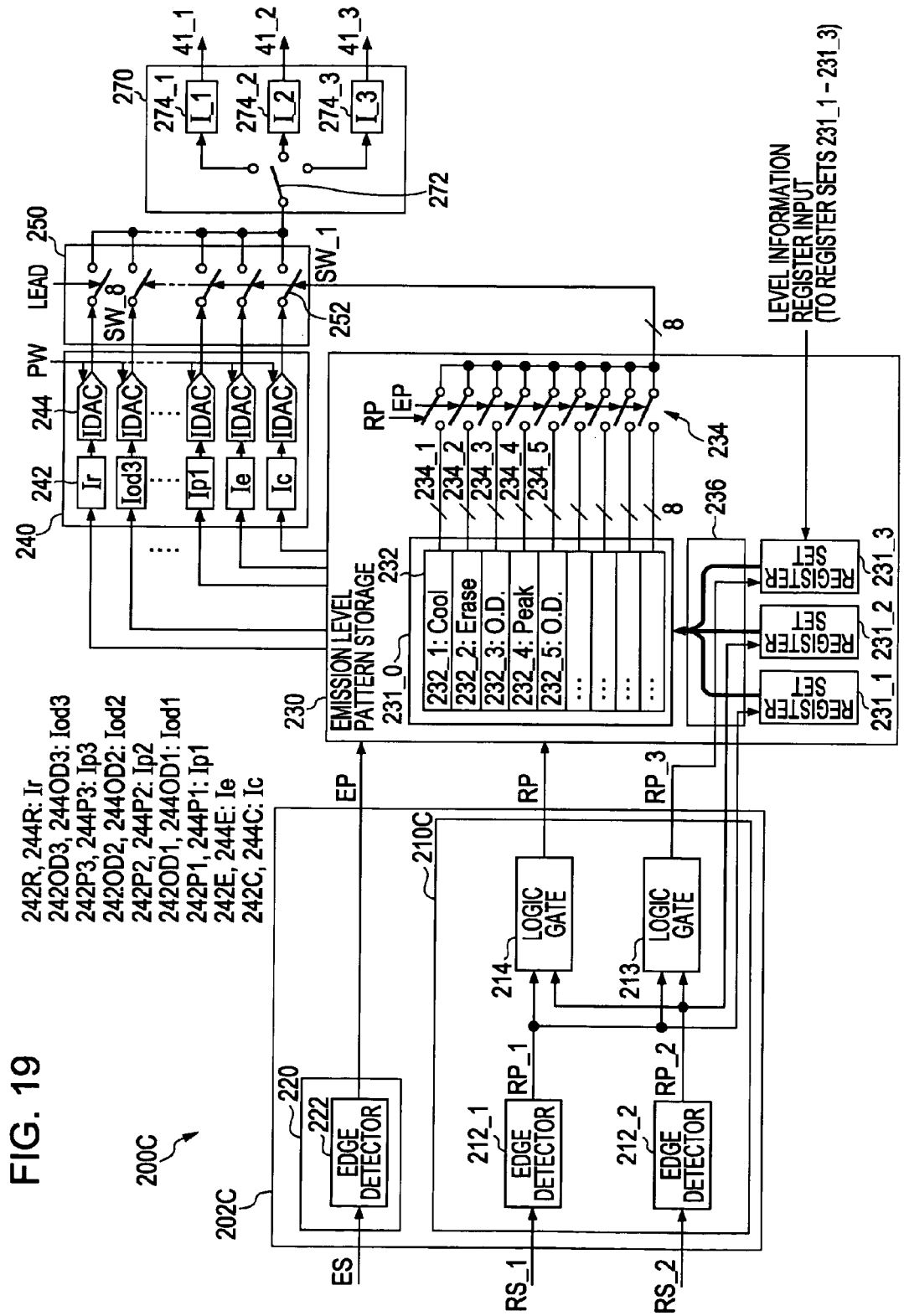
FIG. 19 is a diagram illustrating a laser driving circuit that realizes the laser driving system of the third embodiment.
Figure 20:
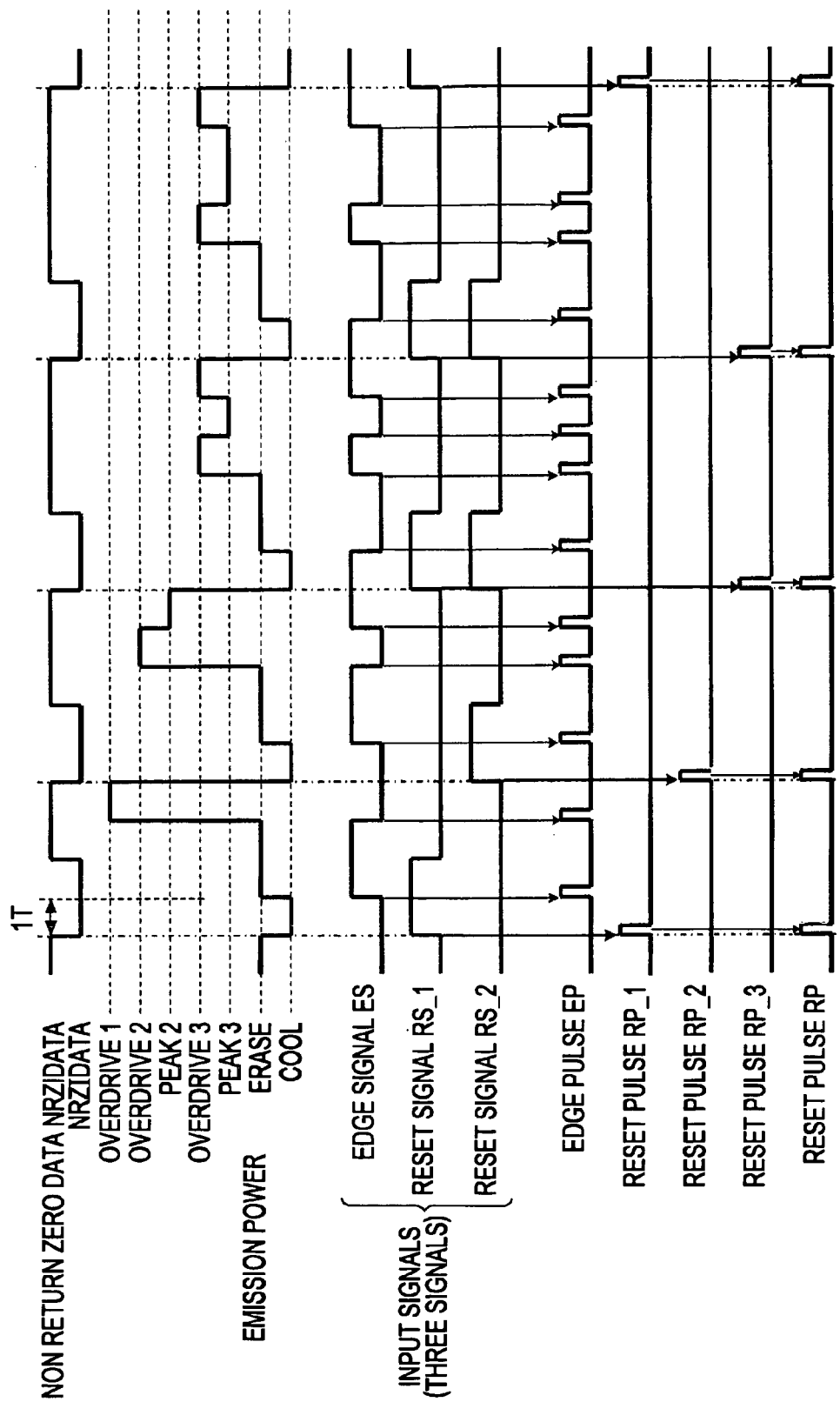
FIG. 20 is a timing chart for illustrating the operation of the laser driving circuit of the third embodiment (first example)
Figure 21:
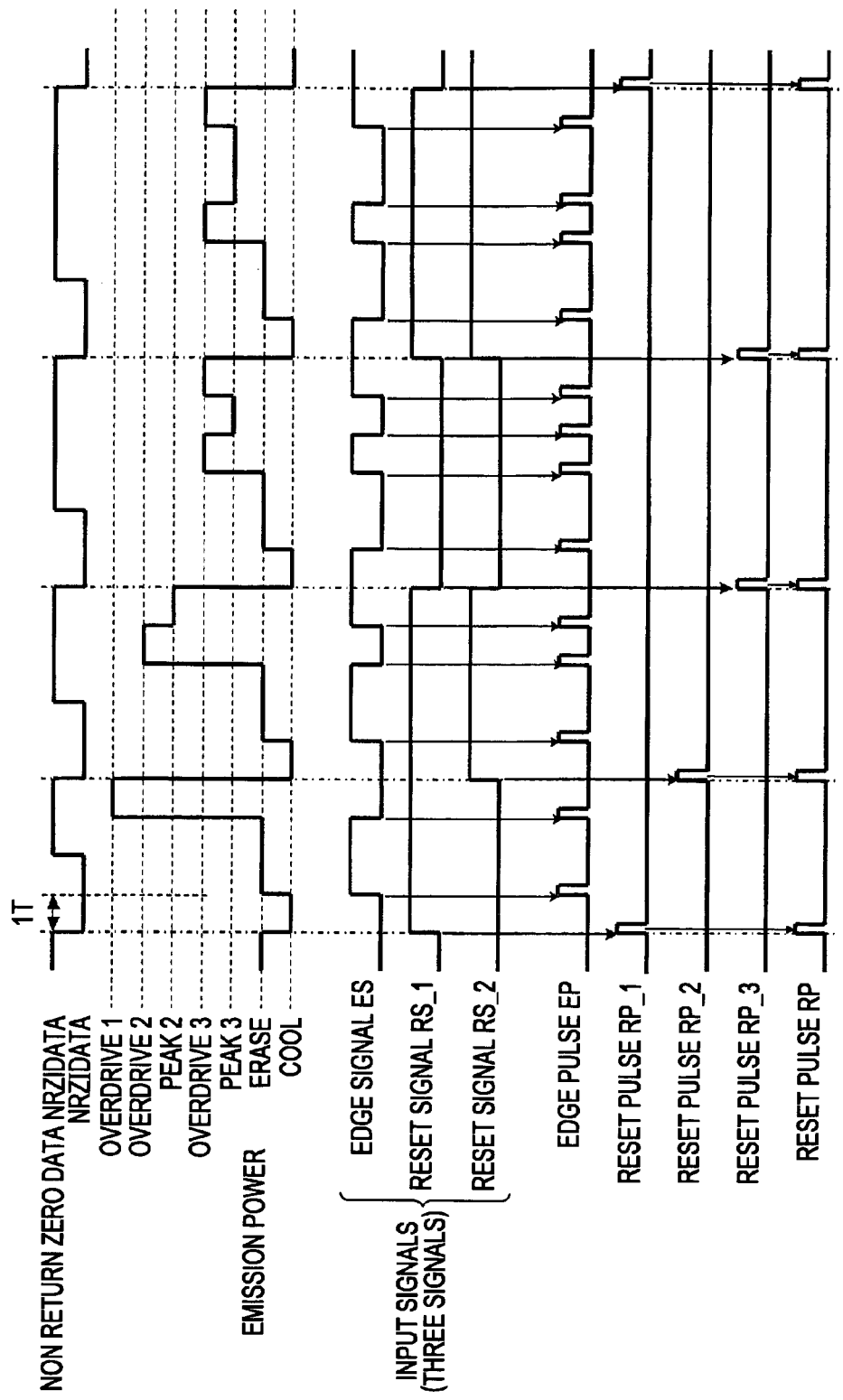
FIG. 21 is a timing chart for illustrating the operation of the laser driving circuit of the third embodiment (second example)
Figure 22:
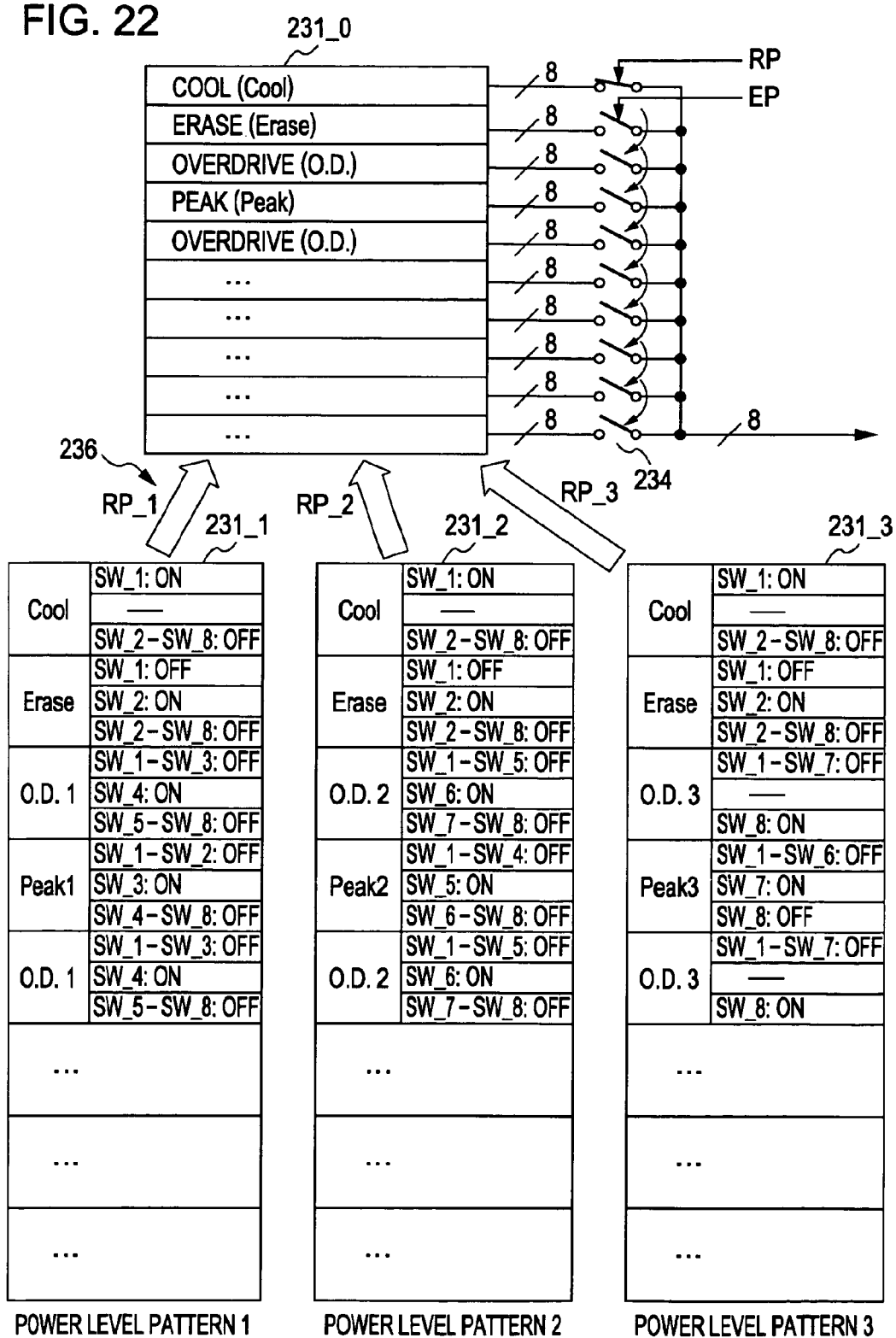
FIG. 22 is a timing chart for illustrating register-setting information of a memory circuit corresponding to signal patterns for recording-waveform control shown in FIG. 20 and FIG. 21.

FIG. 18 to FIG. 22 illustrate a laser driving system according to a third embodiment of the present invention. Here, FIG. 18A and FIG. 18B are diagrams illustrating an exemplary configuration of a transmission signal generator 500C of the third embodiment to be used for realizing a sequential system installed in the digital signal processor 57 on the driving substrate. FIG. 19 is a diagram illustrating a laser driving circuit that realizes the laser driving system of the third embodiment. FIG. 20 and FIG. 21 are examples of a timing chart illustrating the operation of the laser driving circuit according to the second embodiment of the present invention. FIG. 22 is a diagram illustrating register-setting information of the memory circuit corresponding to the signal patterns for recording-waveform control shown in FIG. 20 and FIG. 21.

In the third embodiment, one second transmission signal and N first transmission signals (N is a positive integer of 2 or more) are supplied to the laser driving circuit 200C in recording mode and the semiconductor laser 41 is then driven by the write strategy technology. Although the number of a signal wiring lines will increase, it realizes the function of switching two or more different power level patterns using N first transmission signals. For example, it may be applied when a peak level or an overdrive level is changed depending on the length of a mark. Hereinafter, an example (N=2) of the laser driving circuit 200B of the second embodiment will be described mainly focused on variations from that of the laser driving circuit 200A of the first embodiment.

Circuit Configuration: Third Embodiment

As shown in FIG. 18A and FIG. 18B, the transmission signal generator 500C on the drive substrate includes a RS-type flip-flop circuit 510, an emission level pattern selection signal generator 514, AND gates 516 and 517, and D-type flip-flop circuits 518 and 519 to generate reset signals RS_1 and RS_2. The RS-type flip-flop circuit 510 has an R input terminal where Non-return zero data NRZIDATA is input and an S input terminal where an edge pulse EP1 is input. A result of discriminating the length of recorded data by an address encoder is input into the input terminal of the emission level pattern selection signal generator 514.

The non-inverting output terminal Q of the RS-type flip-flop circuit 510 is connected to one input terminal of each of the AND gates 516 and 517. The other output terminal of each of the AND gates 516 and 517 is connected to the corresponding output terminal of the emission level pattern selection signal generator 514. The output terminal of the AND gate 516 is connected to the clock-input terminal CK of the D type flip-flop circuit 518. The inverted output end xQ of the D type flip-flop circuit 518 is connected to the D input terminal, forming a divide-by-two circuit. The output terminal of the AND gate 517 is connected to the clock-input terminal CK of the D type flip-flop circuit 519. The inverted output end xQ of the D type flip-flop circuit 519 is connected to the D input terminal, forming a divide-by-two circuit.

Therefore, the non-inverting output terminal Q of the RS-type flip-flop circuit 510 is set to active H synchronizing with a rising edge of an edge pulse EP1, and is set to inactive L synchronizing with an rising edge of non-return zero data NRZIDATA. The emission level pattern selection signal generator 514 outputs an emission level pattern selection signal to the output terminal of each of the AND gates 516 and 517 according to a result of discriminating the length of recorded data by the address encoder. Correspondence of the result of discriminating the length of recorded data to an emission level pattern may be set up arbitrarily. Then a signal from the non-inverting output terminal Q of the RS-type flip-flop circuit 510 is output to the output terminal of each of the AND gates 516 and 517 in response to an emission level pattern selection signal.

An output pulse of AND gate 516 output terminal is supplied to clock-input terminal CK of D type flip-flop circuit 518, and then divided into halves. An output pulse from the AND gate 517 is supplied to the clock-input terminal CK of the D type flip-flop circuit 519 and the frequency thereof is then divided into halves.

If an output pulse from the AND gate 516 is provided as a reset signal RS_1, then the rising edge thereof will define a reset pulse RP_1. If an output pulse from the AND gate 517 is provided as a reset signal RS_2, then the rising edge thereof will define a reset pulse RP_2. In addition, if output pulses from the non-inverting output terminal Q and the inverted output end xQ of the D type flip-flop circuit 518 are defined as a reset signal RS_1, then the both edges of the reset signal RS_1 define a reset pulse RP_1. In addition, if output pulses from the non-inverting output terminal Q and the inverted output end xQ of the D type flip-flop circuit 519 are defined as a reset signal RS_2, then the both edges of the reset signal RS 2 define a reset pulse RP_2.

Therefore, if a system configuration in which reset pulses RP_1 and RP 2 is defined by one edge of each of the reset signals RS_1 and RS_2 is used, the D type flip-flop circuits 518 and 519 will be unnecessary.

And although not indicated on a drawing, if AND gate 516 is constituted from a NAND gate and an output pulse of a NAND gate output terminal is set to reset signal RS_1, the falling edge will prescribe reset pulse RP_1. Alternatively, the AND gate 517 may be a NAND gate (not shown). If an output pulse from the NAND gate is provided as a reset signal RS_2, then the rising edge thereof will define a reset pulse RP_2.

In addition, the transmission signal generator 500C includes a four-input type OR gate 520 and D-type flip-flop circuit 522 to generate an edge signal ES. The configuration of the transmission signal generator 500C is the same as that of the first embodiment, so that the description thereof will be omitted. As shown in FIG. 19, the reset pulse generator 210 of the laser driving circuit 200C of the third embodiment generates a reset pulse RP based on two reset signals RS_1 and RS_2 as a first transmission signal.

Therefore, the reset pulse generator 210C of the third embodiment includes two edge detectors 212_2 and 212_2 and two logic gates 213 and 214 (exemplary pulse synthesizers). The edge detector 212_1 detects a rising edge or both edges of the reset signal RS_1 to generate a reset pulse RP_1. The edge detector 212_1 detects a rising edge or both edges of the reset signal RS_2 to generate a reset pulse RP_2.

The logic gate 213 performs logical synthesis of the reset pulses RP_1 and RP_2 output from the respective edge detectors 212_1 and 212_2 to generate a reset pulse RP_3. The logic gate 214 performs logical synthesis of the reset pulses RP_1 and RP_2 output from the respective edge detectors 212_1 and 212_2 to generate a reset pulse RP.

Here, the reset pulses RP_1 and RP_2 are pulse signals in an active high state. To meet this fact, the logic gate 213 uses an AND gate that takes a logic sum of reset pulses RP_1 and RP_2. In addition, the logic gate 214 uses an OR gate that takes a logic sum of reset pulses RP_1 and RP_2.

Memory Circuit: Third Embodiment

As shown in FIG. 20 and FIG. 21, signal patterns for recording-waveform control are different from those of the first embodiment. Overdrive levels vary depending on mark lengths. For example, the mark length 2 T corresponds to an overdrive level 1 (O.D. 1), the mark length 3 T corresponds to an overdrive level 2 (O.D. 2), and a peak level (Peak 2), and the mark lengths 4 T and 5 T correspond to an overdrive level 3 (O.D. 3) and a peak level (Peak 3). The relationship among the emission power levels are O.D. 1>O.D. 2>Peak 2>O.D. 3>Peak 3>Erase>Cool.

In other to change overdrive levels depending on the mark length, the emission level pattern storage 230 of the third embodiment includes a register set 231_0 that functions as a main storage, register sets 231_1, 231_2, and 231_3 that function as sub-storages, and a storage information control circuit 236. The register sets 231_1, 231_2, and 231_3 store three different signal patterns for recording-waveform control, respectively. The register set 231_0 corresponds to the register set 231 of the first embodiment. The storage information control circuit 236 reads any piece of storage information from the register sets 231_1, 231_2, and 231_3 to hold the read information in the register set 231_0. An exemplary combination of each reference current generator 242 and each readout switch 234 assigned by each register 232 is one as illustrated in FIG. 9A.

Operation: Third Embodiment

As shown in FIG. 20 and FIG. 21, two reset signals RS_1 and RS_2 and one edge signal ES are used as input pulse signals, so that there are three input pulse signals in total. A reset pulse RP_1 is generated on the basis of the rising edge or both the rising edge and the falling edge of the first reset signal RS_1. A reset pulse RP_2 is generated on the basis of the rising edge or both the rising edge and the falling edge of the second reset signal RS_2. A reset pulse RP_3 is then generated by logically multiplying the reset pulse RP_1 by the reset pulse RP_2 to give a reset pulse PR_3 and by logical addition thereof to give a reset pulse RP. When only the reset pulse RP_1 is an active high state, the storage information control unit 236 reads storage information from the register set 231_1, and sets the read information into the register set 231_0. When only the reset pulse RP_2 is an active high state, the storage information control unit 236 reads storage information from the register set 231_2, and sets the read information into the register set 231_0.

When only both of the reset pulses RP_1 and RP_2 are active high states (i.e., when only reset pulse RP_3 is an active high state), the storage information control unit 236 reads storage information from the register set 231_3, and sets the read information into the register set 231_0. In other words, the storage information control unit 236 rewrites the memory information to a power level pattern corresponding the information of the register set 231_0 at the timing when each of the reset pulses RP_1, RP_2, and RP_3 becomes an active high state.

Subsequently, in a manner similar to the first embodiment, one reset pulse RP output from the logic gate 214 is supplied to the readout switches 234_1 of the emission level pattern storage 230. The subsequent steps are the same as those of the first embodiment. Like the third embodiment, three different power level patterns can be switched from one to another using two first transmission signals (reset signals RS_1 and RS_2). Therefore, the power level of laser emission may be changed depending on the mark length.

Here, the example (N=2) of the laser driving circuit 200C of the second embodiment has been described. Alternatively, if N is 3 or more, switching of more different kinds of power level patterns will be allowed. Alternatively, the first embodiment having a plurality of second transmission signals (edge signals ES) may be combined with the second embodiment having a plurality of first transmission signals (reset signals RS). In this case, each of the effects of the second and third embodiments will be realized.

Laser Drive System: Fourth Embodiment

Figure 25:
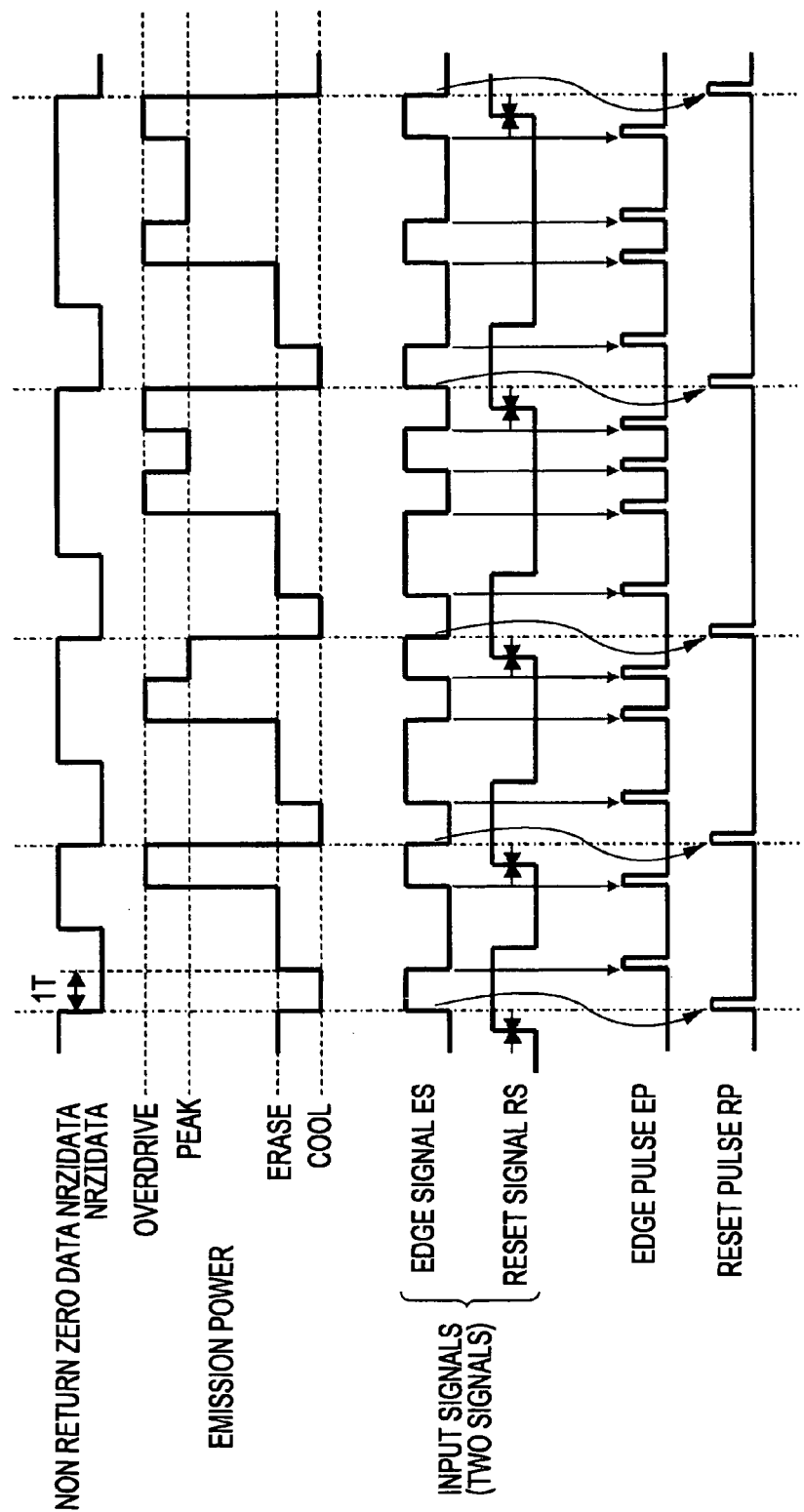
FIG. 25 is a timing chart for illustrating the operation of the laser driving circuit of the third embodiment (first example)
Figure 26:
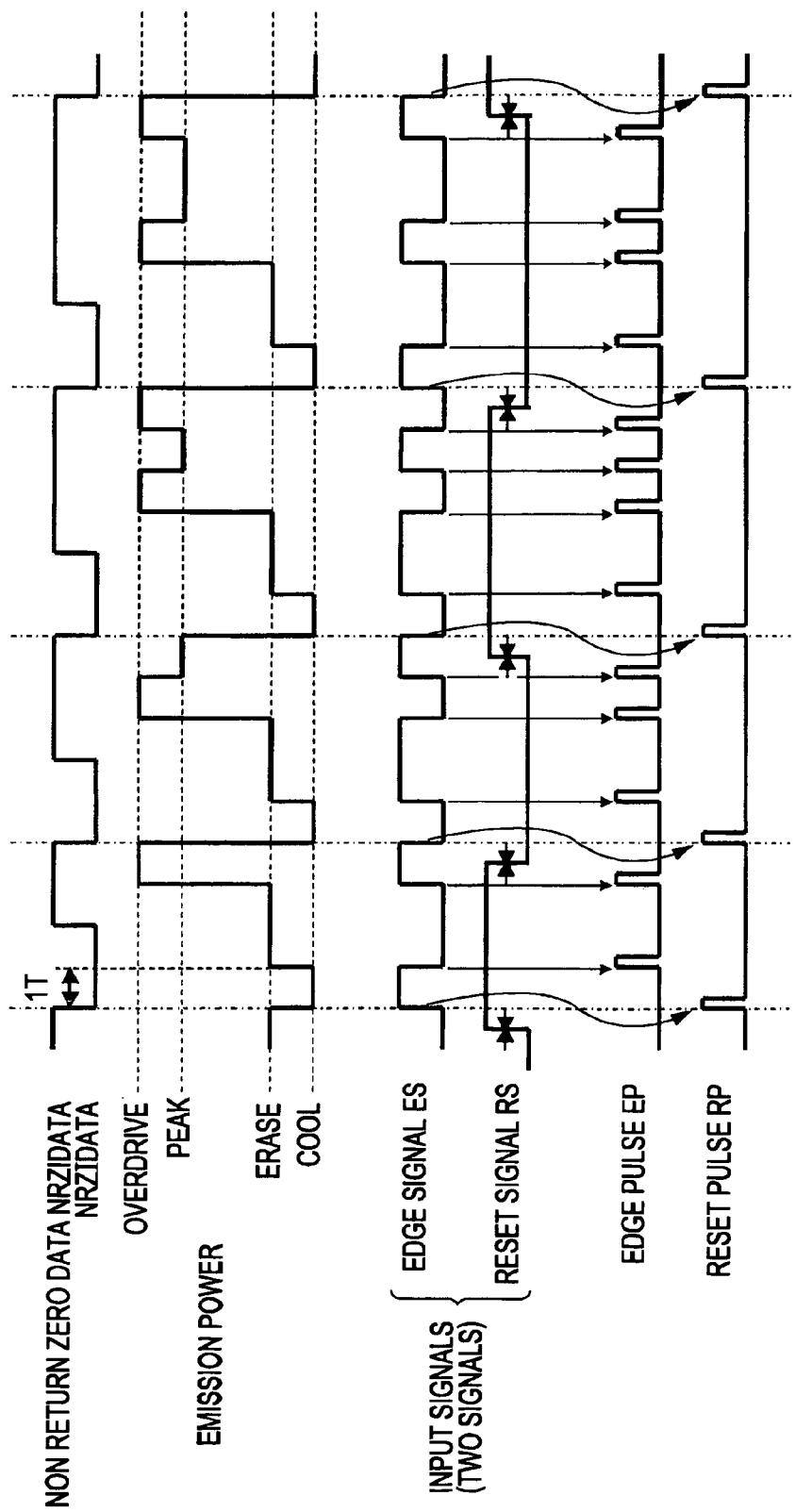
FIG. 26 is a timing chart for illustrating the operation of the laser driving circuit of the third embodiment (second example)
Figure 27:
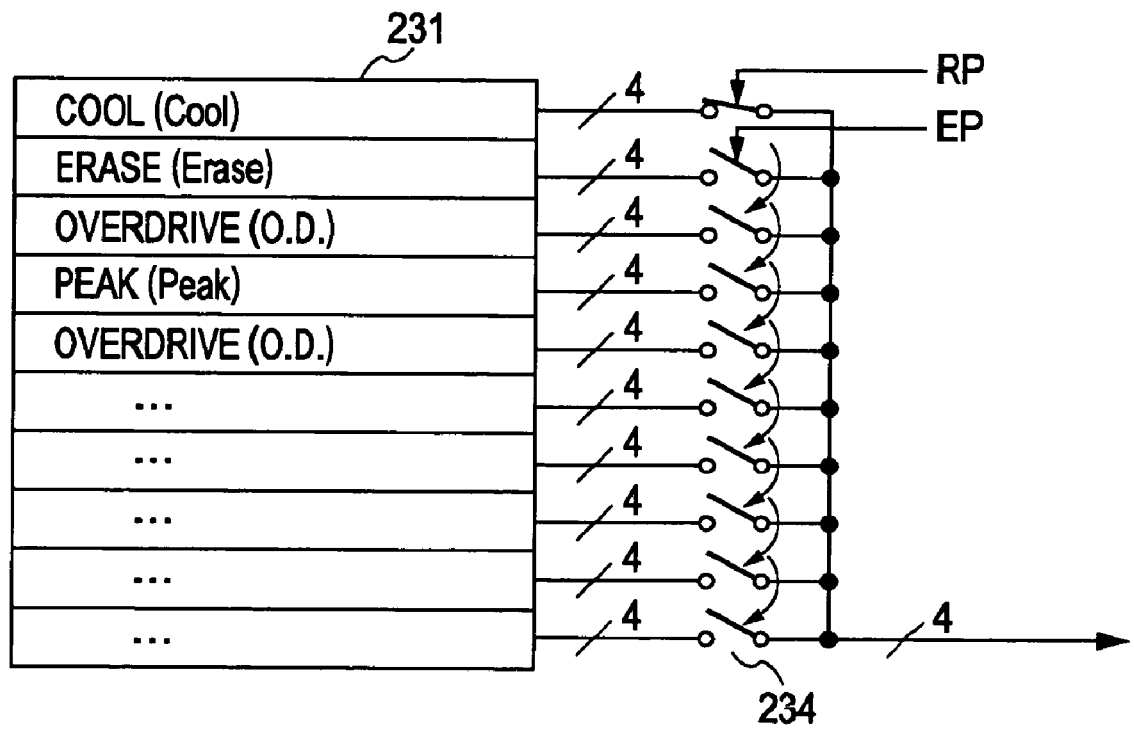
FIG. 27 is a timing chart for illustrating register-setting information of a memory circuit corresponding to signal patterns for recording-waveform control shown in FIG. 25 and FIG. 26.

FIG. 23 to FIG. 27 illustrate a laser driving system according to a fourth embodiment of the present invention. Here, FIG. 23A and FIG. 23B are diagrams illustrating an exemplary configuration of a transmission signal generator 500D of the fourth embodiment to be used for realizing a sequential system installed in the digital signal processor 57 on the driving substrate. FIG. 24 is a diagram illustrating a laser driving circuit that realizes the laser driving system of the fourth embodiment. FIG. 25 and FIG. 26 are examples of a timing chart illustrating the operation of the laser driving circuit according to the fourth embodiment of the present invention. FIG. 27 is a diagram illustrating register-setting information of the memory circuit corresponding to the signal patterns for recording-waveform control shown in FIG. 25 and FIG. 26.

In the fourth embodiment, in common with the first embodiment, one first transmission signal and one first transmission signal are supplied to the laser driving circuit 200D in recording mode and the semiconductor laser 41 is then driven by the write strategy technology. On the other hand, unlike the first embodiment, a reset signal RS is used as a first transmission signal. The edge of the reset signal RS represents timing of acquiring a reference pulse that represents timing of repetitively switching spaces and marks.

In addition, unlike the first embodiment, a reset pulse RP and an edge signal ES are used as second transmission signals. Here, the reset pulse RP represents timing of acquiring a reference pulse an edge and the edge of the edge signal ES represents timing of acquiring a switch pulse that represents timing of switching laser emission levels. The reset signal RS is used as a discrimination signal for discriminating and acquiring the reset pulse RP and the edge pulse EP using the edges of the edge signal ES.

The fourth embodiment is different from the first embodiment in that, for example, the reset pulse RP is generated by synchronizing with edge timing of the edge pulse EP and the edge pulse EP is generated at timing that does not contribute to generation of the reset pulse RP within the edges of edge signal ES. An influence of skew is eliminated by synchronizing not only the generation of the edge signal ES but also the generation of the reset pulse RP with the edges of the edge signal ES. Hereinafter, an example of the laser driving circuit 200D of the fourth embodiment will be described mainly focused on variations from that of the laser driving circuit 200A of the first embodiment.

Circuit Configuration: Fourth Embodiment

Figure 23A:
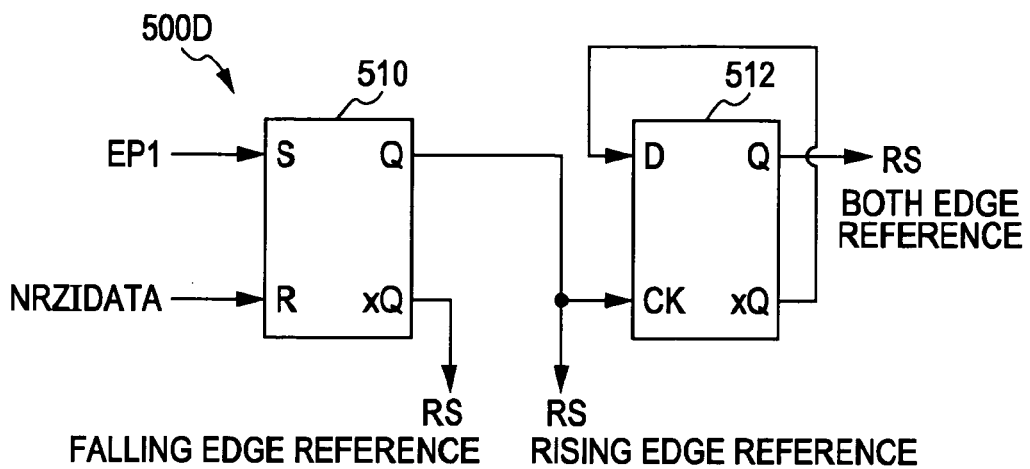
FIG. 23A illustrates a transmission signal generator for reset signals RS and FIG. 23B illustrates a transmission signal generator for edge signals ES.
Figure 23B:
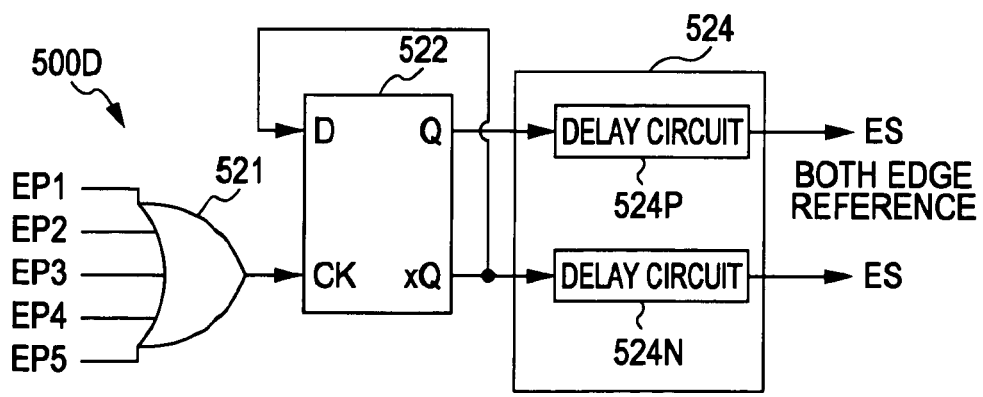

As shown in FIG. 23A and FIG. 23B, the transmission signal generator 500D on the drive substrate includes a RS-type flip-flop circuit 510 and a D-type flip-flop circuit 512 to generate a reset signal RS. The configuration of the transmission signal generator 500C is the same as that of the first embodiment, so that the description thereof will be omitted.

In addition, the transmission signal generator 500D includes a five-input type OR gate 521, a D-type flip-flop circuit 522, and a delay section 524 including a delay circuit 524P and 524N. To generate edge signals ES with edges varied with a predetermined time lag with respect to edge pulses EP1 to EP5, the OR gate 520 of the first embodiment is changed to a 5-input type one and a delay circuit 524 is additionally added to the downstream of the D-type flip-flop circuit 522.

The edge pulses EP1 to EP5 are supplied to the respective input terminals of the OR gate 521. The output end of the OR gate 521 is connected to the clock input terminal CK of the D-type flip-flop circuit 522. The inverted output end xQ of the D-type flip-flop circuit 522 is connected to the D input terminal, forming a divide-by-two circuit. The non-inverting output terminal Q of the D-type flip-flop circuit 522 is connected with the input terminal of the delay circuit 524P. The non-inverting output terminal xQ of the D-type flip-flop circuit 522 is connected with the input terminal of the delay circuit 524N. The delay circuits 524P and 524N cause a fixed time delay of input pulses.

Therefore, each of the non-inverting output terminal xQ and the inverting output terminal Q of the D-type flip-flop circuit 524 is synchronized with the rising edge of any of the edge pulses EP1 to EP5 and the low and the high state thereof are changed in order. The output terminal of the delay circuit 524P and the output terminal of the delay circuit 524N are changed with delay from an active high state to an active low state and vice versa in order with respect to signals from the non-inverting output terminal Q and the inverted output end xQ of the D-type flip-flop circuit 522. Therefore, if an output from each of the output ends of the delay circuits 524P and 534N is provided as an edge signal ES, an edge pulse EP is defined by the both edges of the edge signal ES.

As shown in FIG. 24, the reset pulse generator 210 and the edge pulse generator 220 of the laser driving circuit 200D of the fourth embodiment are different from those of the first embodiment. The reset pulse generator 210D includes a discrimination signal generator 216 and a first separator 218. The discrimination signal generator 216 generates a discrimination signal for separating a reset pulse RP from an edge pulse EP and acquiring them. The first separator 218 is provided for separating a reset pulse PR from a composite pulse RP & EP. The discrimination signal generator 216 generates a discrimination signal from a composite pulse RP & EP detected by the logic gate 224 based on the reset signal RS.

The edge pulse generator 220D includes another second separator 228 in addition to the edge detector 222. In response to a discrimination signal for separately acquiring an edge pulse EP and a reset pulse RP, the second separator 228 separates and acquires a reset pulse RP from a composite pulse RP & EP. This composite pulse RP & EP contains both a reset pulse RP and an edge pulse EP output from the edge detector 222.

For example, the discrimination signal generator 216 outputs a discrimination pulse DP in an active high state to the non-inverting output terminal of the first separator 218 and a discrimination pulse XDP which is a logically reversed discrimination pulse DP to the inverting output terminal of the second separator 228 within the interval from the edge of a reset signal RS to the edge of the next edge signal ES with delay corresponding to a pulse width of the edge pulse EP. FIG. 25 is an applicable example of the fourth embodiment in which a discrimination pulse DP is set in an active high state immediately after synchronizing with the rising edge of a reset signal RP. In the figure, an edge pulse EP is generated using each of both edges of an edge signal ES except the edge thereof for each reset pulse RP). A reset pulse RP is generated using only the first edge of an edge signal ES after raising a reset signal RS. FIG. 26 is another applicable example of the fourth embodiment in which a discrimination pulse DP is set in an active high state immediately after synchronizing with the both edges of a reset signal RP. In the figure, an edge pulse EP is generated using each of both edges of an edge signal ES (except the edge thereof for each reset pulse RP). A reset pulse RP is generated only using the first edge of an edge signal ES after transition of a reset signal RS. The period of active high state of a discrimination pulse DP is set to include only a reset pulse RP. It is not necessary to set the discrimination pulse DP to be in an active high state during an interval in which the edge of an edge signal ES directly subsequent to the edge of a reset signal RP is provided with a delay corresponding to the pulse width of an edge pulse EP. The period of active high state of a discrimination pulse DP may include only a reset pulse RP and the active high state may be started or ended at any timing.

The first separator 218 uses an AND gate that takes a logic sum of a composite pulse RP & EP in an active high state, which is generated from the logic gate 224, and the discrimination pulse DP. The second separator 228 uses an AND gate that takes a logic sum of a composite pulse RP & EP in an active high state, which is generated from the logic gate 224, and the reversal discrimination pulse xDP. In the first separator 218 or the second separator 228, the pulses are separated by logic synthesis. There is an advantage that the separation of the reset pulse RP and edge pulse EP from the composite pulse RP & EP is easily performed. As shown in FIG. 25 and FIG. 26, a signal patterns for recording-waveform control is the same as one used in the first embodiment. In addition, as shown in FIG. 27, the information stored in each of the registers 232_1 to 232_5 is the same as one used in the first embodiment.

Operation: Fourth Embodiment

In the fourth embodiment, as shown in FIG. 25 and FIG. 26, any of rest pulses RP and edge pulses EP is represented by the edge of an edge signal ES. The reset signal RS is used for generation of discrimination pulses DP and xDP for separating both the reset pulse RP and the edge pulse EP from the composite pulse RP & EP. The reset signal RS is not provided with edge information that represents a reset pulse RP. The edge signal is transmitted such that the edge thereof includes not only the information of the edge pulse EP but also the information of the reset pulse RP.

Transition timing of the reset signal RS is set to one without the edge of the edge signal ES. Thus, the reset pulse RP is acquired from the composite pulse RP & EP at edge timing of the edge signal ES directly after the edge of the reset signal RS. In the composite pulse RP & EP, an edge pulse EP is acquired at timing other than one of edges used for acquiring the reset pulse RP. The subsequent steps are the same as those of the first embodiment.

As shown in any of the first to third embodiments, transmission of a reset pulse RP and an edge pulse EP using the respective signals (a reset signal RS and an edge signal ES) results in a skew due to delay in transmission between the signals. On the other hand, the structure of the fourth embodiment is prevented from any influence of the skew because both the reset pulse RP and the edge pulse EP are transmitted using one edge signal ES.

Laser Drive System: Fifth Embodiment

Figure 28A:
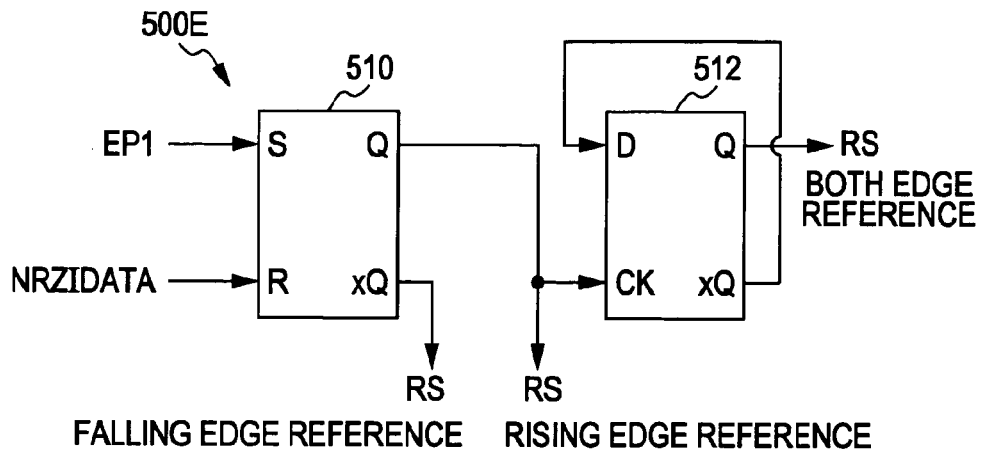
FIG. 28A illustrates a transmission signal generator for reset signals RS and FIG. 28B illustrates a transmission signal generator for edge signals ES.
Figure 28B:
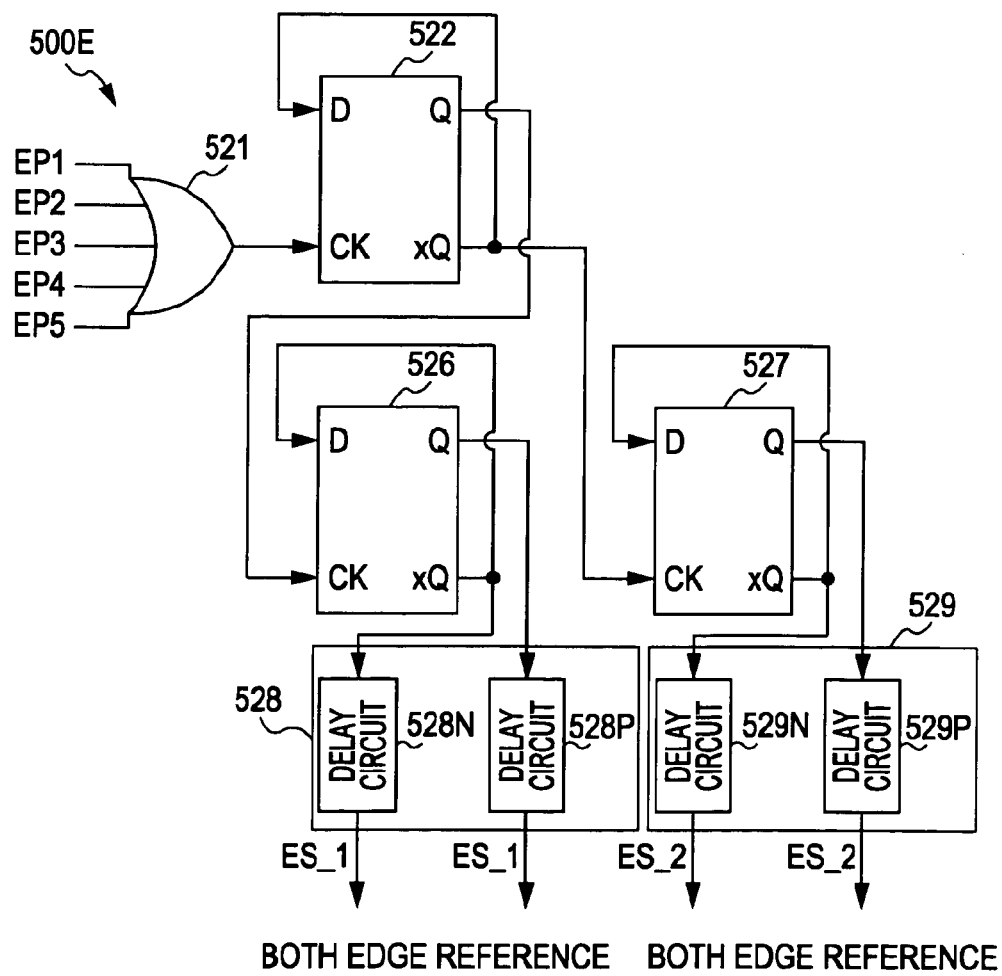
Figure 29:
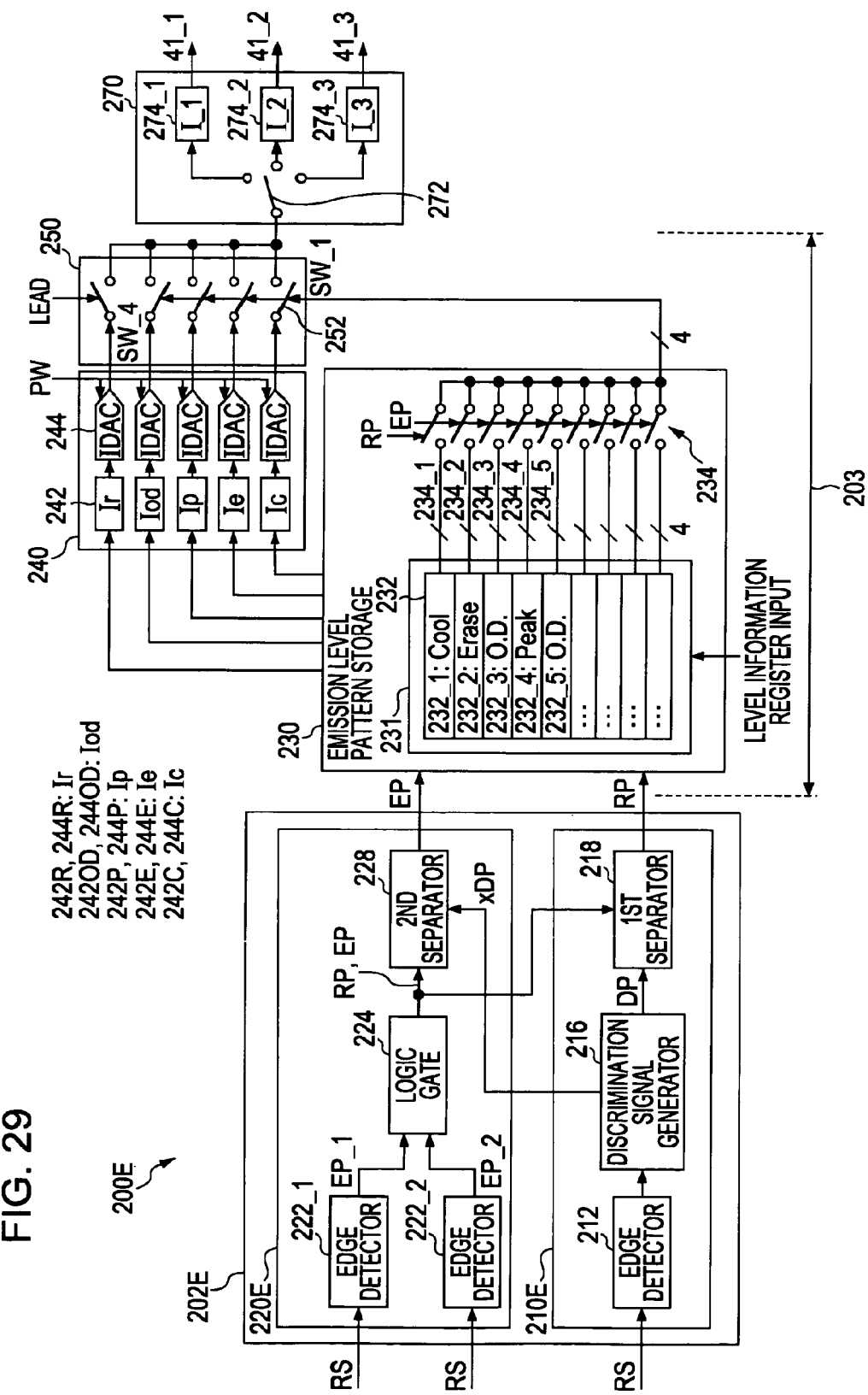
FIG. 29 is a diagram illustrating a laser driving circuit that realizes the laser driving system of the third embodiment.
Figure 30:
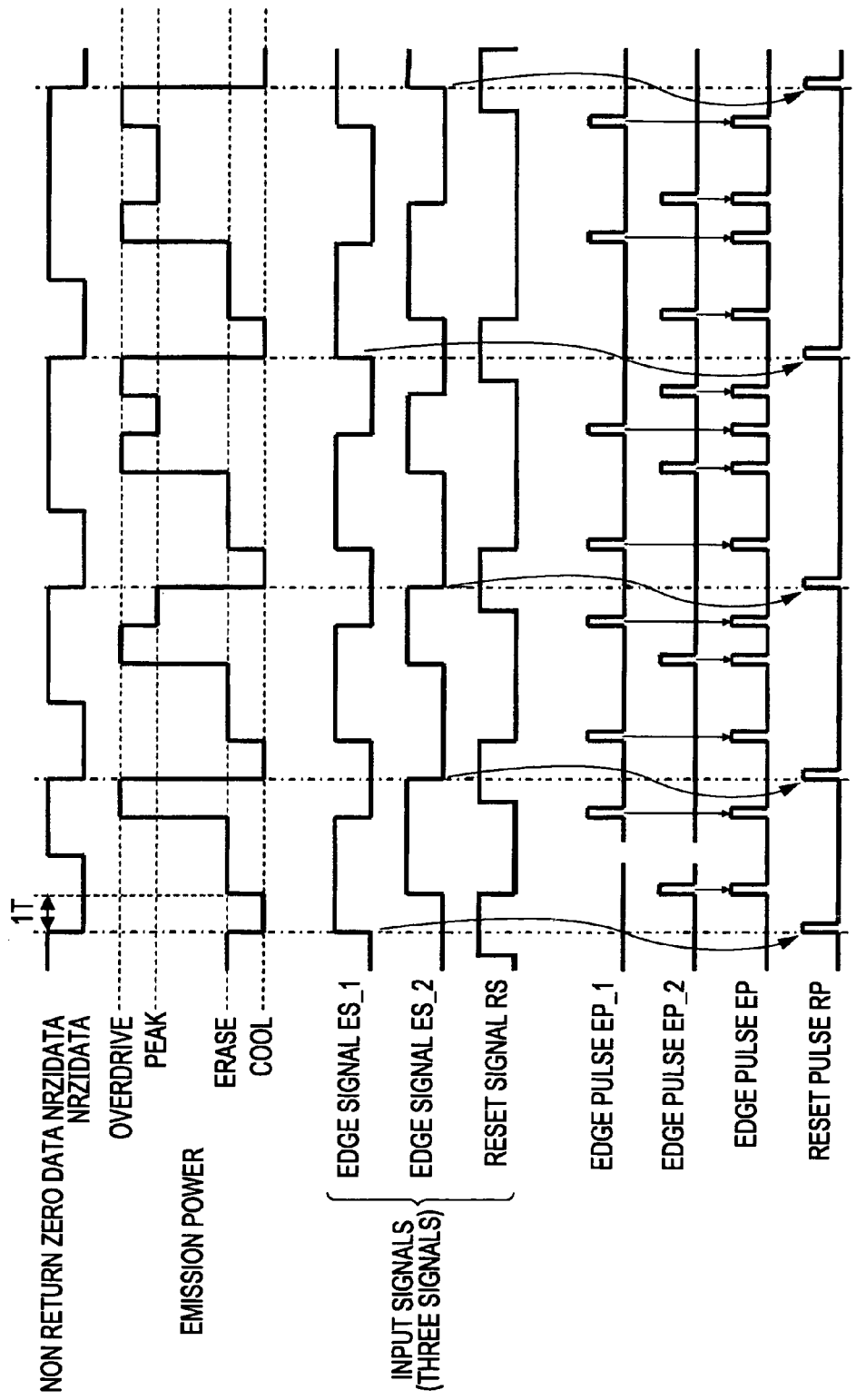
FIG. 30 is a timing chart for illustrating the operation of the laser driving circuit of the fifth embodiment (first example)
Figure 31:
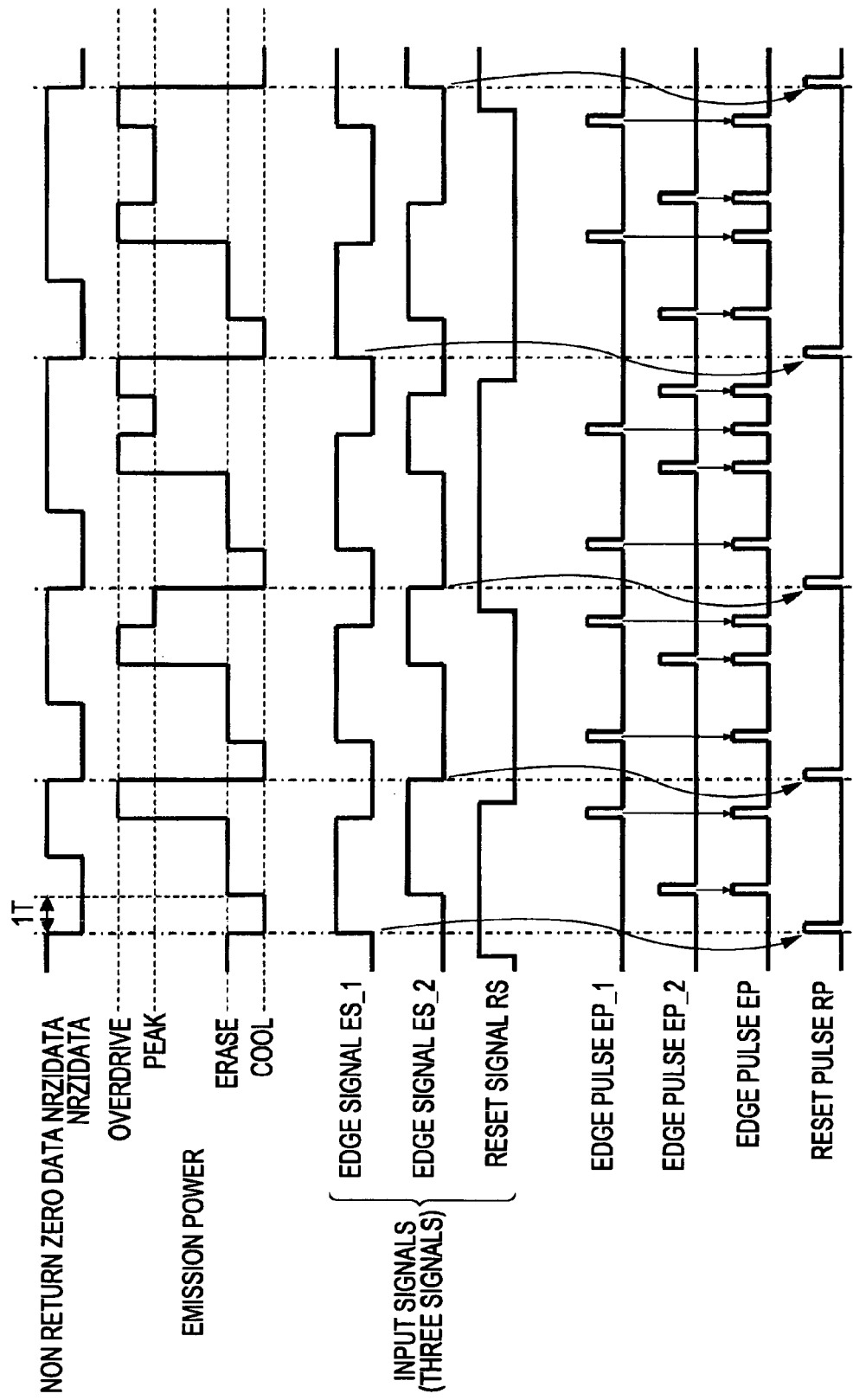
FIG. 31 is a timing chart for illustrating the operation of the laser driving circuit of the fifth embodiment (second example)
Figure 32:
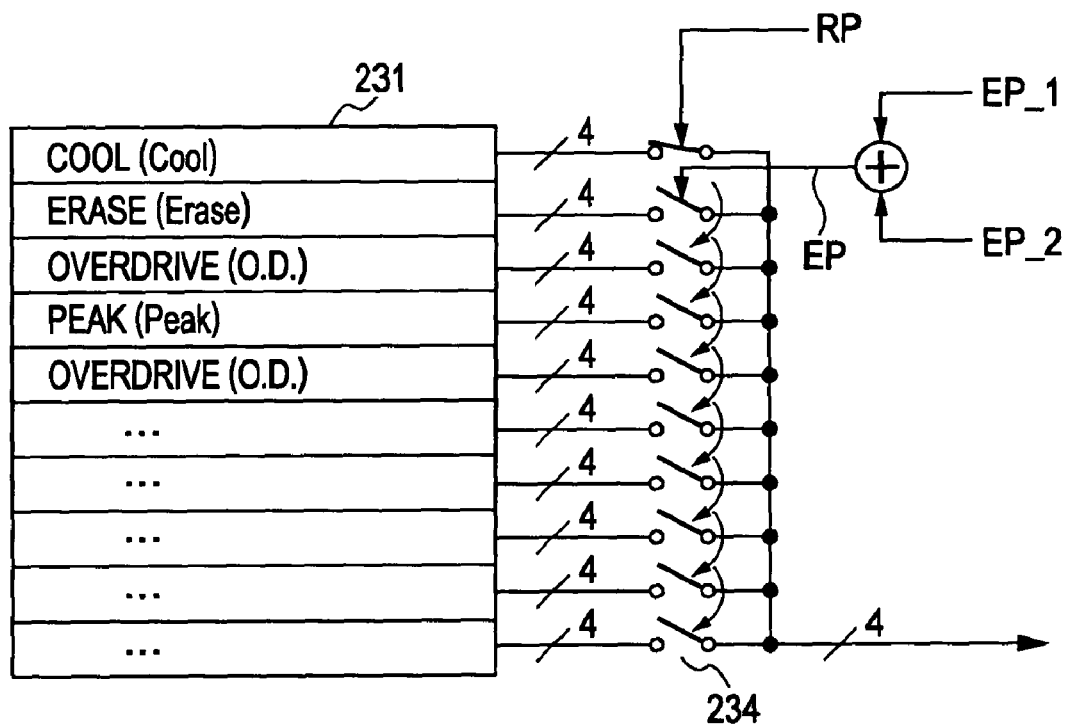
FIG. 32 is a timing chart for illustrating register-setting information of a memory circuit corresponding to signal patterns for recording-waveform control shown in FIG. 30 and FIG. 31.

FIG. 28 to FIG. 30 are diagrams illustrating a laser driving system according to a fifth embodiment of the present invention. Here, FIG. 28A and FIG. 28B are diagrams that illustrate an exemplary configuration of a transmission signal generator 500E of the fifth embodiment used for realizing a sequential system equipped in a digital signal processor 57 on the drive substrate. FIG. 29 is a diagram that illustrates the configuration of a laser driving circuit that realizes the laser driving system of the fifth embodiment. FIG. 30 and FIG. 31 are diagrams that illustrate the operation of the laser driving circuit of the fifth embodiment. FIG. 32 is a diagram illustrating register-setting information of the memory circuit corresponding to the signal patterns for recording-waveform control shown in FIG. 30 and FIG. 31.

In the fifth embodiment, the measure against the skew of the fourth embodiment is applied to the second embodiment. As shown in FIG. 28, a transmission signal generator 500E on the drive substrate includes a RS-type flip-flop circuit 510 and a D-type flip-flop circuit 512 to generate a reset signal RS. The configuration of the transmission signal generator 500E is the same as that of the second embodiment, so that the description thereof will be omitted.

In addition, the transmission signal generator 500E includes a five-input type OR gate 521, D-type flip-flop circuits 522, 526, and 527, a delay section 528 includes delay circuits 528P and 528N, and a delay section 529 includes delay circuits 529P and 529N. To generate edge signals ES_1 and ES_2 with edges varied with a predetermined time lag with respect to edge pulses EP1 to EP5, an OR gate 520 of the four-input type is changed to the OR gate 521 of a 5-input type and delay circuits 528 and 529 are additionally added to the downstream of the D-type flip-flop circuits 526 and 527.

The edge pulses EP1 to EP5 are supplied to the respective input terminals of the OR gate 521. The output end of the OR gate 521 is connected to the clock input terminal CK of the D-type flip-flop circuit 522. D-type flip-flop circuits 522, 526, are 527 are the same as those of the second embodiment, so that the descriptions thereof will be omitted.

The non-inverting output terminal Q of the D-type flip-flop circuit 526 is connected with the input terminal of the delay circuit 528P. The inverting output terminal xQ of the D-type flip-flop circuit 526 is connected with the input terminal of the delay circuit 528N. The non-inverting output terminal Q of the D-type flip-flop circuit 527 is connected with the input terminal of the delay circuit 529P.

The inverting output terminal xQ of the D-type flip-flop circuit 527 is connected with the input terminal of the delay circuit 529N.

Therefore, each of the non-inverting output terminal Q and the inverting output terminal xQ of the D-type flip-flop circuit 522 is synchronized with the rising edge of any of the edge pulses EP1 to EP5 and the low and the high state thereof are changed in order. Therefore, the non-inverting output terminal Q and the inverted output end xQ of the D-type flip-flop circuit 526 are changed from an active high state to an active low state and vice versa in order in synchronization with the rising edge of the non-inverting output terminal Q of the D-type flip flop 522. The output terminal of the delay circuit 528P and the output terminal of the delay circuit 528N are changed with delay from an active high state to an active low state and vice versa in order with respect to signals from the non-inverting output terminal Q and the inverted output end xQ of the D-type flip-flop circuit 526.

In addition, the non-inverting output terminal Q and the inverted output end xQ of the D-type flip-flop circuit 527 are changed from an active high state to an active low state and vice versa in order in synchronization with the rising edge of the non-inverting output terminal Q of the D-type flip flop circuit 522. The output terminal of the delay circuit 529P and the output terminal of the delay circuit 529N are changed with delay from an active high state to an active low state and vice versa in order with respect to signals from the non-inverting output terminal Q and the inverted output end xQ of the D-type flip-flop circuit 527.

Therefore, if an output pulse from each of the output ends of the delay circuits 528P and 528N is provided as an edge signal ES_1, an edge pulse EP_1 is defined by the both edges of the edge signal ES_1. In addition, if an output pulse from each of the output ends of the delay circuits 529P and 529N is provided as an edge signal ES_2, an edge pulse EP_2 is defined by the both edges of the edge signal ES_2.

As shown in FIG. 29, the reset pulse generator 210 and the edge pulse generator 220 of the laser driving circuit 200E of the fifth embodiment are different from those of the second embodiment. Like the fourth embodiment, for example, the reset pulse generator 210E further includes discrimination signal generators 216,218. The edge pulse generator 220E further includes a second separator 228.

As shown in FIG. 30 and FIG. 31, signal patterns for recording-waveform control are the same as those of the first embodiment, and as shown in FIG. 32 the information stored in the registers 232_1 to 232_5 are also the same as those of the first and second embodiments.

Operation: Fifth Embodiment

In the fifth embodiment, as shown in FIG. 30 and FIG. 31, any of rest pulses RP and edge pulses EP is represented by the edge of an edge signal ES. The reset pulse RP is generated using only the first edge of each of edge signals ES_1 and ES_2 after change of a reset signal RS. This point is the same as that of the fourth embodiment. By the way, the "change of a reset signal RS" uses the rising edge in FIG. 30 and both edges in FIG. 31. An edge pulse EP_1 is generated using each of both edges of an edge signal ES_1 (except the edge thereof for each reset pulse RP). An edge pulse EP_2 is generated using each of both edges of an edge signal ES_2 (except the edge thereof for each reset pulse RP).

The reset signal RS is used for generation of discrimination pulses DP and xDP for separating both the reset pulse RP and the edge pulses EP_1 and EP_2 from the composite pulse RP & EP. In the fifth embodiment, the reset signal RS is not provided with edge information that represents a reset pulse RP. The edge signals ES_1 and ES_2 are transmitted such that the edges thereof include not only the information of the edge pulses EP_1 and EP_2 but also the information of the reset pulse RP.

Furthermore, transition timing of the reset signal RS is set to one without the edge of each of the edge signals ES_1 and ES_2. Thus, the reset pulse RP is acquired from the composite pulse RP & EP at edge timing of the edge signals ES_1 and ES_2 directly after the edge of the reset signal RS. In the composite pulse RP & EP, each of edge pulses EP_1 and EP_2 is acquired at timing other than one of edges used for acquiring the reset pulse RP. An edge pulse EP is generated by combining the edge pulse EP_1 and EP_2 with each other.

In other words, even though the fifth embodiment uses two edge signals EP, a point in that any of the reset pulse RP and the edge pulse EP is represented by the edge of the edge signal ES is the same as that of the fourth embodiment. Transition timing of the reset signal RS is set to one without the edge of the edge signal ES. Thus, the reset pulse RP is acquired from the composite pulse RP & EP at edge timing of the edge signal ES directly after the edge of the reset signal RS. In the composite pulse RP & EP, an edge pulse EP is acquired at timing other than one of edges used for acquiring the reset pulse RP. The subsequent steps are the same as those of the second embodiment.

Therefore, the fifth embodiment transmits both the reset pulse RP and the edge pulse EP using two edge signals ES. Thus, the fifth embodiment is hardly affected by any influence of the skew compared with the second embodiment in which a reset pulse RP is transmitted using a reset signal RS other than one used for an edge signal ES.

Laser Drive System: Sixth Embodiment

FIG. 33A to FIG. 37 illustrate a laser driving system according to a sixth embodiment of the present invention.

Figure 33A:
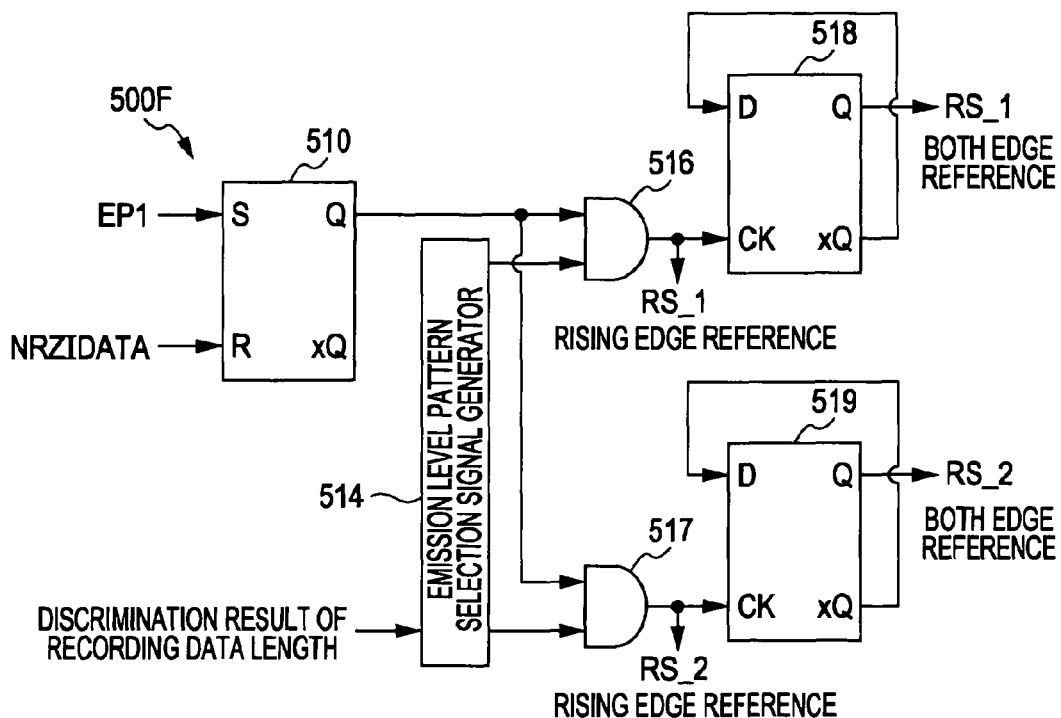
FIG. 33A illustrates a transmission signal generator for reset signals RS and FIG. 33B illustrates a transmission signal generator for edge signals ES.
Figure 33B:
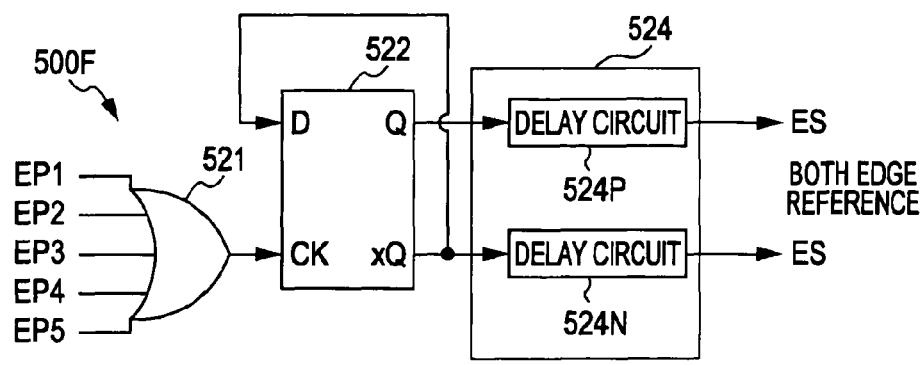
Figure 34:
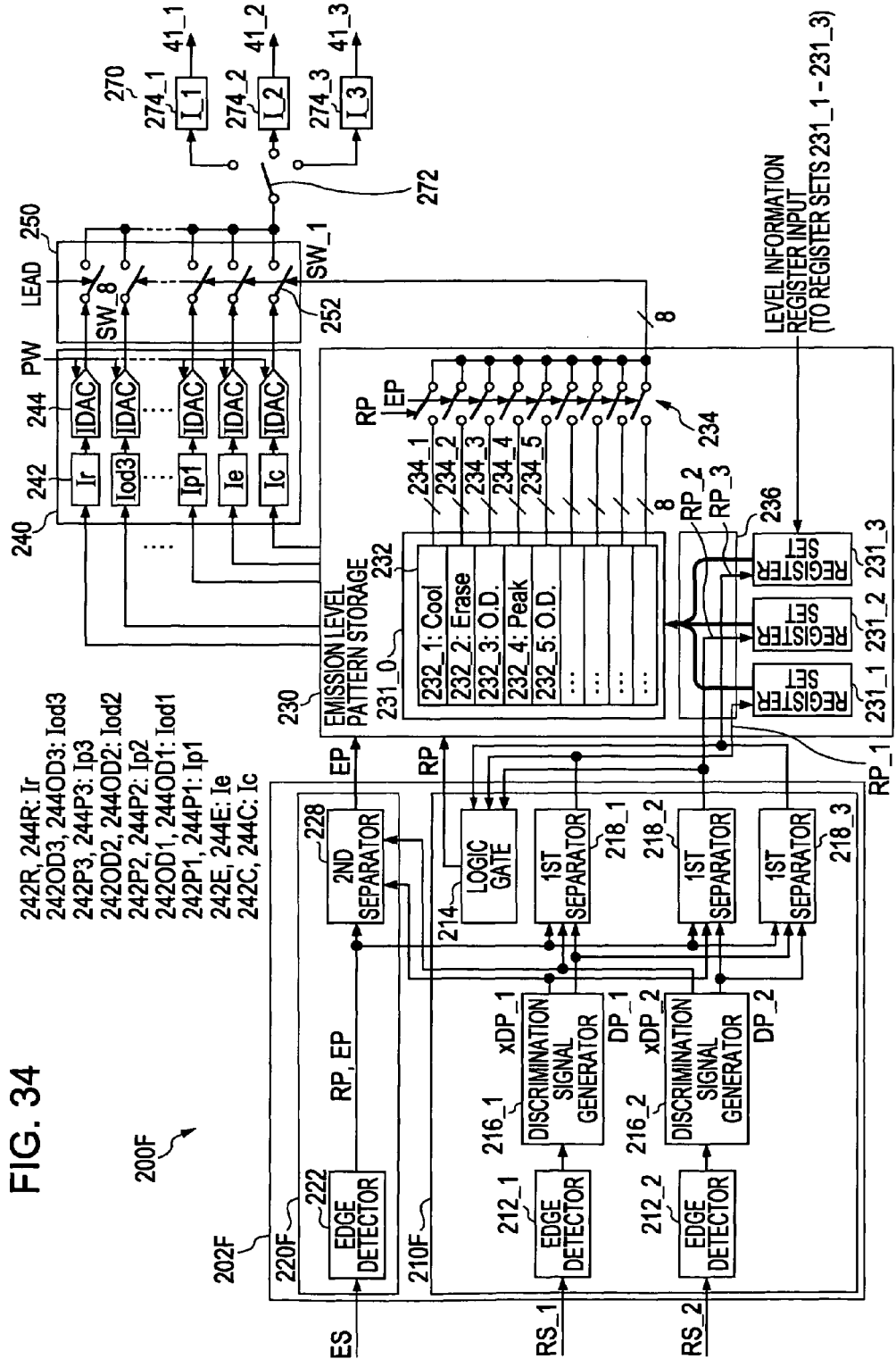
FIG. 34 is a diagram illustrating a laser driving circuit that realizes the laser driving system of a sixth embodiment.
Figure 35:
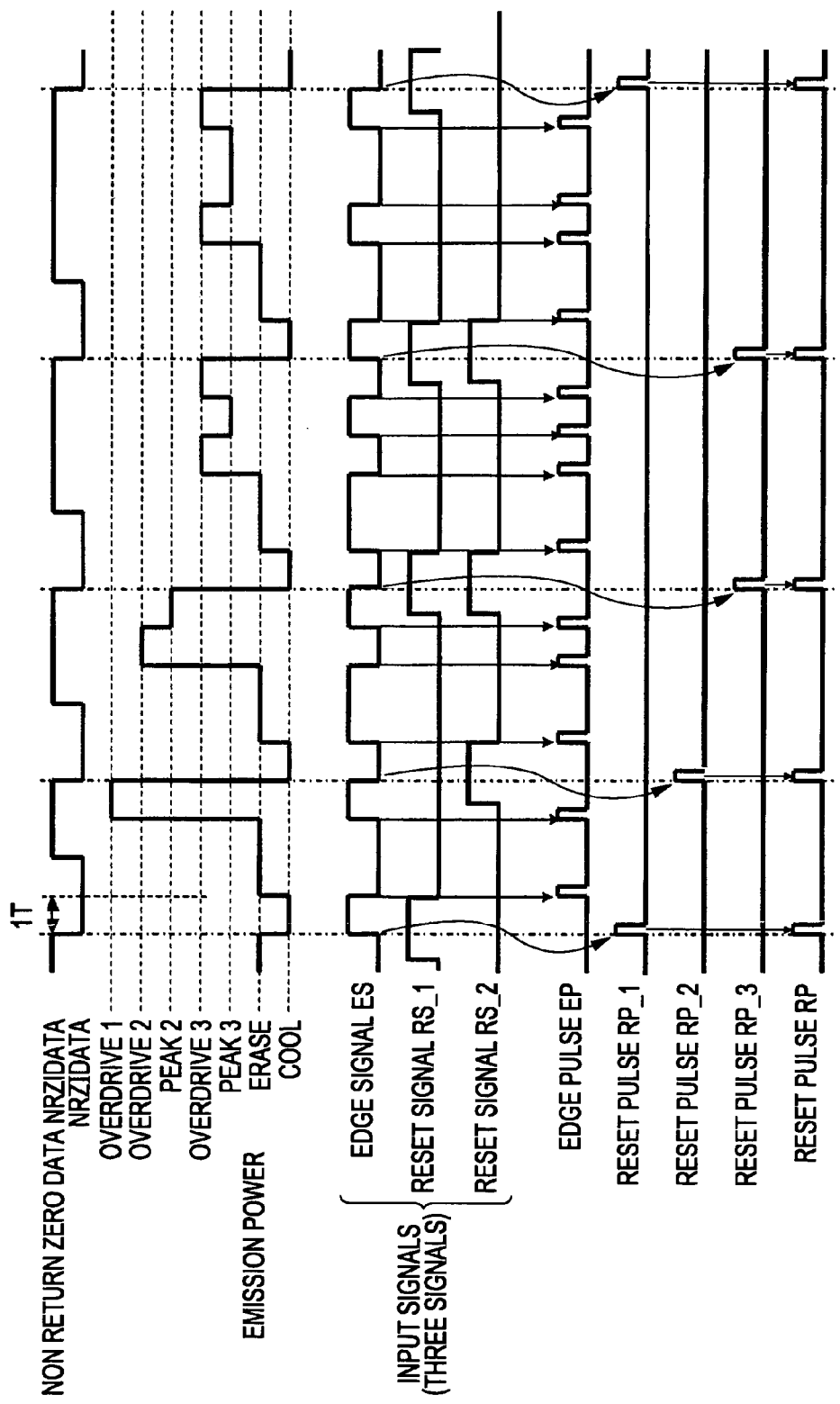
FIG. 35 is a timing chart for illustrating the operation of the laser driving circuit of the sixth embodiment (first example)
Figure 36:
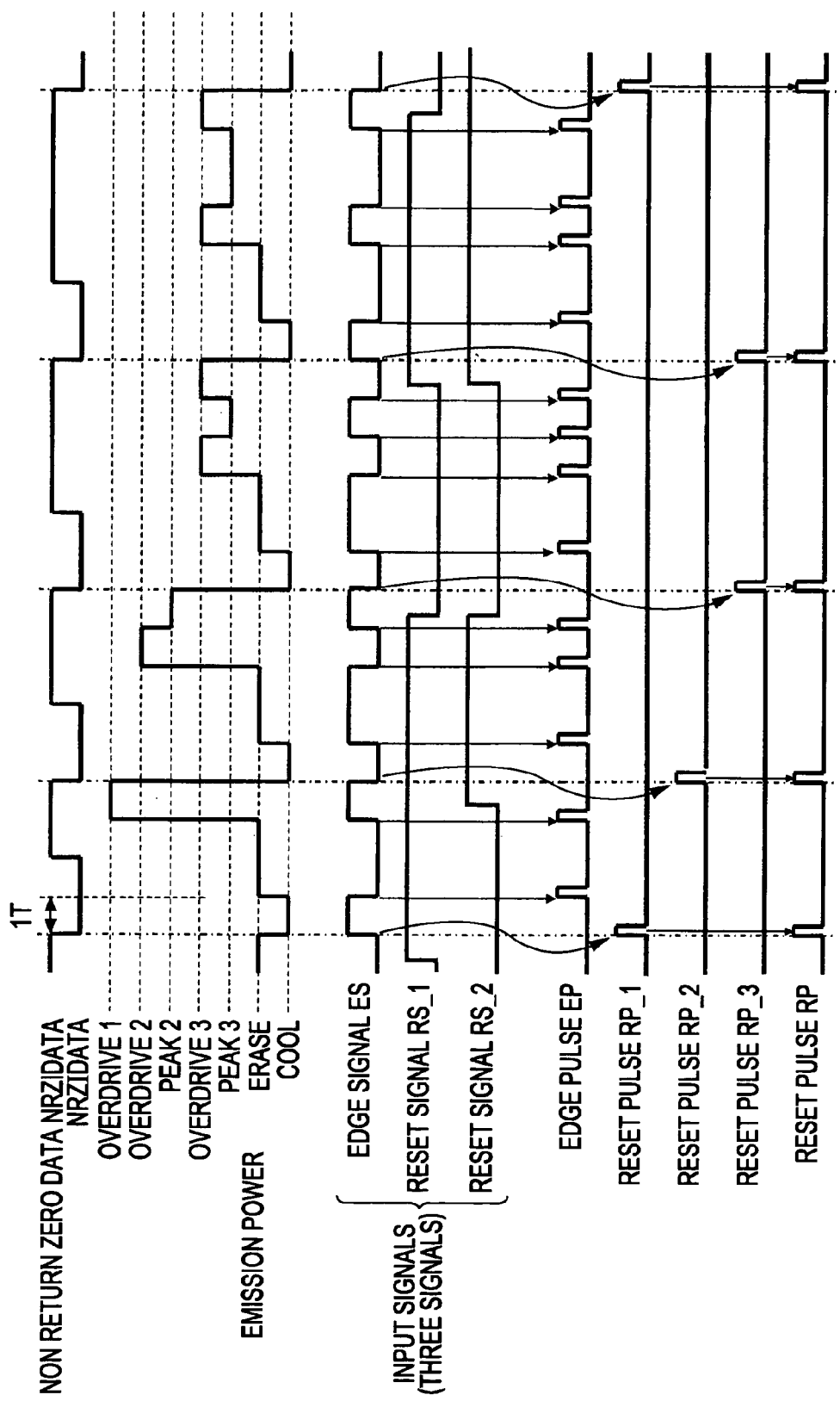
FIG. 36 is a timing chart for illustrating the operation of the laser driving circuit of the sixth embodiment (second example)
Figure 37:
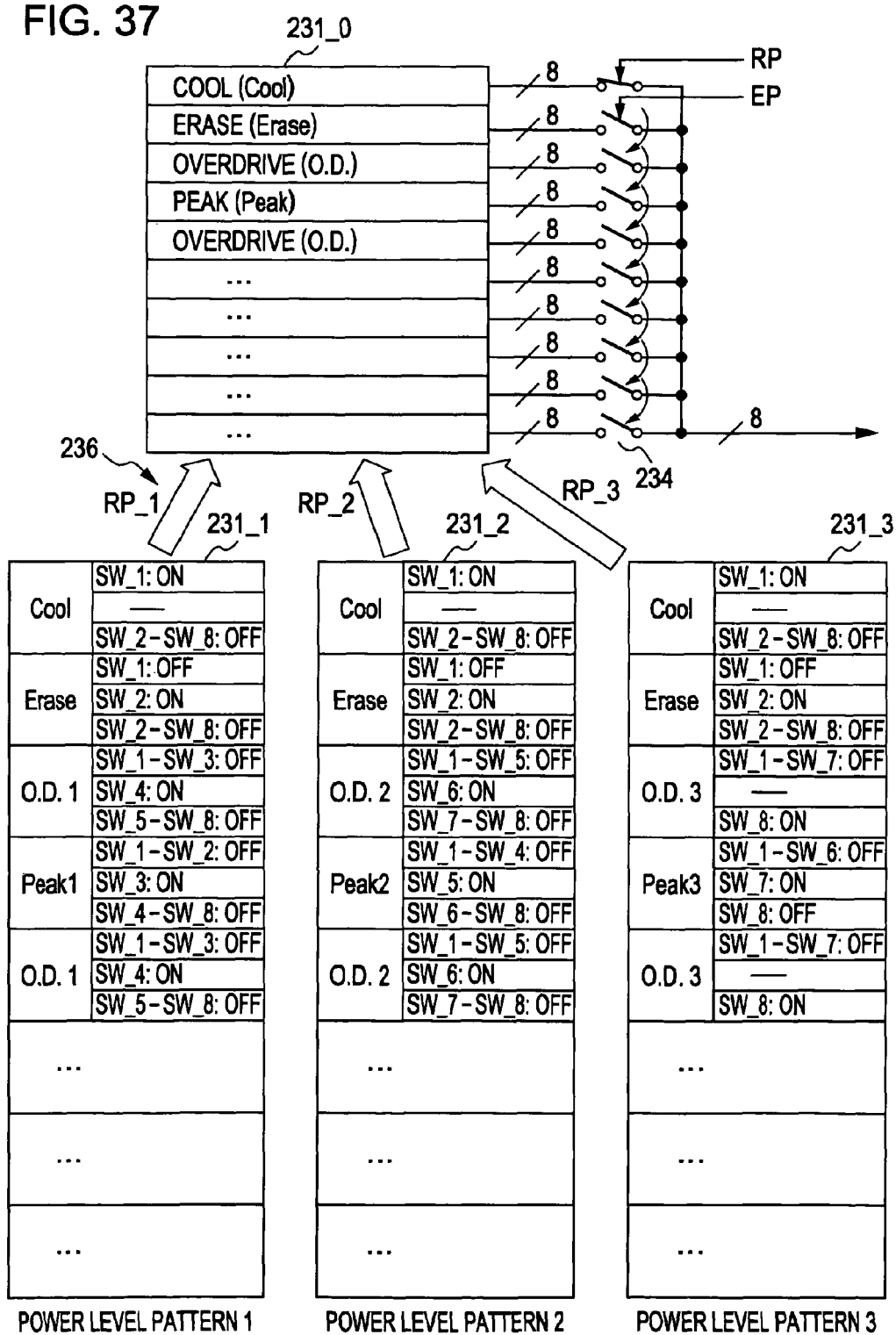
FIG. 37 is a timing chart for illustrating register-setting information of a memory circuit corresponding to signal patterns for recording-waveform control shown in FIG. 35 and FIG. 36.

Here, FIG. 33A and FIG. 33B are diagrams illustrating an exemplary configuration of a transmission signal generator 500F of the sixth embodiment to be used for realizing a sequential system installed in the digital signal processor 57 on the driving substrate. FIG. 34 is a diagram that illustrates the configuration of a laser driving circuit that realizes the laser driving system of the sixth embodiment. FIG. 35 and FIG. 36 are diagrams that illustrate the operation of the laser driving circuit of the fifth embodiment. FIG. 37 is a diagram illustrating register-setting information of the memory circuit corresponding to the signal patterns for recording-waveform control shown in FIG. 35 and FIG. 36. In the sixth embodiment, the measure against the skew of the fourth embodiment is applied to the third embodiment. As shown in FIG. 33A and FIG. 33B, the transmission signal generator 500F on the drive substrate includes a RS-type flip-flop circuit 510, an emission level pattern selection signal generator 514, AND gates 516 and 517, and D-type flip-flop circuits 518 and 519. The configuration of the transmission signal generator 500F is the same as that of the third embodiment, so that the description thereof will be omitted.

In addition, the transmission signal generator 500F includes a five-input type OR gate 521, a D-type flip-flop circuit 522, and a delay section 524 including a delay circuit 524P and 524N. In order to generate edge signal ES from which it is behind for a fixed period to edge pulses EP1-EP5, and edge changes, while transforming four-input type OR gate 520 into five input type OR gate 521, it is the configuration of having added delay section 524 to the latter part of D-type flip-flop circuit 522. A configuration is the same as that of a 4th embodiment, and omits explanation here.

As shown in FIG. 34, the reset pulse generator 210 and the edge pulse generator 220 of the laser driving circuit 200F of the sixth embodiment are different from those of the third embodiment. Like the fourth embodiment, for example, the reset pulse generator 210F further includes discrimination signal generators 216 (216_1 and 216_2) for the respective resent signals RS_1 and RS_2. In addition, the reset pulse generator 210F further includes first separators 218 (218_1, 218_2, and 218_3) for the respective reset pulses RP_1, RP_2, and RP_3. The logic gate 213 is not necessary in this embodiment.

The edge pulse generator 220F further includes a second separator 228. The edge detector 222 generates a composite pulse RP&EP that includes reset pluses RP_1, RP_2, and RP_3 and an edge pulse EP.

A discrimination signal generator 216_1 generates 1st discrimination pulse DP_1 and xDP_1 based on reset signal RS_1. Also, a discrimination signal generator 216_2 generates 2nd discrimination pulse DP_2 and xDP_2 based on reset signal RS_2. The first separator 218_1 uses an AND gate that takes a logic sum of a composite pulse RP & EP in an active high state generated from the edge detector 222, a discrimination pulse DP_1 from a discrimination signal generator 216_1, and an inverted discrimination pulse xDP_2 from a discrimination signal generator 216_2. Thus, the first separator 218_1 acquires a reset pulse RP_1 from the composite pulse RP & EP at edge timing of the edge signal ES directly after only the edge of the reset signal RS_1.

The first separator 218_2 uses an AND gate that takes a logic sum of a composite pulse RP & EP in an active high state generated from the edge detector 222, an inverted discrimination pulse xDP_1 from a discrimination signal generator 216_1, and a discrimination pulse DP_2 from a discrimination signal generator 216_2. Thus, the first separator 218_2 acquires a reset pulse RP_2 from the composite pulse RP & EP at edge timing of the edge signal ES directly after only the edge of the reset signal RS_2.

The first separator 218_3 uses an AND gate that takes a logic sum of a composite pulse RP & EP in an active high state generated from the edge detector 222, a discrimination pulse DP_1 from a discrimination signal generator 216_1, and a discrimination pulse DP_2 from a discrimination signal generator 216_2. Thus, the first separator 218_3 acquires a reset pulse RP_3 from the composite pulse RP & EP at edge timing of the edge signal ES directly after both the reset signal RS_1 and the reset signal RS_2.

The logic gate 214 performs logical synthesis of reset pulses RP_1, RP_2, and RP-3 in an active high state to generate a reset pulse RP. If each of reset pulses RP_1, RP_2, and RP_3 in an active high state, the logic gate 214 may be an OR gate. The second separator 228 uses an AND gate that takes a logic sum of a composite pulse RP & EP in an active high state generated from the edge detector 222, an inverted discrimination pulse xDP_1 from a discrimination signal generator 216_1, and an inverted discrimination pulse xDP_2 from a discrimination signal generator 216_2.

As shown in FIG. 35 and FIG. 36, signal patterns for recording-waveform control are the same as those of the third embodiment, and as shown in FIG. 37, the information stored in the registers 232_1 to 232_5 are also the same as those of the third embodiment.

Operation: Sixth-Embodiment

In the sixth embodiment, as shown in FIG. 35 and FIG. 36, any of two rest pulses RP_1 and RR_2 and edge pulses EP is represented by the edge of an edge signal ES. The reset signals RS_1 and RS_2 are used for the generation of discrimination pulses DP_1 and DP_2 and inverted discrimination pulses xDP_1 and xDP_2 for separating the reset signals RS_1 and RS_2 from a composite pulse RP & EP obtained by combining reset pulses RP_1, RP_2, and RP_3 and an edge pulse EP with one another. These signals RS_1 and RS_2 are not provided with edge information that represents reset pulses RP_1, RP_2, and RP_3. The edges of the edge signal ES is transmitted while including not only the information of an edge pulse EP but also the information of reset pulses RP_1, RP_2, and RP_3.

As described above, the sixth embodiment uses two reset signals RS. However, the sixth embodiment has the same structure as that of the fourth embodiment in that any of reset pulses RP_1, RP_2, and RP_3 and an edge pulse EP is represented by the edge of an edge signal EP. Transition timing of the reset signals RS_1 and RS_2 is set to one without the edge of the edge signal ES. Thus, the reset pulses RP_1, RP_2, and RP_3 are acquired from the composite pulse RP & EP at edge timing of the edge signal ES directly after the edge of each of the reset signals RS_1 and RS_2. In the composite pulse RP & EP, an edge pulse EP is acquired at timing other than one of edges used for acquiring the reset pulses RP_1, RP_2, and RP_3. The subsequent steps are the same as those of the third embodiment.

In the sixth embodiment, the reset pulses RP_1, RP_2, and RP_3 and the edge pulse EP are transmitted through a signal edge signal ES. Thus, the sixth embodiment is not affected by the influence of a skew in contrast to the third embodiment in which reset pulses RP_1, RP_2, and RP_3 are transmitted using reset signals RS_1 and RS_2 other than an edge signal ES.

Although not shown in the figure, the fifth embodiment having a plurality of second transmission signals (edge signals ES) may be combined with the sixth embodiment having a plurality of first transmission signals (reset signals RS). In this case, each of the effects of the fifth and sixth embodiments will be realized.

Laser Drive System: Seventh Embodiment

Figure 38:
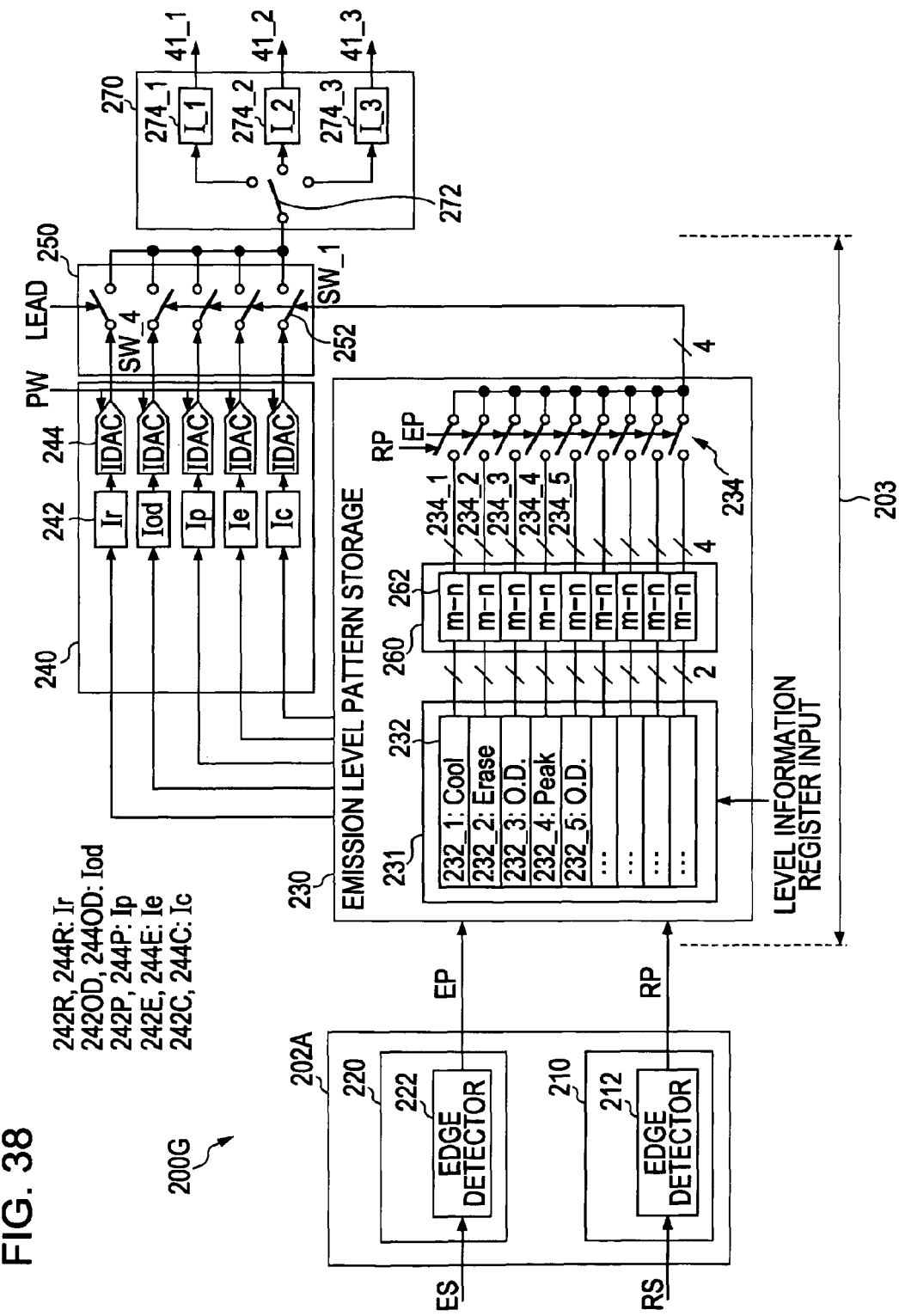
FIG. 38 is a diagram illustrating a laser driving circuit that realizes the laser driving system of a seventh embodiment.

FIG. 38 illustrates a laser driving system according to a seventh embodiment of the present invention. FIG. 29 is a diagram illustrating a laser driving circuit that realizes the laser driving system of the seventh embodiment.

The laser driving circuit 200G of the seventh embodiment is configured so that the number of multiple levels of emission power may be different from the number of the output lines of the registers 232_1 to 232_k and the number of readout switches 231_1 to 234_k. Therefore, the laser driving circuit 200G of the seventh embodiment includes a decode section 260 provided with a decoder 262 in the type of m-input and n-output (hereinafter, referred to as m-n, where m and n are positive integers (m<n)), which is arranged between an emission level pattern storage 230 and a readout switch 234.

The illustrated example is substantially the same configuration as that of the applied example of the first embodiment except that the decoder 262 is a 2-4 type decoder. Each of current switching pulses SW on the output lines of the resisters 232_1 to 232_k corresponds two bits using two current switching pulses SW_a and SW_b and the combination thereof leads to the outputs of current switching pulses SW_1 to SW_4 from the outputs of the resisters 232_1 to 232_k in a manner similar to that of the first embodiment.

For example, if cool current Ic is represented, both SW_a and SW_b are set in an address low state. In this case, only the current switching pulse SW_1 is set to be switched ON. If erase current Ie is represented, SW_a is set in an address high state and SW_b is set in an address low state. In this case, only the current switching pulse SW_2 is set to be switched ON. If peak current Ip is represented, SW_a is set in an address low state and SW_b is set in an address high state. In this case, only the current switching pulse SW_3 is set to be switched ON. If overdrive current Iod is represented, both SW_a and SW_b are set in an address high. In this case, only the current switching pulse SW_4 is set to be switched ON. Although not illustrated in the figure, the same configurations of current switching pulses are also employed in applied examples of the second and fifth embodiments.

In the applied examples of the third and sixth embodiments, although not illustrated in the figure, the decoder 262 is a 3-8 type decoder. Each of current switching pulses SW on the output lines of the resisters 232_1 to 232_k corresponds two bits using two current switching pulses SW_a, SW_b, and SW_c and the combination thereof leads to the outputs of current switching pulses SW_1 to SW_8 from the outputs of the resisters 232_1 to 232_k in a manner similar to that of the third and sixth embodiments.

For example, if cool current Ic is represented, SW_a, SW_b, and SW_c are set in an address low state. In this case, only the current switching pulse SW_1 is set to be switched ON. If erase current Ie is represented, SW_a is set in an address high state and SW_b and SW_c are set in an address low state. In this case, only the current switching pulse SW_2 is set to be switched ON. If peak current Ip1 is represented, SW_a and SW_c are set in an address low state and SW_b is set in an address high state. In this case, only the current switching pulse SW_3 is set to be switched ON. If overdrive current Iod1 is represented, both SW_a and SW_b are set in an address high state and SW_c is set in an address low state. In this case, only the current switching pulse SW_4 is set to be switched ON. If peak current Ip2 is represented, SW_a and SW_b are set in an address low state and SW_c is set in an address high state. In this case, only the current switching pulse SW_5 is set to be switched ON. If overdrive current Iod2 is represented, both SW_a and SW_c are set in an address high state. In this case, only the current switching pulse SW_6 is set to be switched ON. If peak current Ip3 is represented, SW_a is set in an address low state and SW_b and SW_c are set in an address high state. In this case, only the current switching pulse SW_7 is set to be switched ON. If overdrive current Iod3 is represented, SW_a, SW_b and SW_c are set in an address high state. In this case, only the current switching pulse SW_8 is set to be switched ON.

Comparing with any of the first to sixth embodiments, in such a configuration of the seventh embodiment, the circuit configuration may be a little bit complicated because of a necessity for a decoder section 260 and the amount of information to be stored in the register 232 is decreased. Therefore, the storage capacity of the register set 231 may be reduced and as a result there is an advantage of downsizing the size of the emission level pattern storage 230.

Laser Drive System: Eighth Embodiment

Figure 39:
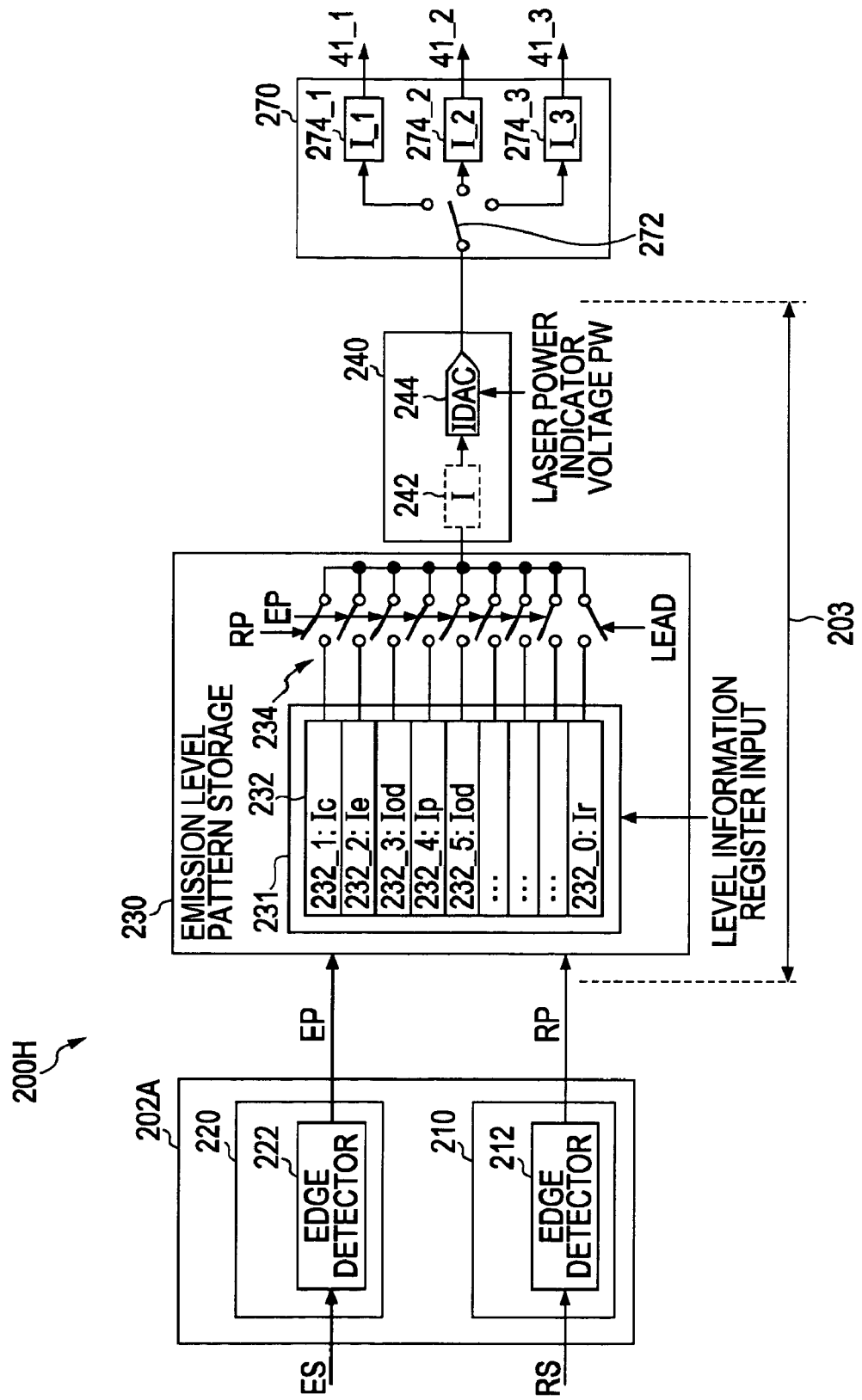
FIG. 39 is a diagram illustrating a laser driving circuit that realizes the laser driving system of the eighth embodiment.

FIG. 39 illustrates a laser driving system according to an eighth embodiment of the present invention. FIG. 39 is a diagram illustrating a laser driving circuit that realizes the laser driving system of the eighth embodiment.

The laser driving circuit 200H of the eighth embodiment is provided for using the emission power information of a resister 232 as current level information and subsequently switching the current level information to supply the current level information to the electric power source 240. Therefore, the electric power source 240 has a simile configuration including one reference current generator 242 and one DA converter 244 while an electric switch section 250 is not required. In addition, the reference current generator 242 may be excluded when each piece of current level information of the register 232 may be brought into coincident with each of electric current values Ic, Ie, Ip, and Iod.

In contrast to the first to seventh embodiments carry out transition of different level powers by switching of a current switch 252, the eighth embodiment carries out transition of level powers in a DA converter 244. Thus, there is an advantage of simplifying the circuit configuration.

On the other hand, in the eighth embodiment, a waveform characteristic may be lower than that of any of other embodiments. The DA converter 244 has a plurality of current sources with different levels. Digital data having the same number of bits as that of the current sources to turn on/off the current of the plurality of current sources to carry out current addition. In the eighth embodiment, the emission power information of the register 232 is provided as multi-bit digital data and sequentially switched from one to another. In other words, a deviation of switch timing between bits leads to a deviation of timing of current addition to worse the transition speed of emission power.

In contrast, in the first to seventh embodiments, the reference current generator 242 and the DA converter 244 prepare current values of the respective levels in advance and the current switch 252 switches these current values from one to another. Therefore, the number of currents to be turned on/off decreases at timing of changing emission power, so that an influence of a deviation of timing of switching on/off each current on a waveform characteristic becomes small.

The present application contains subject matter related to that disclosed in Japanese Priority Patent Application JP filed in the Japan Patent Office on Sep. 2, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A laser driving device, comprising:
   a storage unit for storing signal patterns for recording-waveform control representing level information of each of plural divided driving signals to drive a laser device on a space and a mark on the basis of said plural divided driving signals; and
   a pulse generator for generating a reference pulse and a switch pulse on the basis of a first transmission signal containing information for defining a timing of acquiring said reference pulse that represents a timing of repetitively switching between said space and said mark and a second transmission signal containing information for defining a timing of acquiring said switch pulse that represents a timing of switching divided driving signals, wherein,
   among level information for each of said divided driving signals stored in said storage, reference level information which is level information about the position of said reference pulse is read together with said reference pulse,
   said switch pulse is one of a plurality of switch pulses, and other level information subsequent to the reference level information is read out one by one for each of said plurality of switch pulses.

2. The laser device according to claim 1, wherein
   said first transmission signal is a pulse signal containing information that defines a timing of acquiring said reference pulse on an edge of said first transmission signal,
   said second transmission signal is a pulse signal containing information that defines a timing of acquiring said switch pulse on an edge of said second transmission signal, and
   said pulse generator includes:
   a first pulse generator provided with a first edge detector for detecting the edge of said first transmission signal to acquire said reference pulse based on said edge detected by said first edge detector; and
   a second pulse generator provided with a second edge detector for detecting said second transmission signal to acquire said switch pulse based on said edge detected by said second edge detector.

3. The laser driving device according to claim 2, wherein
   said first pulse generator receives said one first transmission signal and detects the edge of said one transmission signal by said first edge detector; and
   said second pulse generator receives said one second transmission signal and detects the edge of said one second transmission signal by said second edge generator.

4. The laser driving device according to claim 2, wherein
   said first pulse generator receives said one first transmission signal and detects the edge of said one first transmission signal by said first edge detector,
   said second pulse generator includes said second edge detector corresponding to each of a plurality of said second transmission signals and a pulse combining unit for combining edges respectively detected by a plurality of said edge detector,
   the plurality of said second transmission signals is received by said corresponding edge detectors,
   each of said second edge detectors detect each edge of the plurality of said second transmission signals, and
   edges detected by said respective second edge detectors are combined in said pulse comprising unit to generate said switch pulse.

5. The laser driving device according to claim 3 or 4, wherein
   said storage unit includes a plurality of sub-storage sections for independently storing different kinds of said signal patterns for recording-waveform control and a main storage unit for selectively storing any level information stored in the plurality of said sub-storage sections,
   said first pulse generator includes said first edge detector corresponding to each of a plurality of said second transmission signals and a pulse combining unit for combining edges respectively detected by a plurality of said edge detectors,
   the plurality of said first transmission signals is received by said corresponding edge detectors,
   each of said first edge detectors detect each edge of the plurality of said first transmission signals,
   edges detected by said respective first edge detectors are combined in said pulse comprising unit to generate said switch pulse, and
   any level information stored in the plurality of said sub-storage section is selected and stored in said main storage section based on each edge of the plurality of said first transmission signals detected by said respective first edge detectors.

6. The laser driving device according to claim 1, wherein
   said first transmission signal is a pulse signal that does not include information that specifies said timing of acquiring a said reference pulse on the edge, while containing information about an discrimination signal for distinguishing and acquiring said reference pulse and said switch pulse from said second transfer signal,
   said second transmission signal is a pulse signal containing information that defines a timing of acquiring said reference pulse and said switch pulse on an edge of said pulse signal,
   said pulse generator includes a first pulse generator and a second pulse generator, where
   said first pulse generator includes a first edge detector for detecting the edge of said first transmission signal, a discrimination signal generator for generating said discrimination signal based on an edge detected by said first edge detector, and a first separator to separate and acquire said reference pulse and said switch pulse, and
   said second pulse generator includes a second edge detector for detecting an edge of said second transmission signal and a second separator, in which a composite pulse provided as a combination of said reference pulse and said switch pulse based on an edge detected by said second edge detector, and said switch pulse is divided from said reference pulse and then acquired,
   said first separator separates said reference pulse from said composite pulse based on said discrimination signal, and
   said second separator separates said change pulse from said composite pulse based on said discrimination signal.

7. The laser driving device according to claim 6, wherein
   said first separator separates said reference pulse from said composite pulse by logic synthesis of said discrimination signal and said composite pulse, and said second separator separates said switch pulse from said composite pulse by logic synthesis of an inverted discrimination signal obtained by logic inversion of said discrimination signal and said composite pulse.

8. The laser driving device according to claim 6 or 7, wherein
said first pulse generator receives said one first transmission signal, and detects the edge of said one first transmission signal by said first edge detector,
said second pulse generator includes said second edge detector corresponding to each of a plurality of said second transmission signals, and
a pulse combining unit for combining edges respectively detected by a plurality of said edge detector,
the plurality of said second transmission signals is received by said corresponding edge detectors,
each of said second edge detectors detect each edge of the plurality of said second transmission signals, and
edges detected by said respective second edge detectors are combined in said pulse combining unit to generate said composite pulse.

9. The laser driving device according to claim 8, wherein
said storage unit includes a plurality of sub-storage sections for independently storing different kinds of said signal patterns for recording-waveform control and a main storage unit for selectively storing any level information stored in the plurality of said sub-storage sections,
said first pulse generator includes said first edge detector corresponding to each of a plurality of said second transmission signals and a pulse combining unit for combining a plurality of reference pulses, where
the plurality of said first transmission signals is received by said corresponding edge detectors,
each of said first edge detectors detect each edge of the plurality of said first transmission signals,
any level information stored in the plurality of said sub-storage section is selected and stored in said main storage section based on each edge of the plurality of said first transmission signals detected by said respective first edge detectors,
said pulse combining unit for combining the plurality of said reference pulses combines the plurality of said reference pulses divided by said first separator to generate said one reference pulse, and
said reference level information is read out every reference pulse.

10. An optical apparatus, comprising:
a laser device;
a transmission signal generator for generating, on the basis of a plurality of pulse signals that define an emission waveform provided as a combination of a plurality of divided driving signals with respect to a space and a mark, a first transmission signal containing information for defining a timing of acquiring a reference pulse that represents a timing of repetitively switching between said space and said mark and a second transmission signal containing information for defining a timing of acquiring a switch pulse that represents a timing of switching divided driving signals;
a storage unit for storing signal patterns for recording-waveform control showing level information about each of the plurality of said divided driving signals;
a pulse generator for generating said reference pulse and said switch pulse on the basis of said first transmission signal and said second transmission signal; and
a transmission member for transmitting said first transmission signal and said second transmission signal, which is arranged between said transmission signal generator and said pulse generator, wherein
among level information for each of said divided driving signals stored in said storage, reference level information which is level information about the position of said reference pulse is read together with said reference pulse,
said switch pulse is one of a plurality of switch pulses, and other level information subsequent to the reference level information is read out one by one for each of said plurality of switch pulses.

\* \* \* \* \*